US006988017B2

(12) United States Patent
Pasadyn et al.

(10) Patent No.: US 6,988,017 B2
(45) Date of Patent: Jan. 17, 2006

(54) ADAPTIVE SAMPLING METHOD FOR IMPROVED CONTROL IN SEMICONDUCTOR MANUFACTURING

(75) Inventors: Alexander James Pasadyn, Austin, TX (US); Anthony John Toprac, Austin, TX (US); Michael Lee Miller, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 17 days.

(21) Appl. No.: 11/075,401

(22) Filed: Mar. 8, 2005

(65) Prior Publication Data

US 2005/0221514 A1 Oct. 6, 2005

Related U.S. Application Data

(63) Continuation of application No. 09/663,732, filed on Sep. 15, 2000, now abandoned.

(51) Int. Cl.
*G06F 19/00* (2006.01)

(52) U.S. Cl. .......................... 700/121; 700/28; 700/29; 700/30; 700/173; 700/186; 700/109; 700/110; 700/112; 700/117; 700/106; 700/119; 700/48; 700/95; 700/32; 438/10; 438/14; 438/17; 438/5; 438/6

(58) Field of Classification Search ................ 700/121, 700/28, 29, 30, 173, 186; 438/10, 14, 17, 438/5, 6

See application file for complete search history.

(56) References Cited

U.S. PATENT DOCUMENTS

| 3,777,128 | A | * | 12/1973 | Kirkham | 318/636 |
|---|---|---|---|---|---|
| 5,519,605 | A | * | 5/1996 | Cawlfield | 700/31 |
| 5,740,033 | A | * | 4/1998 | Wassick et al. | 700/29 |
| 5,896,294 | A | * | 4/1999 | Chow et al. | 700/121 |
| 5,926,690 | A | * | 7/1999 | Toprac et al. | 438/17 |
| 6,245,581 | B1 | * | 6/2001 | Bonser et al. | 438/8 |
| 6,248,602 | B1 | * | 6/2001 | Bode et al. | 438/14 |
| 6,337,217 | B1 | * | 1/2002 | Hause et al. | 438/7 |

* cited by examiner

*Primary Examiner*—Anthony Knight
*Assistant Examiner*—Thomas Pham
(74) *Attorney, Agent, or Firm*—Williams, Morgan & Amerson

(57) ABSTRACT

A method is provided, the method comprising sampling at least one parameter characteristic of processing performed on a workpiece in at least one processing step, and modeling the at least one characteristic parameter sampled using an adaptive sampling processing model, treating sampling as an integrated part of a dynamic control environment, varying the sampling based upon at least one of situational information, upstream events and requirements of run-to-run controllers. The method also comprises applying the adaptive sampling processing model to modify the processing performed in the at least one processing step.

66 Claims, 27 Drawing Sheets

ADAPTIVE SAMPLING METHOD FOR IMPROVED CONTROL IN SEMICONDUCTOR MANUFACTURING

This is a continuation of application Ser. No. 09/663,732 filed Sep. 15, 2000 abandoned.

BACKGROUND OF THE INVENTION

1. Field of the Invention

This invention relates generally to semiconductor fabrication technology, and, more particularly, to a method for semiconductor fabrication supervision and optimization.

2. Description of the Related Art

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in a continual improvement in the manufacture of semiconductor devices, e.g., transistors, as well as in the manufacture of integrated circuit devices incorporating such transistors. Additionally, reducing defects in the manufacture of the components of a typical transistor also lowers the overall cost per transistor as well as the cost of integrated circuit devices incorporating such transistors.

The technologies underlying semiconductor processing tools have attracted increased attention over the last several years, resulting in substantial refinements. However, despite the advances made in this area, many of the processing tools that are currently commercially available suffer certain deficiencies. In particular, such tools often lack advanced process data monitoring capabilities, such as the ability to provide historical parametric data in a user-friendly format, as well as event logging, real-time graphical display of both current processing parameters and the processing parameters of the entire run, and remote, i.e., local site and worldwide, monitoring. These deficiencies can engender nonoptimal control of critical processing parameters, such as throughput accuracy, stability and repeatability, processing temperatures, mechanical tool parameters, and the like. This variability manifests itself as within-run disparities, run-to-run disparities and tool-to-tool disparities that can propagate into deviations in product quality and performance, whereas an improved monitoring and diagnostics system for such tools would provide a means of monitoring this variability, as well as providing means for optimizing control of critical parameters.

Run-to-run control as practiced in high-volume, multi-product semiconductor manufacturing does not easily fit into the framework of traditional approaches to process control. A typical approach defines a process model with a given set of states, inputs, and outputs. In some cases, the model is static, and in others, the model changes over time. At each time step, inputs and disturbances affect the states, and outputs are measured. Then, the controller makes an update and the process repeats. One reason this approach is not always applicable is that there are often multiple processing tools as well as multiple products. In addition, of all the measurements important to a process, only a subset are generally made on each run. Determining how to do controller updates in this environment can be a challenging task.

A run-to-run controller relies on having a process model that is consistently correct from run to run. When the various processes run on the tool are significantly different, the controller may behave unexpectedly because a change to a new process can appear to be a large disturbance. In addition, it may take several successive runs of a given process for the controller to stabilize, but manufacturing constraints may prevent this from happening. It is desirable that the controller would determine optimal settings for all processes that must run on the tool, regardless of the order in which they appear.

An example of a system that exhibits this behavior is the chemical mechanical planarization (CMP) of inter-layer dielectric (ILD) layers. Due to differences in pattern density and processing history, each layer/product combination processes at a different rate. In addition, as each product is qualified to run on several toolsets, there are also systematic variations caused by differences between the tools. Thus, one of the many control problems is to determine the optimal settings for each product/layer/tool combination that arises. Additionally, the measurements that provide the controller with information (such as measurements of removal from product wafers and/or test wafer qualification events) are provided at asynchronous intervals based on operational rules without regard to the control problems.

Other parameters it would be useful to monitor and control are process parameters related to rapid thermal processing (RTP). Examples of such process parameters include the temperatures and lamp power levels that silicon wafers and/or workpieces are exposed to during the rapid thermal processing (RTP) used to activate dopant implants, for example. The rapid thermal processing (RTP) performance typically degrades with consecutive process runs, in part due to drift in the respective settings of the rapid thermal processing (RTP) tool and/or the rapid thermal processing (RTP) sensors. This may cause differences in wafer processing between successive runs or batches or lots of wafers, leading to decreased satisfactory wafer throughput, decreased reliability, decreased precision and decreased accuracy in the semiconductor manufacturing process.

However, traditional statistical process control (SPC) techniques are often inadequate to control precisely process parameters related to rapid thermal processing (RTP) in semiconductor and microelectronic device manufacturing so as to optimize device performance and yield. Typically, statistical process control (SPC) techniques set a target value, and a spread about the target value, for the process parameters related to rapid thermal processing (RTP). The statistical process control (SPC) techniques then attempt to minimize the deviation from the target value without automatically adjusting and adapting the respective target values to optimize the semiconductor device performance, and/or to optimize the semiconductor device yield and throughput. Furthermore, blindly minimizing non-adaptive processing spreads about target values may not increase processing yield and throughput.

Traditional control techniques are frequently ineffective in reducing off-target processing and in improving sort yields. For example, wafer electrical test (WET) measurements are typically not performed on processed wafers until quite a long time after the wafers have been processed, sometimes not until weeks later. When one or more of the processing steps are producing resulting wafers that the wafer electrical test (WET) measurements indicate are unacceptable, causing the resulting wafers to be scrapped, this misprocessing goes undetected and uncorrected for quite a while, often for weeks, leading to many scrapped wafers, much wasted material and decreased overall throughput.

Metrology operations require a significant amount of capital and consume large amounts of cycle time in semiconductor manufacturing. Optimizing metrology may therefore significantly improve "fab" capital requirements and operating costs. However, traditional methods of optimization are often based on ad hoc decisions and/or in some cases, careful statistical analysis to determine a "best" sampling rate for a given process/operation, balancing the improvements in control associated with increased sampling against the increased costs of such sampling.

The present invention is directed to overcoming, or at least reducing the effects of, one or more of the problems set forth above.

SUMMARY OF THE INVENTION

In one aspect of the present invention, a method is provided, the method comprising sampling at least one parameter characteristic of processing performed on a workpiece in at least one processing step, and modeling the at least one characteristic parameter sampled using an adaptive sampling processing model, treating sampling as an integrated part of a dynamic control environment, varying the sampling based upon at least one of situational information, upstream events and requirements of run-to-run controllers. The method also comprises applying the adaptive sampling processing model to modify the processing performed in the at least one processing step.

In another aspect of the present invention, a computer-readable, program storage device is provided, encoded with instructions that, when executed by a computer, perform a method, the method comprising sampling at least one parameter characteristic of processing performed on a workpiece in at least one processing step, and modeling the at least one characteristic parameter sampled using an adaptive sampling processing model, treating sampling as an integrated part of a dynamic control environment, varying the sampling based upon at least one of situational information, upstream events and requirements of run-to-run controllers. The method also comprises applying the adaptive sampling processing model to modify the processing performed in the at least one processing step.

In yet another aspect of the present invention, a computer programmed to perform a method is provided, the method comprising sampling at least one parameter characteristic of processing performed on a workpiece in at least one processing step, and modeling the at least one characteristic parameter sampled using an adaptive sampling processing model, treating sampling as an integrated part of a dynamic control environment, varying the sampling based upon at least one of situational information, upstream events and requirements of run-to-run controllers. The method also comprises applying the adaptive sampling processing model to modify the processing performed in the at least one processing step.

In another aspect of the present invention, a system is provided, the system comprising a tool for sampling at least one parameter characteristic of processing performed on a workpiece in at least one processing step, and a computer for modeling the at least one characteristic parameter sampled using an adaptive sampling processing model, treating sampling as an integrated part of a dynamic control environment, varying the sampling based upon at least one of situational information, upstream events and requirements of run-to-run controllers. The system also comprises a controller for applying the adaptive sampling processing model to modify the processing performed in the at least one processing step.

In yet another aspect of the present invention, a device is provided, the device comprising means for sampling at least one parameter characteristic of processing performed on a workpiece in at least one processing step, and means for modeling the at least one characteristic parameter sampled using an adaptive sampling processing model, treating sampling as an integrated part of a dynamic control environment, varying the sampling based upon at least one of situational information, upstream events and requirements of run-to-run controllers. The device also comprises means for applying the adaptive sampling processing model to modify the processing performed in the at least one processing step.

BRIEF DESCRIPTION OF THE DRAWINGS

The invention may be understood by reference to the following description taken in conjunction with the accompanying drawings, in which the leftmost significant digit(s) in the reference numerals denote(s) the first figure in which the respective reference numerals appear, and in which:

FIGS. 1, and 3–10 schematically illustrate a flow chart for various illustrative embodiments of a method according to the present invention;

FIG. 2 schematically illustrates in cross-section an AST SHS 2800 rapid thermal processing (RTP) tool representative of those used in various illustrative embodiments of the present invention;

FIG. 11 schematically illustrates a method for fabricating a semiconductor device practiced in accordance with the present invention;

FIG. 12 schematically illustrates workpieces being processed using a processing tool, using a plurality of control input signals, in accordance with the present invention;

FIGS. 13–14 schematically illustrate one particular embodiment of the process and tool in FIG. 12;

FIG. 15 schematically illustrates one particular embodiment of the method of FIG. 11 that may be practiced with the process and tool of FIGS. 13–14;

FIGS. 16 and 17 schematically illustrate first and second Principal Components for respective rapid thermal processing data sets;

FIGS. 18 and 19 schematically illustrate geometrically Principal Components Analysis for respective rapid thermal processing data sets; and FIGS. 20–23 schematically illustrate geometrically polynomial least-squares fitting, in accordance with the present invention. Percent deviaion from target: hypothetical best case;

FIG. 24 schematically illustrates simulation of product switching;

FIG. 25 schematically illustrates percent deviation from target: hypothetical best case;

FIG. 26 schematically illustrates percent deviation from target: "fixed outputs" case;

FIG. 27 schematically illustrates percent deviation from target: "predicted outputs" case;

FIG. 28 schematically illustrates percent deviation from target: "predicted outputs" case with extra qualifications;

FIG. 29 schematically illustrates percent deviation from target: large-scale system; and FIG. 30 is a simplified block diagram of a manufacturing system in accordance with various illustrative embodiments of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
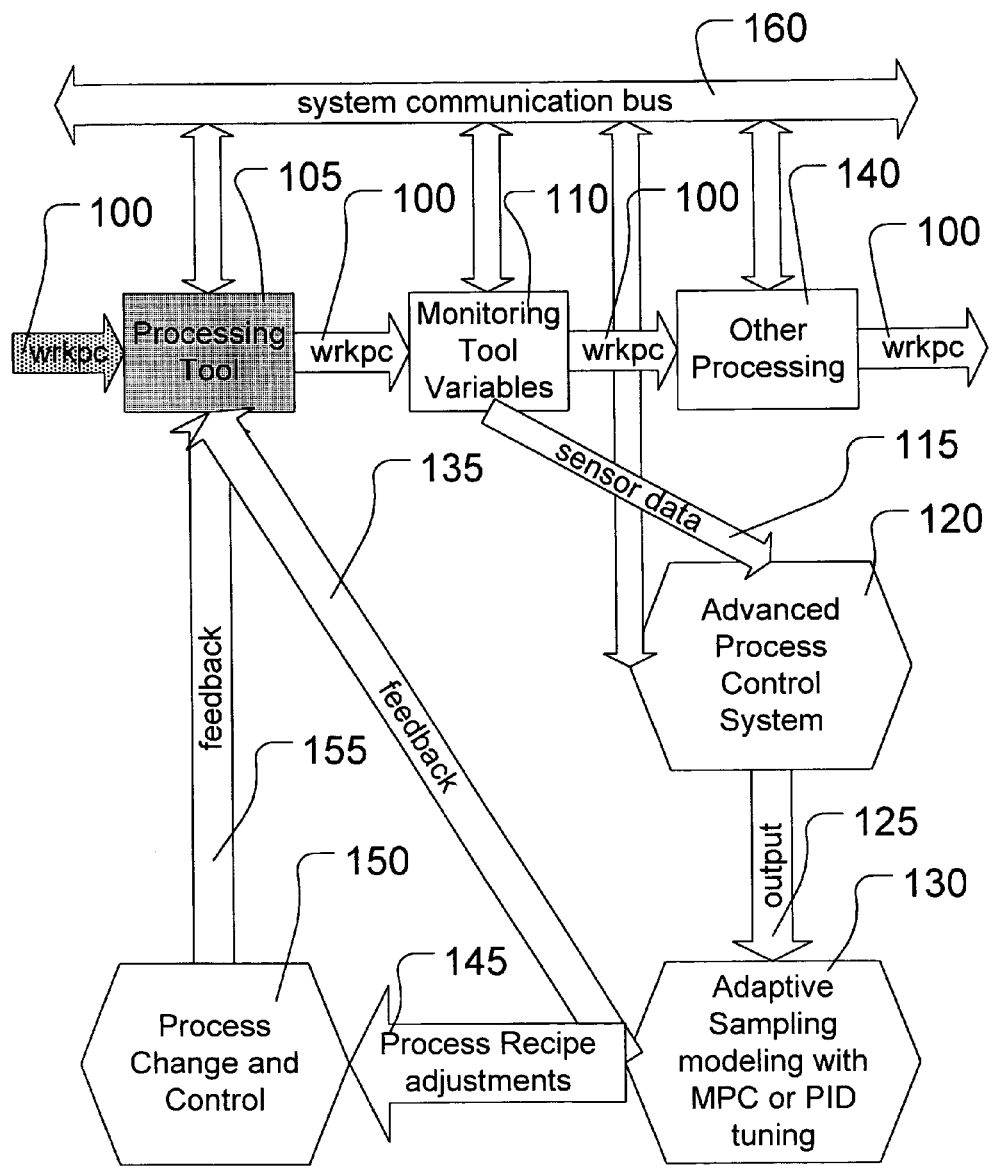
FIGS. 1–30 schematically illustrate various embodiments of a method for manufacturing according to the present invention; and, more particularly.

Illustrative embodiments of a method according to the present invention are shown in FIGS. 1–30. As shown in FIG. 1, a workpiece 100, such as a semiconducting substrate or wafer, having zero, one, or more process layers and/or semiconductor devices, such as a metal-oxide-semiconductor (MOS) transistor disposed thereon, is delivered to a processing tool 105. In the processing tool 105, rapid thermal processing, for example, such as a rapid thermal anneal, may be performed on the workpiece 100.

Figure 2:
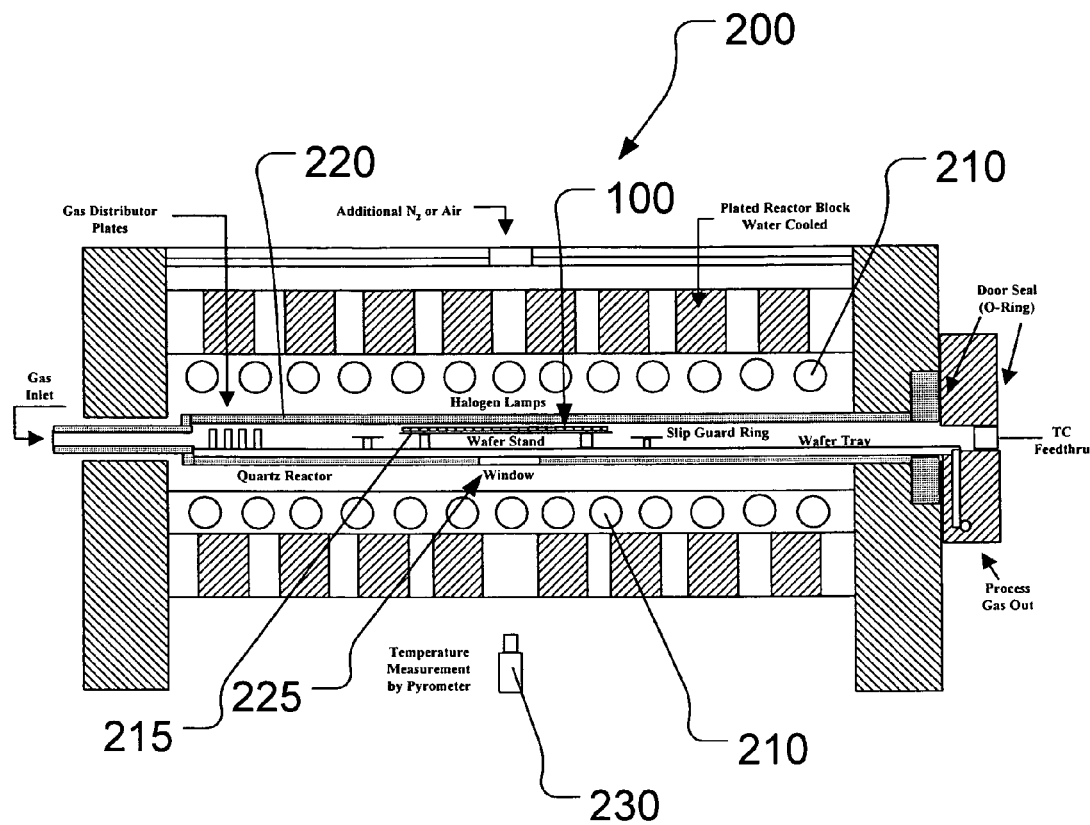

FIG. 2 schematically illustrates in cross-section a rapid thermal anneal (RTA) tool 200, e.g., an AST SHS 2800 rapid thermal anneal (RTA) tool, that may be used as the rapid thermal processing (RTP) tool 105 in various illustrative embodiments according to the present invention. Various alternative illustrative embodiments of the present invention may use rapid thermal anneal (RTA) tools (such as the Centura® RTP) manufactured by Applied Materials (AMAT), which are quite different in physical form, usage, and measured parameters, but which may, nevertheless, be used as the rapid thermal processing (RTP) tool 105. Still other various alternative illustrative embodiments of the present invention may use an etching tool and/or a planarizing tool and/or a deposition tool, and the like, as the processing tool 105.

As shown in FIG. 2, the illustrative rapid thermal anneal (RTA) tool 200 may heat a workpiece 100, such as a semiconducting silicon wafer with zero, one, or more process layers formed thereon, by using an array of halogen lamps 210 disposed above and below the workpiece 100. The workpiece 100 may be disposed on quartz pins and a wafer stand 215 within a quartz tube 220 heated by the array of halogen lamps 210. The wafer stand 215 may include other components, such as an AST Hot Liner™. The temperature of the quartz tube 220 may be measured by a thermocouple and/or a pyrometer 230 that measures the temperature of the AST Hot Liner™ component of the wafer stand 215 and/or a separate pyrometer (not shown). The quartz tube 220 may have a quartz window 225 disposed therein below the wafer stand 215. The temperature of the AST Hot Liner™ component of the wafer stand 215 and, indirectly, the workpiece 100 may be measured through the quartz window 225 by the pyrometer 230 disposed below the quartz window 225. Alternatively, the pyrometer 230 disposed below the quartz window 225 may directly measure the temperature of the workpiece 100. The lamp power of the halogen lamps 210 may also be monitored and controlled.

Figure 3:
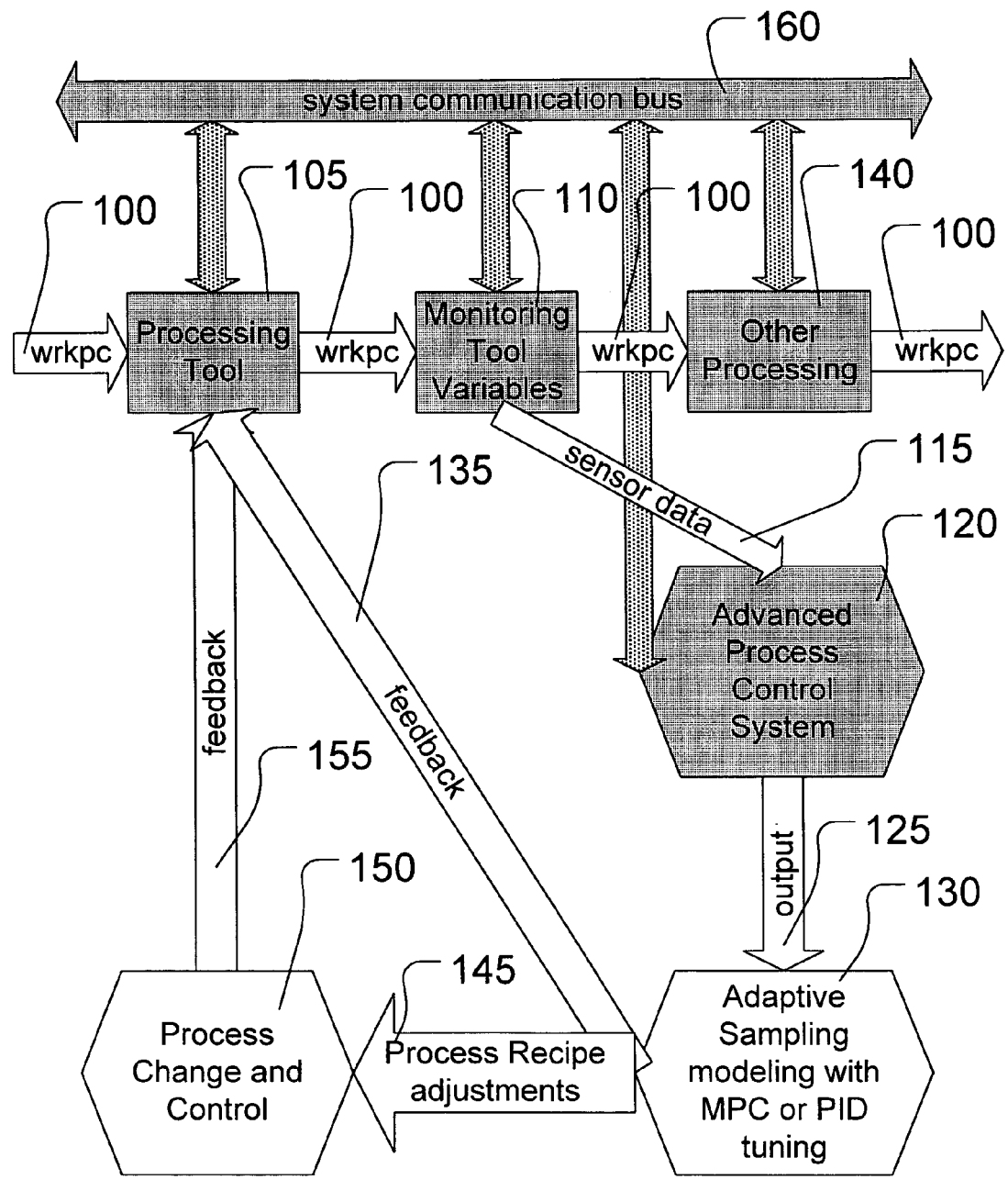

As shown in FIG. 3, the processing tool 105 may communicate with a monitoring step 110 and other processing steps 140 via bidirectional connections through a system communications bus 160. As shown in FIG. 3, the system communications bus 160 also provides communications between the processing tool 105, the monitoring step 110 and other processing steps 140, and an Advanced Process Control (APC) system 120, more fully described below.

Figure 4:
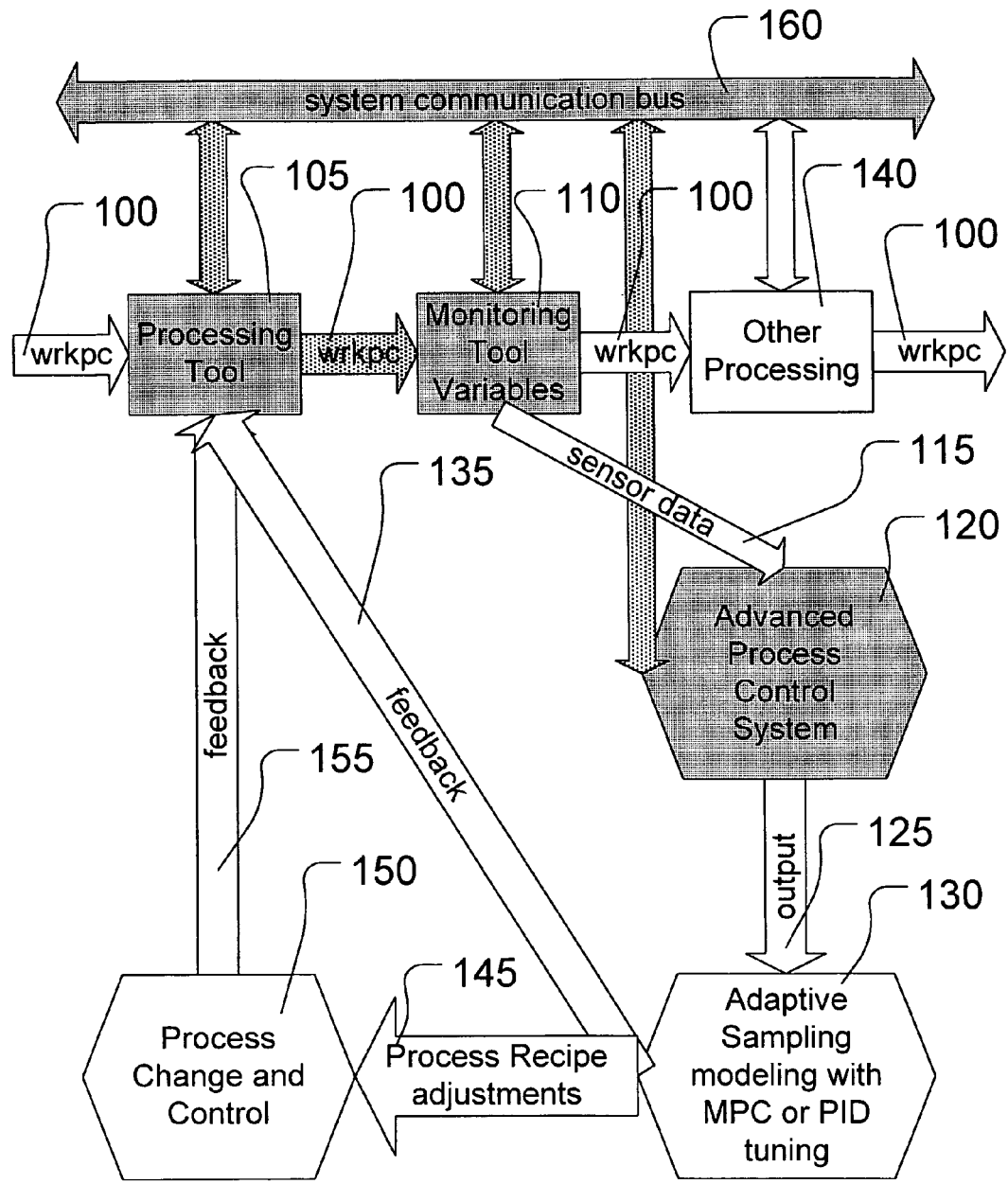

As shown in FIG. 4, the workpiece 100 is sent from the processing tool 105 and delivered to the monitoring step 110. In the monitoring step 110, one or more processing tool variables and/or one or more processing parameters during one or more processing runs may be monitored and/or measured. Such tool variables and/or processing parameters may comprise one or more pyrometer trace readings, one or more lamp power trace readings, one or more tube temperature trace readings, one or more current readings, one or more infrared (IR) signal readings, one or more optical emission spectrum readings, one or more process gas temperature readings, one or more process gas pressure readings, one or more process gas flow rate readings, one or more etch depths, one or more process layer thicknesses, one or more resistivity readings, and the like. As shown in FIG. 4, the monitoring step 110 may communicate with the processing tool 105 via the system communications bus 160. As shown in FIG. 4, the system communications bus 160 also provides communications between the processing tool 105, the monitoring step 110, and the Advanced Process Control (APC) system 120, more fully described below.

Figure 5:
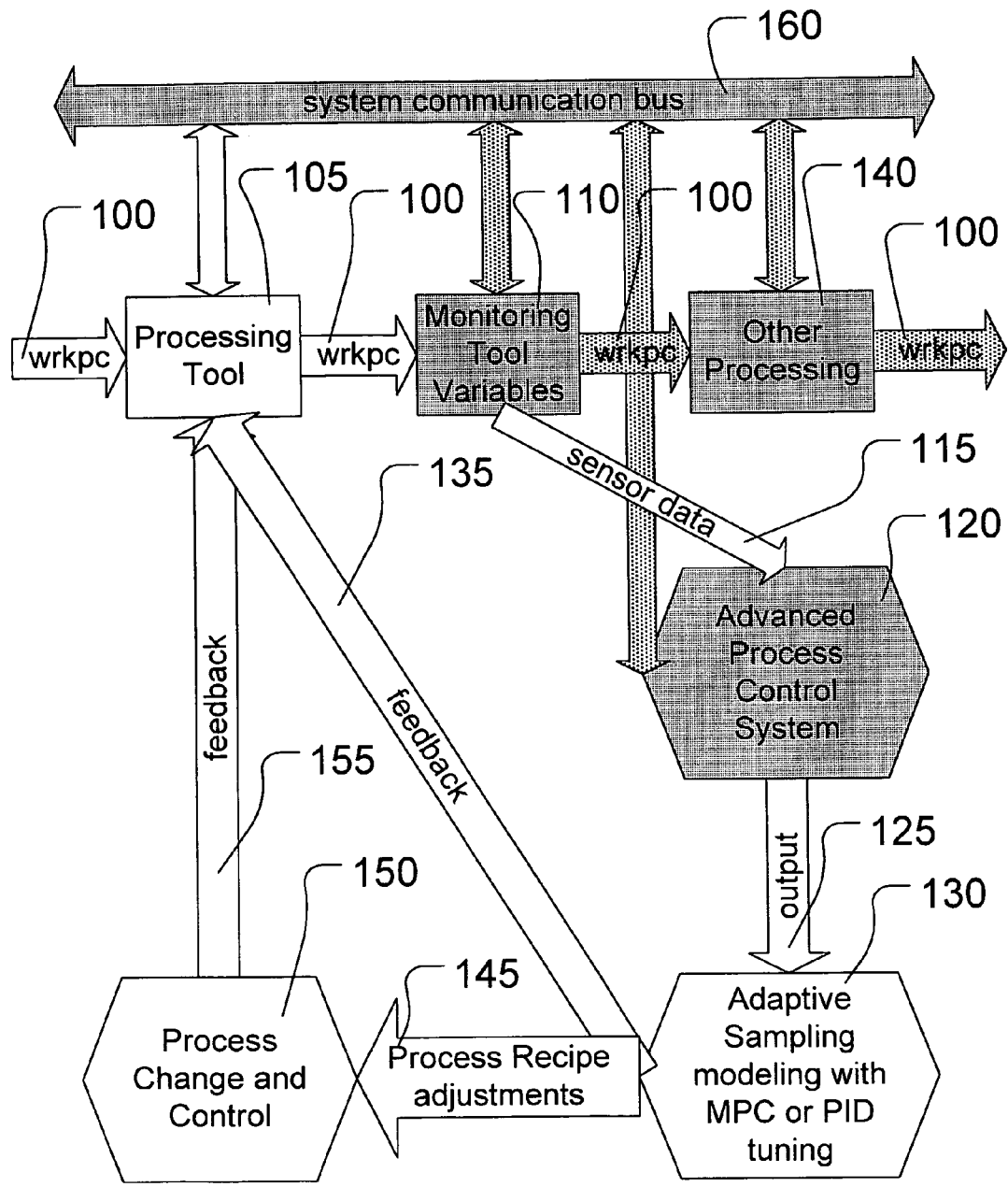

As shown in FIG. 5, the workpiece 100 progresses from the monitoring step 110 to the other processing steps 140. In the other processing steps 140, other processing may be performed on the workpiece 100 to produce the finished workpiece 100. In alternative illustrative embodiments, the workpiece 100 sent from the monitoring step 110 may be the finished workpiece 100, in which case, there may not be other processing steps 140. As shown in FIG. 5, the other processing steps 140 may communicate with the monitoring step 110 via the system communications bus 160. As shown in FIG. 5, the system communications bus 160 also provides communications between the monitoring step 110, the other processing steps 140, and the Advanced Process Control (APC) system 120, more fully described below.

Figure 6:
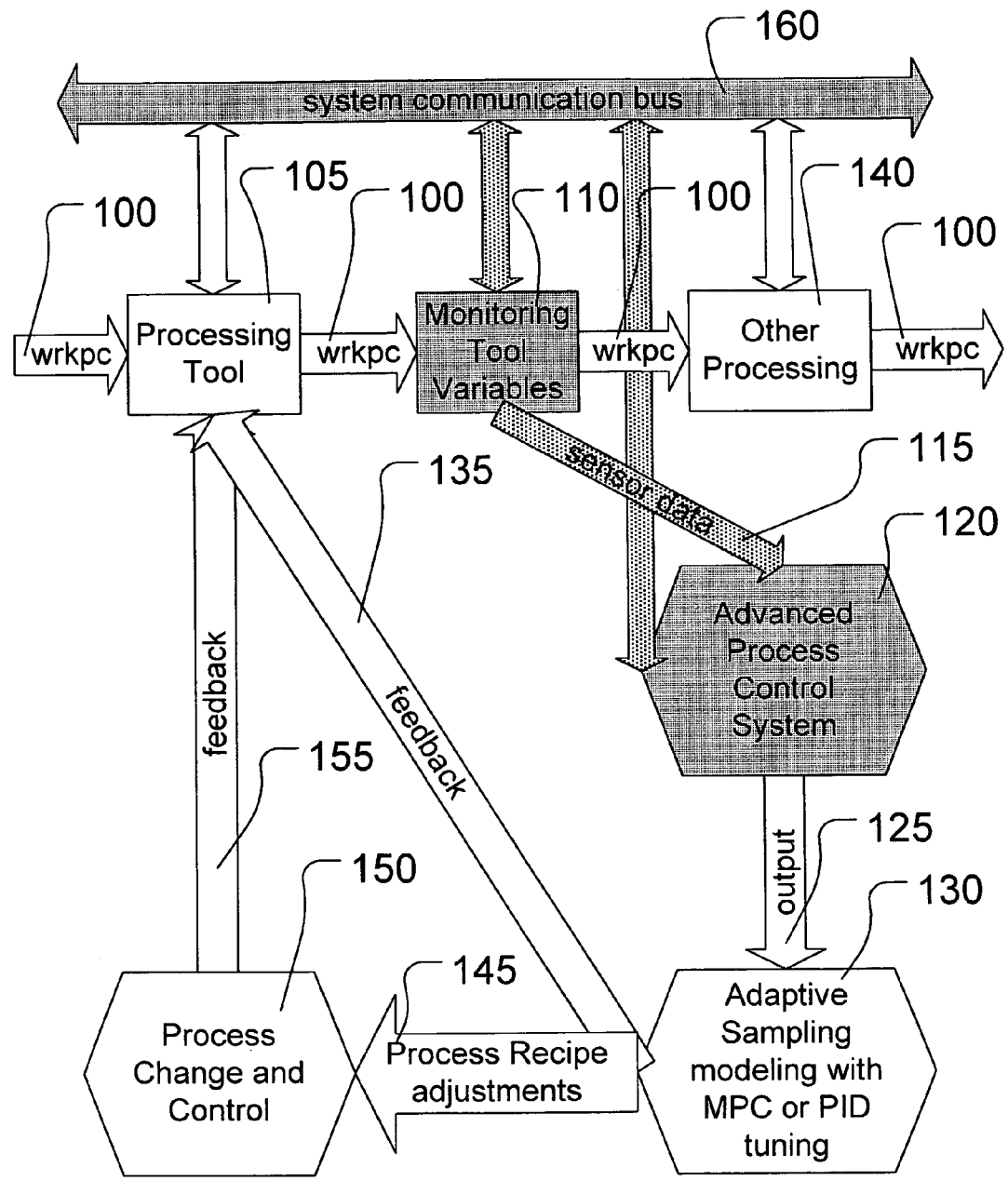

As shown in FIG. 6, monitored sensor data 115 is sent from the monitoring step 110 and delivered to the Advanced Process Control (APC) system 120. As shown in FIG. 6, the Advanced Process Control (APC) system 120 may communicate with the monitoring step 110 via the system communications bus 160. Delivering the monitored sensor data 115 to the Advanced Process Control (APC) system 120 produces an output signal 125.

Figure 7:
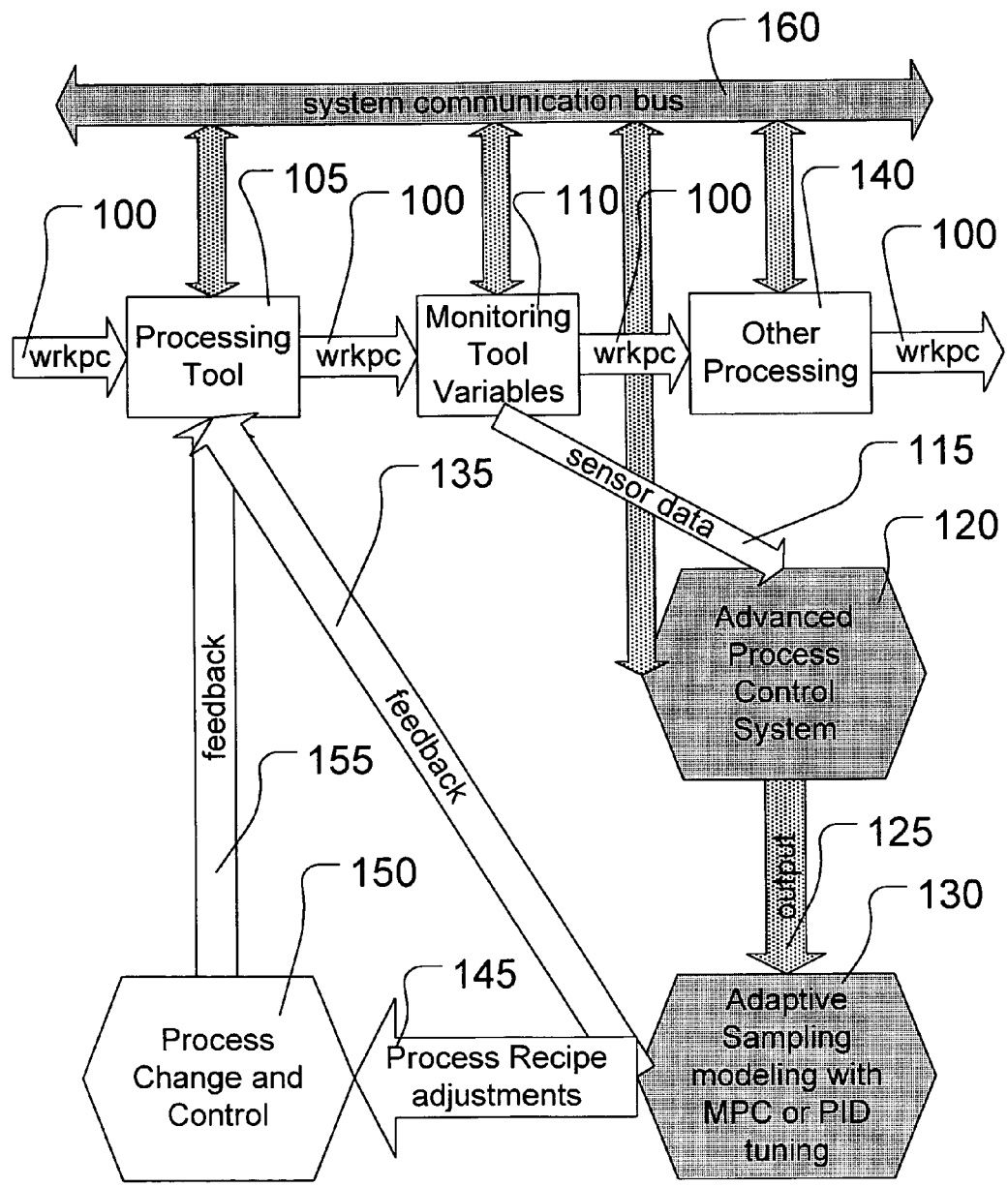

As shown in FIG. 7, the output signal 125 is sent from the Advanced Process Control (APC) system 120 and delivered to an adaptive sampling processing modeling with model predictive control (MPC) or proportional-integral-derivative (PID) tuning step 130. In the adaptive sampling processing modeling with model predictive control (MPC) or proportional-integral-derivative (PID) tuning step 130, the monitored sensor data 115 may be used in an adaptive sampling processing model, appropriate for the processing performed on the workpiece 100 in the processing tool 105. In various alternative illustrative embodiments of the present invention, an adaptive sampling processing modeling step 130 may be provided without model predictive control (MPC) tuning or proportional-integral-derivative (PID) tuning.

For example, such adaptive sampling processing models may provide a significant improvement in sampling methodology by treating sampling as an integrated part of the performed on the workpiece 100 to produce the finished workpiece 100. In alternative illustrative embodiments, the workpiece 100 sent from the monitoring step 110 may be the finished workpiece 100, in which case, there may not be other processing steps 140. As shown in FIG. 5, the other processing steps 140 may communicate with the monitoring step 110 via the system communications bus 160. As shown in FIG. 5, the system communications bus 160 also provides communications between the monitoring step 110, the other processing steps 140, and the Advanced Process Control (APC) system 120, more fully described below.

As shown in FIG. 6, monitored sensor data 115 is sent from the monitoring step 110 and delivered to the Advanced Process Control (APC) system 120. As shown in FIG. 6, the Advanced Process Control (APC) system 120 may communicate with the monitoring step 110 via the system communications bus 160. Delivering the monitored sensor data 115 to the Advanced Process Control (APC) system 120 produces an output signal 125.

As shown in FIG. 7, the output signal 125 is sent from the Advanced Process Control (APC) system 120 and delivered to an adaptive sampling processing modeling with model predictive control (MPC) or proportional-integral-derivative (PID) tuning step 130. In the adaptive sampling processing modeling with model predictive control (MPC) or proportional-integral-derivative (PID) tuning step 130, the monitored sensor data 115 may be used in an adaptive sampling processing model, appropriate for the processing performed on the workpiece 100 in the processing tool 105. In various alternative illustrative embodiments of the present invention, an adaptive sampling processing modeling step 130 may be provided without model predictive control (MPC) tuning or proportional-integral-derivative (PID) tuning.

For example, such adaptive sampling processing models may provide a significant improvement in sampling methodology by treating sampling as an integrated part of the dynamic control environment of Advanced Process Control (APC) systems. Rather than applying a static "optimum" sampling rate, sampling is treated as a dynamic variable that is increased or decreased based upon (1) situational information, such as the amount and/or rate of change in the variation in recent data, (2) events, such as maintenance and/or changes in the process upstream of the operation, and/or (3) requirements of closed-loop run-to-run controllers in their schemes to identify control model parameters. The use of the monitored sensor data 115 in an adaptive sampling processing model produces one or more processing recipe adjustments 145.

In various illustrative embodiments, an adaptive sampling processing model may be built by various illustrative techniques, as described more fully below. Such an adaptive sampling processing model may also be formed by monitoring one or more processing tool variables and/or one or more processing parameters during one or more processing runs. As described above, examples of such processing tool variables and/or processing parameters may comprise one or more pyrometer trace readings, one or more lamp power trace readings, one or more tube temperature trace readings, one or more current readings, one or more infrared (IR) signal readings, one or more optical emission spectrum readings, one or more process gas temperature readings, one or more process gas pressure readings, one or more process gas flow rate readings, one or more etch depths, one or more process layer thicknesses, one or more resistivity readings, and the like. In these various illustrative embodiments, building the adaptive sampling processing models may comprise fitting collected processing data using at least one of polynomial curve fitting, least-squares fitting, polynomial least-squares fitting, non-polynomial least-squares fitting, weighted least-squares fitting, weighted polynomial least-squares fitting, weighted non-polynomial least-squares fitting, Partial Least Squares (PLS), and Principal Components Analysis (PCA), as described more fully below.

In various illustrative embodiments, the adaptive sampling processing model may incorporate at least one model predictive control (MPC) controller, or at least one proportional-integral-derivative (PID) controller, having at least one tuning parameter. In various of these illustrative embodiments, the adaptive sampling processing model, appropriate for processing, may incorporate at least one closed-loop model predictive control (MPC) controller, or at least one closed-loop proportional-integral-derivative (PID) controller, having at least one tuning parameter. The model predictive control (MPC) controller or the proportional-integral-derivative (PID) controller tuning parameter(s) may be optimized based on an objective function that minimizes undesirable processing conditions in the processing performed on the workpiece 100 in the processing tool 105.

An optimal control problem is to determine the set of inputs that extremize (minimize or maximize) an objective function while satisfying the constraints of the system model and any additional process requirements. Mathematically, this may be described by min $f(x,u,t)$ subject to the constraint(s) that $g_i(x,u,t) \geq 0$, where x represents the system state variables (such as deviations from target values, uncertainty in parameter estimates, cost(s) of material(s) needed, and the like), u represents the alterable input(s), t represents the time, and i labels the constraint(s). These mathematical relations may appear to be very simple, but they are very general and are not limited to describing simple systems. The constraint equations may include differential equations and/or difference equations that govern the process(es) as well as the operating limits that are imposed on the process(es) input(s) and state(s).

For most real processes, this problem results in a set of nonlinear differential equations with mixed boundary conditions. Optimal solutions have been derived for some simple process models. One class of such problems is linear (model), quadratic (objective function), Gaussian (noise) systems (LQG systems). For linear quadratic Gaussian (LQG) systems, an optimal controller may be derived. In general, for real processes, a sub-optimal controller may have to suffice, since the "true" model of the system is either unknown and/or too complicated to have an analytic solution. One approach is to assume the system is a linear quadratic Gaussian (LQG) system and to use the corresponding linear controller as an approximate solution.

For example, a model predictive control (MPC) controller or a proportional-integral-derivative (PID) controller may be designed to generate an output that causes some corrective effort to be applied to the processing performed on the workpiece 100 in the processing tool 105 to drive one or more measurable processing tool variable and/or one or more processing parameter toward a respective desired value known as the setpoint. The model predictive control (MPC) controller or the proportional-integral-derivative (PID) controller may generate the output that causes the corrective effort by monitoring and/or measuring and/or observing the error between the setpoint and a measurement of the respective processing tool variable(s) and/or processing parameter(s).

For example, a proportional-integral-derivative (PID) controller may look at the current value of the error e(t), the integral of the error e(t) over a recent time interval, and the current value of the derivative of the error e(t) with respect to time to determine how much of a correction to apply and for how long. Multiplying each of these terms by a respective tuning constant and adding them together generates the proportional-integral-derivative (PID) controller current output CO(t) given by the expression $$CO(t) = P(e(t)) + I\left(\int e(t)dt\right) + D\left(\frac{d}{dt}e(t)\right),$$

where P is the proportional tuning constant, I is the integral tuning constant, D is the derivative tuning constant, and the error e(t) is the difference between the setpoint SP(t) and the process variable PV(t) at time t, e(t)=SP(t)−PV(t). If the current error e(t) is large and/or the error e(t) has been large for a long time and/or the current error e(t) is changing rapidly, the current controller output CO(t) may also be large. However, if the current error e(t) is small, the error e(t) has been small for a long time, and the current error e(t) is changing slowly, the current controller output CO(t) may also be small.

In various alternative illustrative embodiments, the proportional-integral-derivative (PID) controller current output CO(t) may be given by the alternative expression $$CO(t) = P\left[e(t) + \frac{1}{T_1}\left(\int e(t)dt\right) - T_D\left(\frac{d}{dt}PV(t)\right)\right],$$

where P is an overall tuning constant, $T_1$ is the integral time tuning constant, $T_D$ is the derivative time tuning constant, and the error e(t) is the difference between the setpoint SP(t) and the process variable PV(t) at time t, e(t)=SP(t)-PV(t). In these alternative illustrative embodiments, there are fewer abrupt changes in the proportional-integral-derivative (PID) controller current output CO(t) when there is a change to the setpoint SP(t), due to the dependence on the time derivative of the process variable PV(t), rather than on the time derivative of the error e(t)=SP(t)−PV(t).

The proportional-integral-derivative (PID) controller current output CO(t) tuning constants P, I, and D, and/or P, $T_1$, and $T_D$, may be tuned appropriately. Using aggressively large values for the tuning constants P, I, and D, and/or P, $T_1$, and $T_D$, may amplify the error e(t) and overcompensate and overshoot the setpoint(s). Using conservatively small values for the tuning constants P, I, and D, and/or P, $T_1$, and $T_D$, may reduce the error e(t) too slowly and undercompensate and undershoot the setpoint(s). Appropriately tuned proportional-integral-derivative (PID) controller current output CO(t) tuning constants P, I, and D, and/or P, $T_1$, and $T_D$, may lie between these two extremes. The proportional-integral-derivative (PID) controller current output CO(t) tuning constants P, I, and D, and/or P, $T_1$, and $T_D$, may be tuned appropriately using trial-and-error tweaking, using a more rigorous analytical approach involving mathematical modeling, as described more fully below, and/or using techniques such as the Ziegler-Nichols "open loop" and "closed loop" tuning techniques.

The adaptive sampling processing modeling of the monitored sensor data 115 in the adaptive sampling processing modeling with model predictive control (MPC) or proportional-integral-derivative (PID) tuning step 130, may be used to alert an engineer of the need to adjust the processing performed in any of a variety of processing steps, such as the processing tool 105 and/or the other processing steps 140. The engineer may also alter and/or adjust, for example, the setpoints for the processing performed in the processing tool 105, and/or the processing tool variable(s) and/or processing parameter(s) monitored and/or measured in the monitoring step 110.

Figure 8:
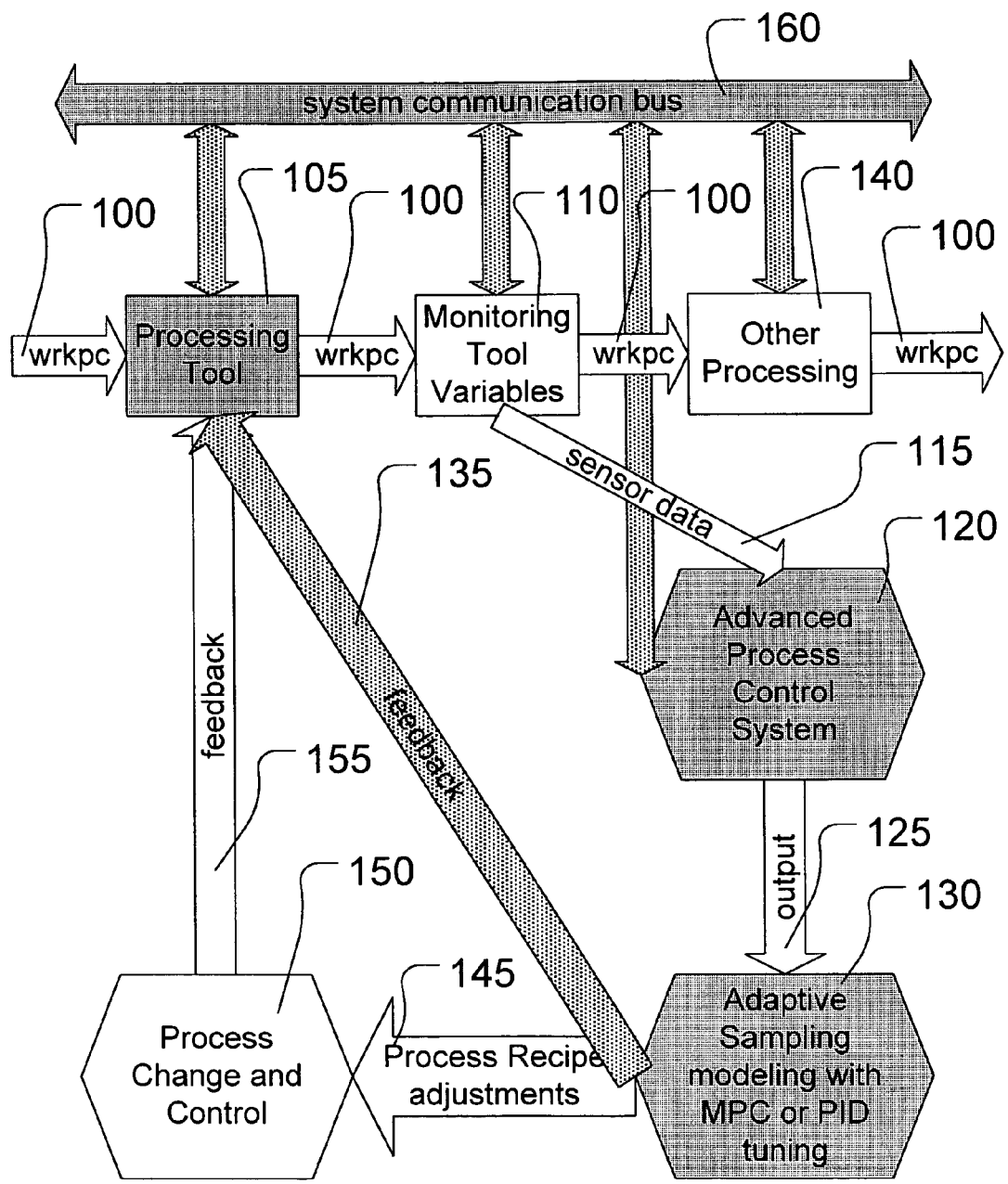

As shown in FIG. 8, a feedback control signal 135 may be sent from the adaptive sampling processing modeling with model predictive control (MPC) or proportional-integral-derivative (PID) tuning step 130 to the processing tool 105 to adjust the processing performed in the processing tool 10S. In various alternative illustrative embodiments, the feedback control signal 135 may be sent from the adaptive sampling processing modeling with model predictive control (MPC) or proportional-integral-derivative (PID) tuning step 130 to any of the other processing steps 140 to adjust the processing performed in any of the other processing steps 140, for example, via the system communications bus 160 that provides communications between the processing tool 105, the monitoring step 110, the other processing steps 140, and the Advanced Process Control (APC) system 120, more fully described below.

Figure 9:
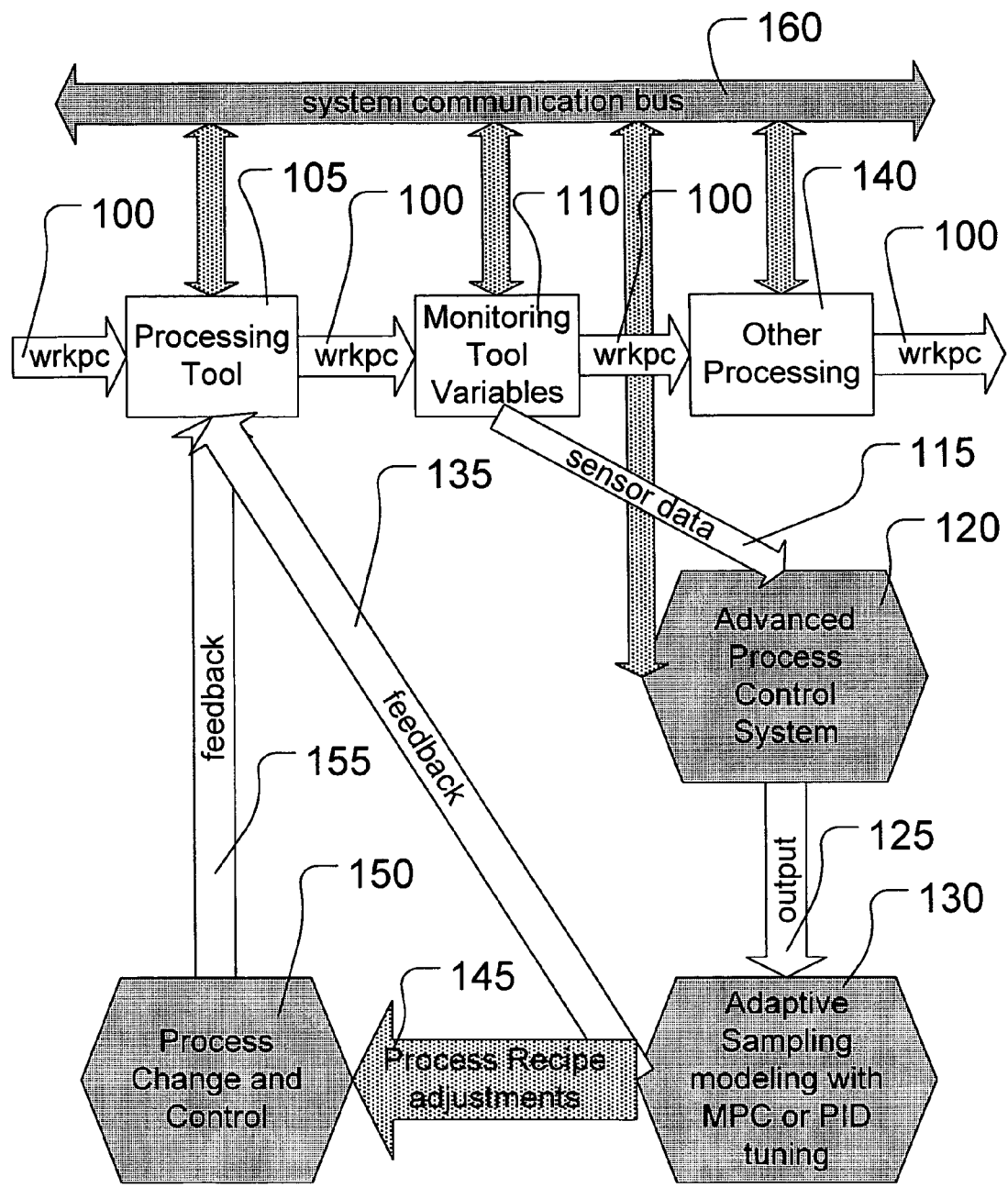
Figure 10:
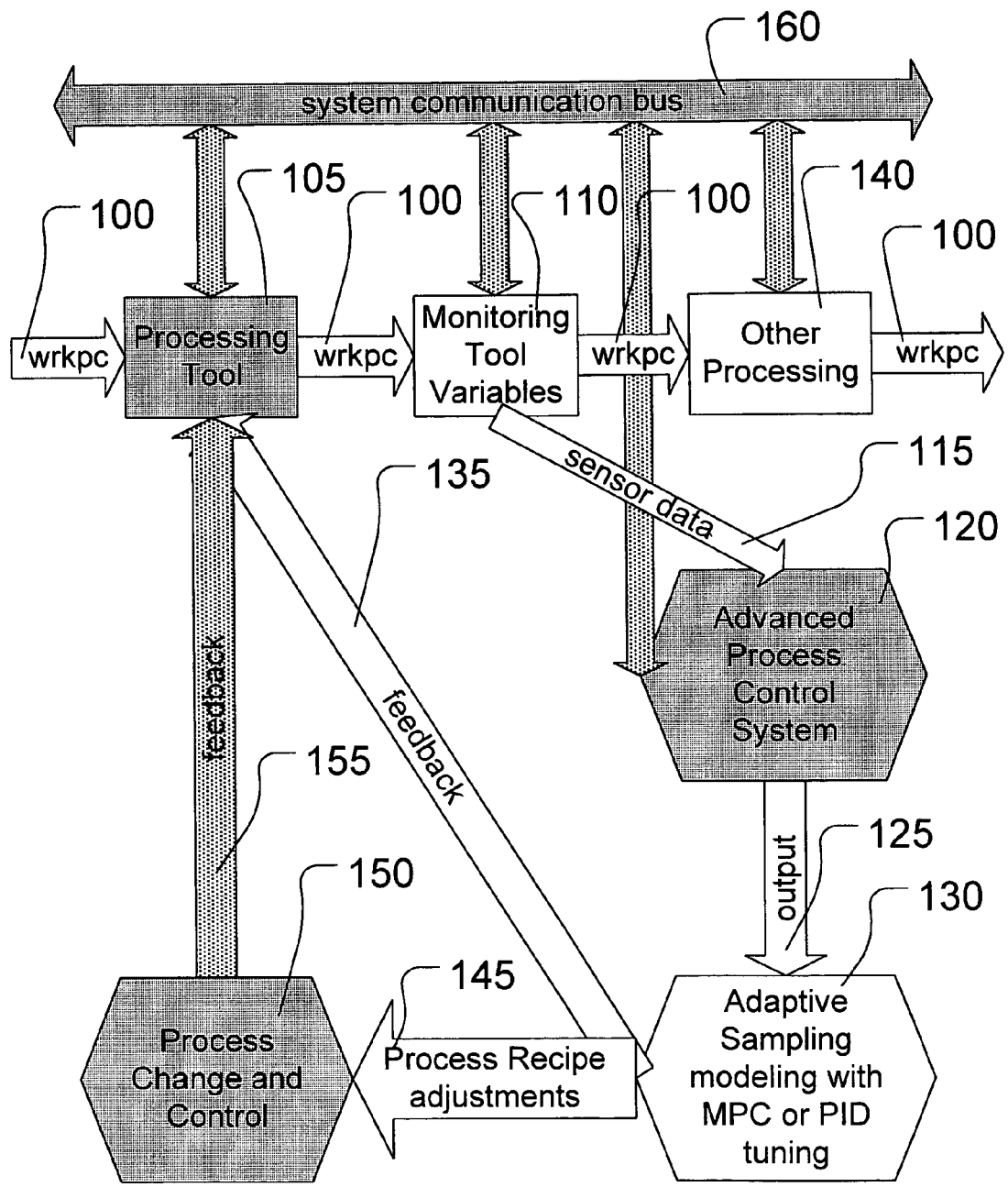

As shown in FIG. 9, in addition to, and/or instead of, the feedback control signal 135, the one or more processing recipe adjustments 145, and/or an entire appropriate recipe based upon this analysis, may be sent from the adaptive sampling processing modeling with model predictive control (MPC) or proportional-integral-derivative (PID) tuning step 130 to a processing process change and control step 150. In the processing process change and control step 150, the one or more processing recipe adjustments 145 may be used in a high-level supervisory control loop. Thereafter, as shown in FIG. 10, a feedback control signal 155 may be sent from the processing process change and control step 150 to the processing tool 105 to adjust the processing performed in the processing tool 105. In various alternative illustrative embodiments, the feedback control signal 155 may be sent from the processing process change and control step 150 to any of the other processing steps 140 to adjust the processing performed in any of the other processing steps 140, for example, via the system communications bus 160 that provides communications between the processing tool 105, the monitoring step 110, the other processing steps 140, and the Advanced Process Control (APC) system 120, more fully described below.

In various illustrative embodiments, the engineer may be provided with advanced process data monitoring capabilities, such as the ability to provide historical parametric data in a user-friendly format, as well as event logging, real-time graphical display of both current processing parameters and the processing parameters of the entire run, and remote, i.e., local site and worldwide, monitoring. These capabilities may engender more optimal control of critical processing parameters, such as throughput accuracy, stability and repeatability, processing temperatures, mechanical tool parameters, and the like. This more optimal control of critical processing parameters reduces this variability. This reduction in variability manifests itself as fewer within-run disparities, fewer run-to-run disparities and fewer tool-to-tool disparities. This reduction in the number of these disparities that can propagate means fewer deviations in product quality and performance. In such an illustrative embodiment of a method of manufacturing according to the present invention, a monitoring and diagnostics system may be provided that monitors this variability and optimizes control of critical parameters.

Figure 11:
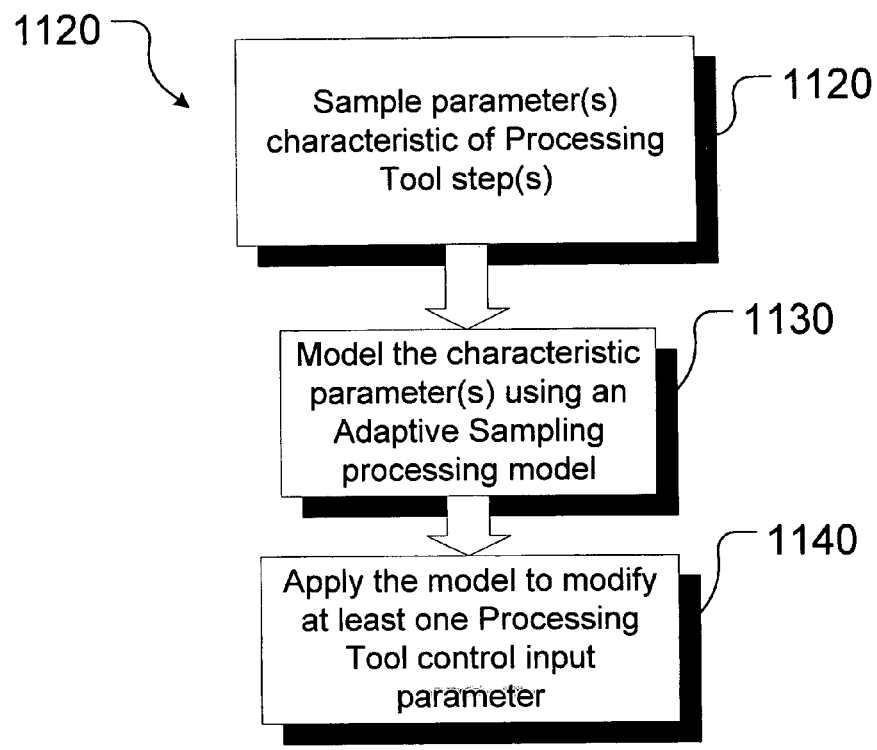
Figure 12:
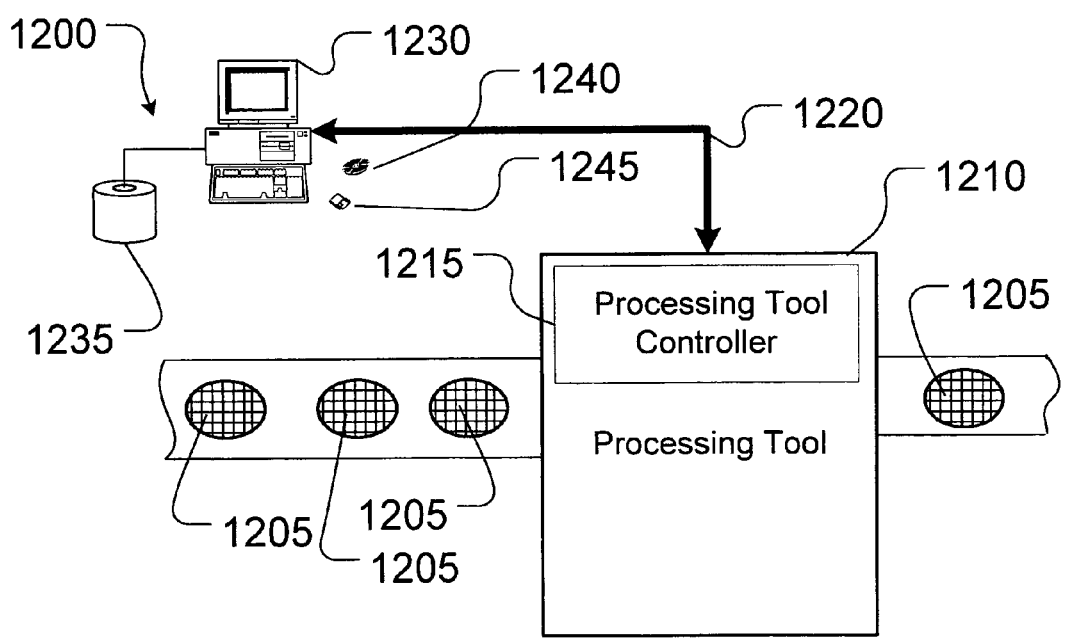

FIG. 11 illustrates one particular embodiment of a method 1100 practiced in accordance with the present invention. FIG. 12 illustrates one particular apparatus 1200 with which the method 1100 may be practiced. For the sake of clarity, and to further an understanding of the invention, the method 1100 shall be disclosed in the context of the apparatus 1200. However, the invention is not so limited and admits wide variation, as is discussed further below.

Referring now to both FIGS. 11 and 12, a batch or lot of workpieces or wafers 1205 is being processed through a processing tool 1210. The processing tool 1210 may be any processing tool known to the art, particularly if it comprises the requisite control capabilities. The processing tool 1210 comprises a processing tool controller 1215 for this control purpose. The nature and function of the processing tool controller 1215 will be implementation specific.

For instance, the processing tool controller 1215 may control processing control input parameters such as processing recipe control input parameters and/or setpoints. Four workpieces 1205 are shown in FIG. 12, but the lot of workpieces or wafers, i.e., the "wafer lot," may be any practicable number of wafers from one to any finite number.

The method 1100 begins, as set forth in box 1120, by sampling one or more parameters characteristic of the processing performed on the workpiece 1205 in the processing tool 1210. The nature, identity, and measurement of characteristic parameters will be largely implementation specific and even tool specific. For instance, capabilities for monitoring process parameters vary, to some degree, from tool to tool. Greater sensing capabilities may permit wider latitude in the characteristic parameters that are identified and measured and the manner in which this is done. Conversely, lesser sensing capabilities may restrict this latitude. In turn, the processing control input parameters such as the processing recipe control input parameters and/or the setpoints for workpiece temperature and/or lamp power and/or anneal time and/or process gas temperature and/or process gas pressure and/or process gas flow rate and/or radio frequency (RF) power and/or etch time and/or bias voltage and/or deposition time, and the like, may directly affect the effective yield of usable semiconductor devices from the workpiece 1205.

Turning to FIG. 12, in this particular embodiment, the processing process characteristic parameters are measured and/or monitored by tool sensors (not shown). The outputs of these tool sensors are transmitted to a computer system 1230 over a line 1220. The computer system 1230 analyzes these sensor outputs to identify the characteristic parameters.

Returning, to FIG. 11, once the characteristic parameter is identified and measured, the method 1100 proceeds by modeling the measured and identified characteristic parameter(s) using an adaptive sampling processing model (as described more fully below), as set forth in box 1130. The computer system 1230 in FIG. 12 is, in this particular embodiment, programmed to model the characteristic parameter(s). The manner in which this modeling occurs will be implementation specific.

In the embodiment of FIG. 12, a database 1235 stores a plurality of models that might potentially be applied, depending upon which characteristic parameter is measured. This particular embodiment, therefore, requires some a priori knowledge of the characteristic parameters that might be measured. The computer system 1230 then extracts an appropriate model from the database 1235 of potential models to apply to the measured characteristic parameters. If the database 1235 does not include an appropriate model, then the characteristic parameter may be ignored, or the computer system 1230 may attempt to develop one, if so programmed. The database 1235 may be stored on any kind of computer-readable, program storage medium, such as an optical disk 1240, a floppy disk 1245, or a hard disk drive (not shown) of the computer system 1230. The database 1235 may also be stored on a separate computer system (not shown) that interfaces with the computer system 1230.

Modeling of the measured characteristic parameter may be implemented differently in alternative embodiments. For instance, the computer system 1230 may be programmed using some form of artificial intelligence to analyze the sensor outputs and controller inputs to develop a model on-the-fly in a real-time implementation. This approach might be a useful adjunct to the embodiment illustrated in FIG. 12, and discussed above, where characteristic parameters are measured and identified for which the database 1235 has no appropriate model.

The method 1100 of FIG. 11 then proceeds by applying the model to modify at least one processing control input parameter, as set forth in box 1140. Depending on the implementation, applying the model may yield either a new value for a processing control input parameter or a correction to an existing processing control input parameter. In various illustrative embodiments, a multiplicity of control input recipes may be stored and an appropriate one of these may be selected based upon one or more of the determined parameters. The new processing control input is then formulated from the value yielded by the model and is transmitted to the processing tool controller 1215 over the line 1220. The processing tool controller 1215 then controls subsequent processing process operations in accordance with the new processing control inputs.

Some alternative embodiments may employ a form of feedback to improve the modeling of characteristic parameters. The implementation of this feedback is dependent on several disparate facts, including the tool's sensing capabilities and economics. One technique for doing this would be to monitor at least one effect of the model's implementation and update the model based on the effect(s) monitored. The update may also depend on the model. For instance, a linear model may require a different update than would a non-linear model, all other factors being the same.

As is evident from the discussion above, some features of the present invention may be implemented in software. For instance, the acts set forth in the boxes 1120–1140 in FIG. 11 are, in the illustrated embodiment, software-implemented, in whole or in part. Thus, some features of the present invention are implemented as instructions encoded on a computer-readable, program storage medium. The program storage medium may be of any type suitable to the particular implementation. However, the program storage medium will typically be magnetic, such as the floppy disk 1245 or the computer 1230 hard disk drive (not shown), or optical, such as the optical disk 1240. When these instructions are executed by a computer, they perform the disclosed functions. The computer may be a desktop computer, such as the computer 1230. However, the computer might alternatively be a processor embedded in the processing tool 1210. The computer might also be a laptop, a workstation, or a mainframe in various other embodiments. The scope of the invention is not limited by the type or nature of the program storage medium or computer with which embodiments of the invention might be implemented.

Thus, some portions of the detailed descriptions herein are, or may be, presented in terms of algorithms, functions, techniques, and/or processes. These terms enable those skilled in the art most effectively to convey the substance of their work to others skilled in the art. These terms are here, and are generally, conceived to be a self-consistent sequence of steps leading to a desired result. The steps are those requiring physical manipulations of physical quantities. Usually, though not necessarily, these quantities take the form of electromagnetic signals capable of being stored, transferred, combined, compared, and otherwise manipulated.

It has proven convenient at times, principally for reasons of common usage, to refer to these signals as bits, values, elements, symbols, characters, terms, numbers, and the like. All of these and similar terms are to be associated with the appropriate physical quantities and are merely convenient labels applied to these quantities and actions. Unless specifically stated otherwise, or as may be apparent from the discussion, terms such as "processing," "computing," "calculating," "determining," "displaying," and the like, used herein refer to the action(s) and processes of a computer system, or similar electronic and/or mechanical computing device, that manipulates and transforms data, represented as physical (electromagnetic) quantities within the computer system's registers and/or memories, into other data similarly represented as physical quantities within the computer system's memories and/or registers and/or other such information storage, transmission and/or display devices.

Figure 13:
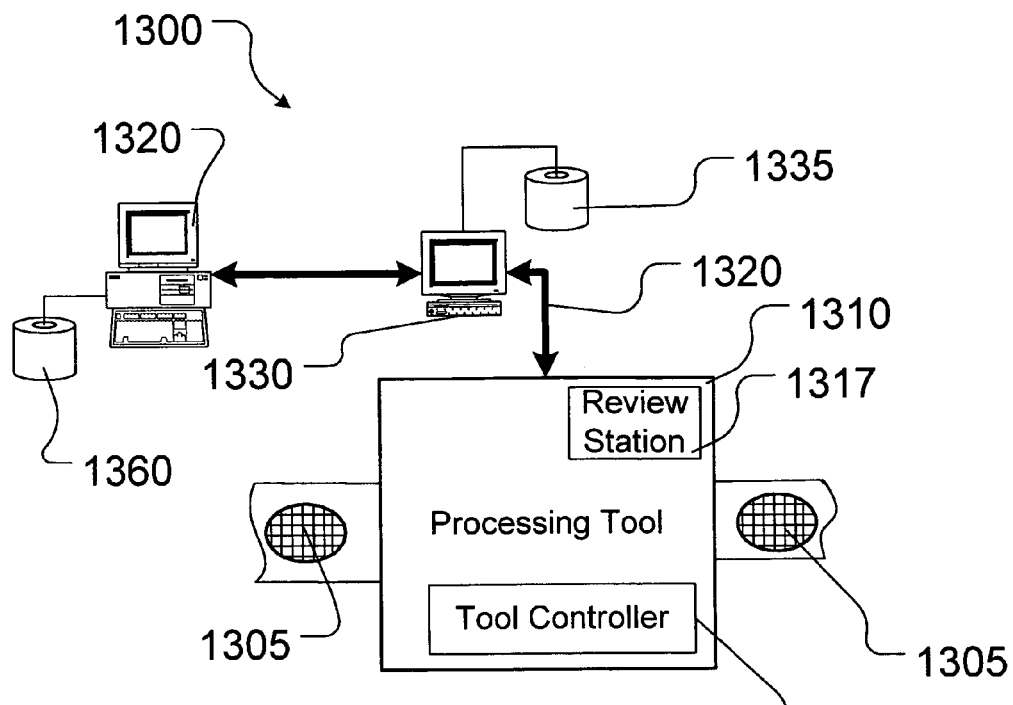
Figure 14:
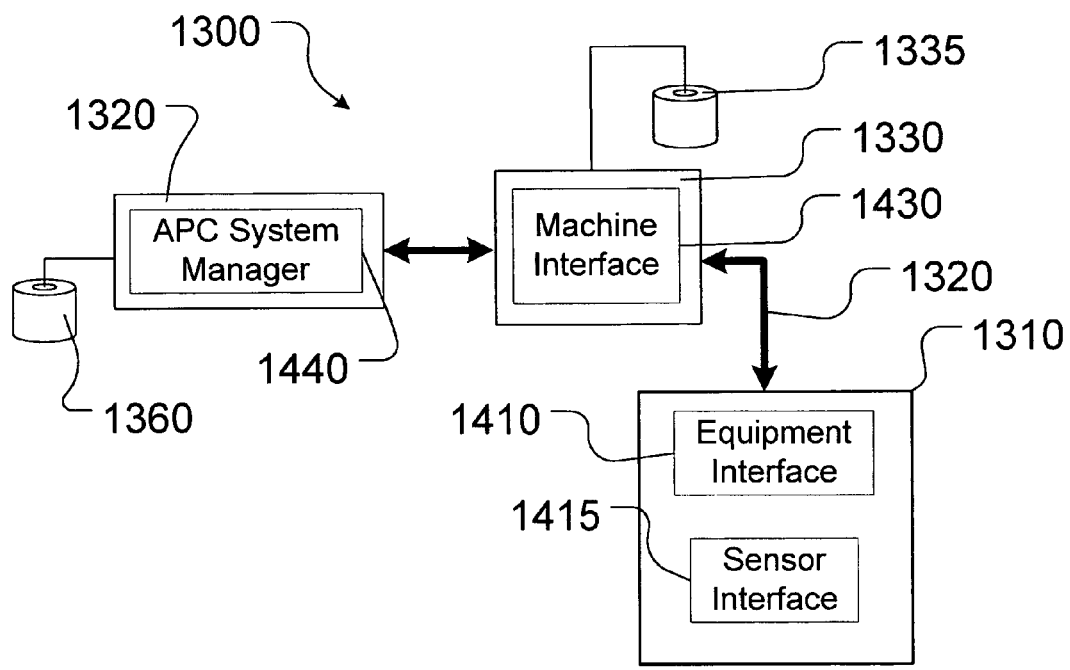

Construction of an Illustrative Apparatus. An exemplary embodiment 1300 of the apparatus 1200 in FIG. 12 is illustrated in FIGS. 13-14, in which the apparatus 1300 comprises a portion of an Advanced Process Control ("APC") system. FIGS. 13–14 are conceptualized, structural and functional block diagrams, respectively, of the apparatus 1300. A set of processing steps is performed on a lot of workpieces 1305 on a processing tool 1310. Because the apparatus 1300 is part of an Advanced Process Control (APC) system, the workpieces 1305 are processed on a run-to-run basis. Thus, process adjustments are made and held constant for the duration of a run, based on run-level measurements or averages. A "run" may be a lot, a batch of lots, or even an individual wafer.

In this particular embodiment, the workpieces 1305 are processed by the processing tool 1310 and various operations in the process are controlled by a plurality of processing control input signals on a line 1320 between the processing tool 1310 and a workstation 1330. Exemplary processing control inputs for this embodiment might include those for the setpoints for workpiece temperature, lamp power, anneal time, process gas temperature, process gas pressure, process gas flow rate, radio frequency (RF) power, etch time, bias voltage, deposition time, and the like.

When a process step in the processing tool 1310 is concluded, the semiconductor workpieces 1305 being processed in the processing tool 1310 are examined at a review station 1317. The review station 1317 need not be part of the processing tool 1310, but may, for example, be a separate tool and/or station. The processing control inputs generally affect the characteristic parameters of the semiconductor workpieces 1305 measured at the review station 1317, and, hence, the variability and properties of the acts performed by the processing tool 1310 on the workpieces 1305. Once errors are determined from the examination after the run of a lot of workpieces 1305, the processing control inputs on the line 1320 are modified for a subsequent run of a lot of workpieces 1305. Modifying the control signals on the line 1320 is designed to improve the next processing performed by the processing tool 1310. The modification is performed in accordance with one particular embodiment of the method 1100 set forth in FIG. 11, as described more fully below. Once the relevant processing control input signals for the processing tool 1310 are updated, the processing control input signals with new settings are used for a subsequent run of semiconductor devices.

Referring now to both FIGS. 13 and 14, the processing tool 1310 communicates with a manufacturing framework comprising a network of processing modules. One such module is an Advanced Process Control (APC) system manager 1440 resident on the computer 1340. This network of processing modules constitutes the Advanced Process Control (APC) system. The processing tool 1310 generally comprises an equipment interface 1410 and a sensor interface 1415. A machine interface 1430 resides on the workstation 1330. The machine interface 1430 bridges the gap between the Advanced Process Control (APC) framework, e.g., the Advanced Process Control (APC) system manager 1440, and the equipment interface 1410. Thus, the machine interface 1430 interfaces the processing tool 1310 with the Advanced Process Control (APC) framework and supports machine setup, activation, monitoring, and data collection. The sensor interface 1415 provides the appropriate interface environment to communicate with external sensors such as LabView® or other sensor bus-based data acquisition software. Both the machine interface 1430 and the sensor interface 1415 use a set of functionalities (such as a communication standard) to collect data to be used. The equipment interface 1410 and the sensor interface 1415 communicate over the line 1320 with the machine interface 1430 resident on the workstation 1330.

More particularly, the machine interface 1430 receives commands, status events, and collected data from the equipment interface 1410 and forwards these as needed to other Advanced Process Control (APC) components and event channels. In turn, responses from Advanced Process Control (APC) components are received by the machine interface 1430 and rerouted to the equipment interface 1410. The machine interface 1430 also reformats and restructures messages and data as necessary. The machine interface 1430 supports the startup/shutdown procedures within the Advanced Process Control (APC) System Manager 1440. It also serves as an Advanced Process Control (APC) data collector, buffering data collected by the equipment interface 1410, and emitting appropriate data collection signals.

In the particular embodiment illustrated, the Advanced Process Control (APC) system is a factory-wide software system, but this is not necessary to the practice of the invention. The control strategies taught by the present invention can be applied to virtually any semiconductor processing tool on a factory floor. Indeed, the present invention may be simultaneously employed on multiple processing tools in the same factory or in the same fabrication process. The Advanced Process Control (APC) framework permits remote access and monitoring of the process performance. Furthermore, by utilizing the Advanced Process Control (APC) framework, data storage can be more convenient, more flexible, and less expensive than data storage on local drives. However, the present invention may be employed, in some alternative embodiments, on local drives.

The illustrated embodiment deploys the present invention onto the Advanced Process Control (APC) framework utilizing a number of software components. In addition to components within the Advanced Process Control (APC) framework, a computer script is written for each of the semiconductor processing tools involved in the control system. When a semiconductor processing tool in the control system is started in the semiconductor manufacturing fab, the semiconductor processing tool generally calls upon a script to initiate the action that is required by the processing tool controller. The control methods are generally defined and performed using these scripts. The development of these scripts can comprise a significant portion of the development of a control system.

In this particular embodiment, there are several separate software scripts that perform the tasks involved in controlling the processing operation. There is one script for the processing tool 1310, including the review station 1317 and the processing tool controller 1315. There is also a script to handle the actual data capture from the review station 1317 and another script that contains common procedures that can be referenced by any of the other scripts. There is also a script for the Advanced Process Control (APC) system manager 1440. The precise number of scripts, however, is implementation specific and alternative embodiments may use other numbers of scripts.

Figure 15:
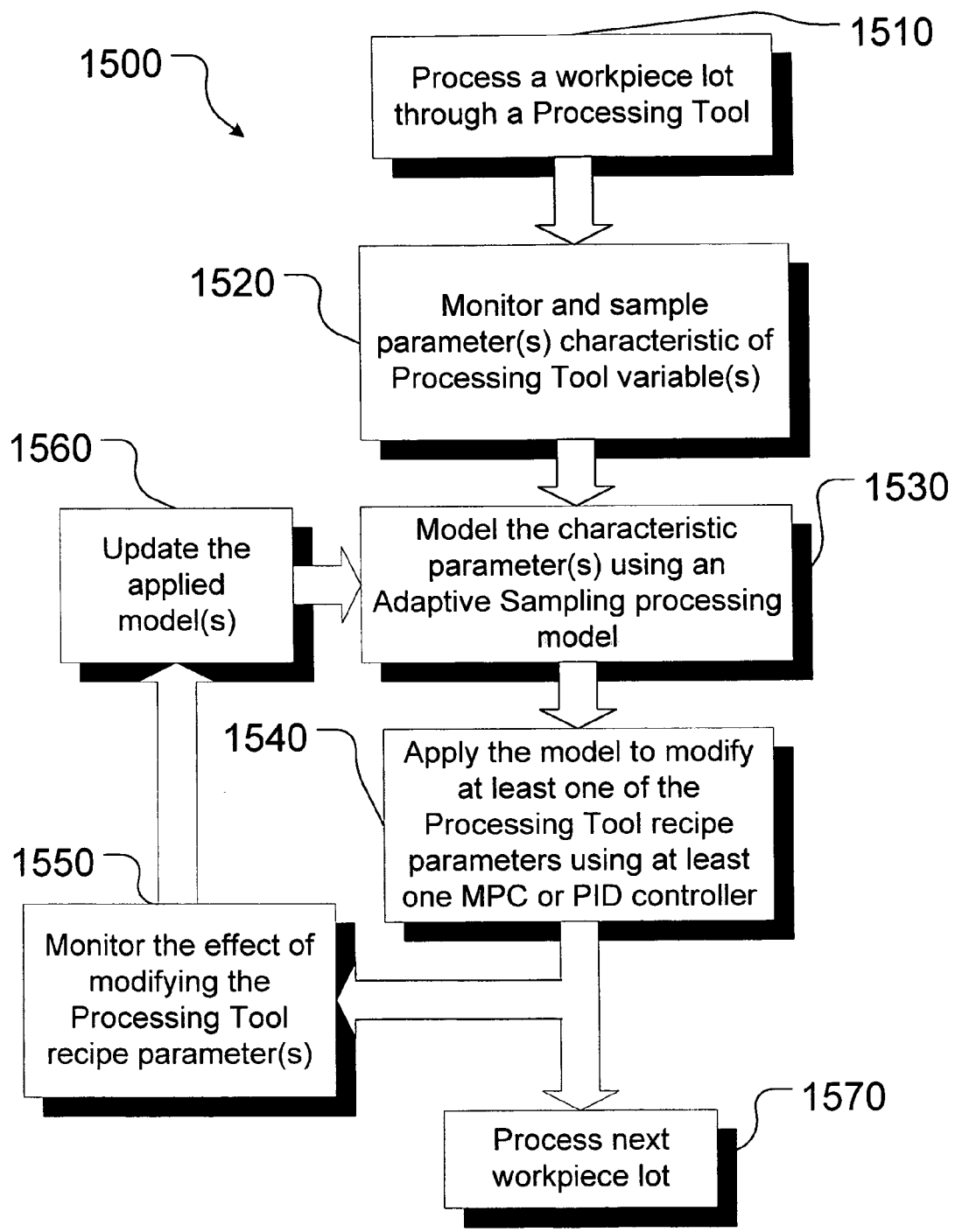

Operation of an Illustrative Apparatus. FIG. 15 illustrates one particular embodiment 1500 of the method 1100 in FIG. 11. The method 1500 may be practiced with the apparatus 1300 illustrated in FIGS. 13-14, but the invention is not so limited. The method 1500 may be practiced with any apparatus that may perform the functions set forth in FIG. 15. Furthermore, the method 1100 in FIG. 11 may be practiced in embodiments alternative to the method 1500 in FIG. 15.

Referring now to all of FIGS. 13–15, the method 1500 begins with processing a lot of workpieces 1305 through a processing tool, such as the processing tool 1310, as set forth in box 1510. In this particular embodiment, the processing tool 1310 has been initialized for processing by the Advanced Process Control (APC) system manager 1440 through the machine interface 1430 and the equipment interface 1410. In this particular embodiment, before the processing tool 1310 is run, the Advanced Process Control (APC) system manager script is called to initialize the processing tool 1310. At this step, the script records the identification number of the processing tool 1310 and the lot number of the workpieces 1305. The identification number is then stored against the lot number in a data store 1360. The rest of the script, such as the APCData call and the Setup and StartMachine calls, are formulated with blank or dummy data in order to force the machine to use default settings.

As part of this initialization, the initial setpoints for processing control are provided to the processing tool controller 1315 over the line 1320. These initial setpoints may be determined and implemented in any suitable manner known to the art. In this case, one or more wafer lots have been processed through substantially the same or similar contexts or conditions as the current wafer lot, and have also been measured for processing error(s) using the review station 1317. When this information exists, state estimates gleaned from the measured error(s) and/or bias(es) are retrieved from the data store 1360. These processing control input signal settings computed from the state estimates are then downloaded to the processing tool 1310.

The workpieces 1305 are processed through the processing tool 1310. This comprises, in the embodiment illustrated, subjecting the workpieces 1305 to a rapid thermal anneal. The workpieces 1305 are measured on the review station 1317 after their processing on the processing tool 1310. The review station 1317 examines the workpieces 1305 after they are processed for a number of errors, such as deviations from target values, such as film thicknesses, etch depths, and the like. The data generated by the instruments of the review station 1317 is passed to the machine interface 1430 via sensor interface 1415 and the line 1320. The review station script begins with a number of Advanced Process Control (APC) commands for the collection of data. The review station script then locks itself in place and activates a data available script. This script facilitates the actual transfer of the data from the review station 1317 to the Advanced Process Control (APC) framework. Once the transfer is completed, the script exits and unlocks the review station script. The interaction with the review station 1317 is then generally complete.

As will be appreciated by those skilled in the art having the benefit of this disclosure, the data generated by the review station 1317 should be preprocessed for use. Review stations, such as KLA review stations, provide the control algorithms for measuring the control error. Each of the error measurements, in this particular embodiment, corresponds to one of the processing control input signals on the line 1320 in a direct manner. Before the error can be utilized to correct the processing control input signal, a certain amount of preprocessing is generally completed.

For example, preprocessing may include outlier rejection. Outlier rejection is a gross error check ensuring that the received data is reasonable in light of the historical performance of the process. This procedure involves comparing each of the processing errors to its corresponding predetermined boundary parameter. In one embodiment, even if one of the predetermined boundaries is exceeded, the error data from the entire semiconductor wafer lot is generally rejected.

To determine the limits of the outlier rejection, thousands of actual semiconductor manufacturing fabrication ("fab") data points may be collected. The standard deviation for each error parameter in this collection of data is then calculated. In one embodiment, for outlier rejection, nine times the standard deviation (both positive and negative) is generally chosen as the predetermined boundary. This was done primarily to ensure that only the points that are significantly outside the normal operating conditions of the process are rejected.

Preprocessing may also smooth the data, which is also known as filtering. Filtering is important because the error measurements are subject to a certain amount of randomness, such that the error significantly deviates in value. Filtering the review station data results in a more accurate assessment of the error in the processing control input signal settings. In one embodiment, the processing control scheme utilizes a filtering procedure known as an Exponentially-Weighted Moving Average ("EWMA") filter, although other filtering procedures can be utilized in this context.

One embodiment for the EWMA filter is represented by Equation (1):

$$AVG_N = W*M_C + (1-W)*AVG_P \qquad (1)$$

where $AVG_N$ . the new EWMA average;

W . a weight for the new average ($AVG_N$);

$M_C$ = the current measurement; and $AVG_P$ = the previous EWMA average.

The weight is an adjustable parameter that can be used to control the amount of filtering and is generally between zero and one. The weight represents the confidence in the accuracy of the current data point. If the measurement is considered accurate, the weight should be close to one. If there were a significant amount of fluctuations in the process, then a number closer to zero would be appropriate.

In one embodiment, there are at least two techniques for utilizing the EWMA filtering process. The first technique uses the previous average, the weight, and the current measurement as described above. Among the advantages of utilizing the first implementation are ease of use and minimal data storage. One of the disadvantages of utilizing the first implementation is that this method generally does not retain much process information. Furthermore, the previous average calculated in this manner would be made up of every data point that preceded it, which may be undesirable. The second technique retains only some of the data and calculates the average from the raw data each time.

The manufacturing environment in the semiconductor manufacturing fab presents some unique challenges. The order that the semiconductor wafer lots are processed through an processing tool may not correspond to the order in which they are read on the review station. This could lead to the data points being added to the EWMA average out of sequence. Semiconductor wafer lots may be analyzed more than once to verify the error measurements. With no data retention, both readings would contribute to the EWMA average, which may be an undesirable characteristic. Furthermore, some of the control threads may have low volume, which may cause the previous average to be outdated such that it may not be able to accurately represent the error in the processing control input signal settings.

The processing tool controller 1315, in this particular embodiment, uses limited storage of data to calculate the EWMA filtered error, i.e., the first technique. Wafer lot data, including the lot number, the time the lot was processed, and the multiple error estimates, are stored in the data store 1360 under the control thread name. When a new set of data is collected, the stack of data is retrieved from data store 1360 and analyzed. The lot number of the current lot being processed is compared to those in the stack. If the lot number matches any of the data present there, the error measurements are replaced. Otherwise, the data point is added to the current stack in chronological order, according to the time periods when the lots were processed. In one embodiment, any data point within the stack that is over 128 hours old is removed. Once the aforementioned steps are complete, the new filter average is calculated and stored to data store 1360.

Thus, the data is collected and preprocessed, and then processed to generate an estimate of the current errors in the processing control input signal settings. First, the data is passed to a compiled Matlab® plug-in that performs the outlier rejection criteria described above. The inputs to a plug-in interface are the multiple error measurements and an array containing boundary values. The return from the plug-in interface is a single toggle variable. A nonzero return denotes that it has failed the rejection criteria, otherwise the variable returns the default value of zero and the script continues to process.

After the outlier rejection is completed, the data is passed to the EWMA filtering procedure. The controller data for the control thread name associated with the lot is retrieved, and all of the relevant operation upon the stack of lot data is carried out. This comprises replacing redundant data or removing older data. Once the data stack is adequately prepared, it is parsed into ascending time-ordered arrays that correspond to the error values. These arrays are fed into the EWMA plug-in along with an array of the parameter required for its execution. In one embodiment, the return from the plug-in is comprised of the six filtered error values.

Returning to FIG. 15, data preprocessing comprises monitoring and/or sampling workpiece 1305 parameter(s) characteristic of the processing tool 1310 variables, as set forth in box 1520. Known, potential characteristic parameters may be identified by characteristic data patterns or may be identified as known consequences of modifications to processing control. In turn, the processing control input parameters such as the processing recipe control input parameters and/or the setpoints for workpiece temperature and/or lamp power and/or anneal time and/or process gas temperature and/or process gas pressure and/or process gas flow rate and/or radio frequency (RF) power and/or etch time and/or bias voltage and/or deposition time, and the like, may directly affect the effective yield of usable semiconductor devices from the workpiece 1205.

The next step in the control process is to calculate the new settings for the processing tool controller 1315 of the processing tool 1310. The previous settings for the control thread corresponding to the current wafer lot are retrieved from the data store 1360. This data is paired along with the current set of processing errors. The new settings are calculated by calling a compiled Matlab® plug-in. This application incorporates a number of inputs, performs calculations in a separate execution component, and returns a number of outputs to the main script. Generally, the inputs of the Matlab® plug-in are the processing control input signal settings, the review station 1317 errors, an array of parameters that are necessary for the control algorithm, and a currently unused flag error. The outputs of the Matlab® plug-in are the new controller settings, calculated in the plug-in according to the controller algorithm described above.

A processing process engineer or a control engineer, who generally determines the actual form and extent of the control action, can set the parameters. They include the threshold values, maximum step sizes, controller weights, and target values. Once the new parameter settings are calculated, the script stores the setting in the data store 1360 such that the processing tool 1310 can retrieve them for the next wafer lot to be processed. The principles taught by the present invention can be implemented into other types of manufacturing frameworks.

Returning again to FIG. 15, the calculation of new settings comprises, as set forth in box 1530, modeling the characteristic parameter(s) using an adaptive sampling processing model. This modeling may be performed by the Matlab® plug-in. In this particular embodiment, only known, potential characteristic parameters are modeled and the models are stored in a database 1335 accessed by a machine interface 1430. The database 1335 may reside on the workstation 1330, as shown, or some other part of the Advanced Process Control (APC) framework. For instance, the models might be stored in the data store 1360 managed by the Advanced Process Control (APC) system manager 1440 in alternative embodiments. The model will generally be a mathematical model, i.e., an equation describing how the change(s) in processing recipe control(s) affects the processing performance, and the like. The models described in various illustrative embodiments given above, and described more fully below, are examples of such models.

The particular model used will be implementation specific, depending upon the particular processing tool 1310 and the particular characteristic parameter(s) being modeled. Whether the relationship in the model is linear or non-linear will be dependent on the particular parameter(s) involved.

The new settings are then transmitted to and applied by the processing tool controller 1315. Thus, returning now to FIG. 15, once the characteristic parameter(s) are modeled, the model is applied to modify at least one processing recipe control input parameter using at least one model predictive control (MPC) controller or at least one proportional-integral-derivative (PID) controller, described more fully above, as set forth in box 1540. In this particular embodiment, the machine interface 1430 retrieves the model from the database 1335, plugs in the respective value(s), and determines the necessary change(s) in the processing recipe control input parameter(s). The change is then communicated by the machine interface 1430 to the equipment interface 1410 over the line 1320. The equipment interface 1410 then implements the change.

The present embodiment furthermore provides that the models be updated. This comprises, as set forth in boxes 1550–1560 of FIG. 15, monitoring at least one effect of modifying the processing recipe control input parameters (box 1550) and updating the applied model (box 1560) based on the effect(s) monitored. For instance, various aspects of the operation of the processing tool 1310 will change as the processing tool 1310 ages. By monitoring the effect of the processing recipe change(s) implemented as a result of the characteristic parameter measurement, the necessary value could be updated to yield superior performance.

As noted above, this particular embodiment implements an Advanced Process Control (APC) system. Thus, changes are implemented "between" lots. The actions set forth in the boxes 1520–1560 are implemented after the current lot is processed and before the second lot is processed, as set forth in box 1570 of FIG. 15. However, the invention is not so limited. Furthermore, as noted above, a lot may constitute any practicable number of wafers from one to several thousand (or practically any finite number). What constitutes a "lot" is implementation specific, and so the point of the fabrication process in which the updates occur will vary from implementation to implementation.

As described above, in various illustrative embodiments of the present invention, an adaptive sampling processing model may be applied to modify processing performed in a processing step. For example, an adaptive sampling processing model may be formed by monitoring one or more tool variables and/or one or more processing parameters during one or more processing runs. Examples of such tool variables and/or processing parameters may comprise one or more pyrometer trace readings, one or more lamp power trace readings, one or more tube temperature trace readings, one or more current readings, one or more infrared (IR) signal readings, one or more optical emission spectrum readings, one or more process gas temperature readings, one or more process gas pressure readings, one or more process gas flow rate readings, one or more etch depths, one or more process layer thicknesses, one or more resistivity readings, and the like.

In mathematical terms, a set of m processing runs being measured and/or monitored over n processing tool variables and/or processing parameters may be arranged as a rectangular n×m matrix X. In other words, the rectangular n×m matrix X may be comprised of 1 to n rows (each row corresponding to a separate processing tool variable or processing parameter) and 1 to m columns (each column corresponding to a separate processing run). The values of the rectangular n×m matrix X may be the actually measured values of the processing tool variables and/or processing parameters, or ratios of actually measured values (normalized to respective reference setpoints), or logarithms of such ratios, for example. The rectangular n×m matrix X may have rank r, where r≦min{m,n} is the maximum number of independent variables in the matrix X. The rectangular n×m matrix X may be analyzed using Principle Components Analysis (PCA), for example. The use of PCA, for example, generates a set of Principal Components P (whose "Loadings," or components, represent the contributions of the various processing tool variables and/or processing parameters) as an eigenmatrix (a matrix whose columns are eigenvectors) of the equation $((X-M)(X-M)^T)P=\Lambda^2 P$, where M is a rectangular n×m matrix of the mean values of the columns of X (the m columns of M are each the column mean vector $\mu_{n\times 1}$ of $X_{n\times m}$), $\Lambda^2$ is an n×n diagonal matrix of the squares of the eigenvalues $\lambda_i$, i=1, 2, . . . , r, of the mean-scaled matrix X–M, and a Scores matrix, T, with $X-M=PT^T$ and $(X-M)^T=(PT^T)^T=(T^T)^T P^T=TP^T$, so that $((X-M)(X-M)^T)P=((PT^T)(TP^T))P$ and $((PT^T)(TP^T))P= (P^T T)P^T)P=P(T^T T)=\Lambda^2 P$. The rectangular n×m matrix X, also denoted $X_{n\times m}$, may have elements $x_{ij}$, where i=1, 2, . . . , n, and j=1, 2, . . . , m, and the rectangular m×n matrix $X^T$, the transpose of the rectangular n×m matrix X, also denoted $(X^T)_{m\times n}$, may have elements $x_{ji}$, where i=1, 2, . . . , n, and j=1, 2, . . . , m. The n×n matrix $(X-M)(X-M)^T$ is (m–1) times the covariance matrix $S_{n\times n}$, having elements $s_{ij}$, where i=1,2, . . . , n, and j=1,2, . . . , n, defined so that:

$$s_{ij} = \frac{m\sum_{k=1}^{m} x_{ik}x_{jk} - \sum_{k=1}^{m} x_{ik}\sum_{k=1}^{m} x_{jk}}{m(m-1)},$$

corresponding to the rectangular n×m matrix $X_{n\times m}$.

Although other methods may exist, four methods for computing Principal Components are as follows:

1. eigenanalysis (EIG);
2. singular value decomposition (SVD);
3. nonlinear iterative partial least squares (NIPALS); and
4. power method.

Each of the first two methods, EIG and SVD, simultaneously calculates all possible Principal Components, whereas the NIPALS method allows for calculation of one Principal Component at a time. However, the power method, described more fully below, is an iterative approach to finding eigenvalues and eigenvectors, and also allows for calculation of one Principal Component at a time. There are as many Principal Components as there are channels (or variable values). The power method may efficiently use computing time.

For example, consider the 3×2 matrix A, its transpose, the 2×3 matrix $A^T$, their 2×2 matrix product $A^T A$, and their 3×3 matrix product $AA^T$:

$$A = \begin{pmatrix} 1 & 1 \\ 1 & 0 \\ 1 & -1 \end{pmatrix}$$

$$A^T = \begin{pmatrix} 1 & 1 & 1 \\ 1 & 0 & -1 \end{pmatrix}$$

$$A^T A = \begin{pmatrix} 1 & 1 & 1 \\ 1 & 0 & -1 \end{pmatrix} \begin{pmatrix} 1 & 1 \\ 1 & 0 \\ 1 & -1 \end{pmatrix} = \begin{pmatrix} 3 & 0 \\ 0 & 2 \end{pmatrix}$$

$$AA^T = \begin{pmatrix} 1 & 1 \\ 1 & 0 \\ 1 & -1 \end{pmatrix} \begin{pmatrix} 1 & 1 & 1 \\ 1 & 0 & -1 \end{pmatrix} = \begin{pmatrix} 2 & 1 & 0 \\ 1 & 1 & 1 \\ 0 & 1 & 2 \end{pmatrix}.$$

EIG reveals that the eigenvalues $\lambda$ of the matrix product $A^T A$ are 3 and 2. The eigenvectors of the matrix product $A^T A$ are solutions t of the equation $(A^T A)t = \lambda t$, and may be seen by inspection to be $t_1^T = (1,0)$ and $t_2^T = (0,1)$, belonging to the eigenvalues $\lambda_1 = 3$ and $\lambda_2 = 2$, respectively.

The power method, for example, may be used to determine the eigenvalues $\lambda$ and eigenvectors p of the matrix product $AA^T$, where the eigenvalues $\lambda$ and the eigenvectors p are solutions p of the equation $(AA^T)p = \lambda p$. A trial eigenvector $p^T = (1,1,1)$ may be used:

$$(AA^T)\underline{p} = \begin{pmatrix} 2 & 1 & 0 \\ 1 & 1 & 1 \\ 0 & 1 & 2 \end{pmatrix} \begin{pmatrix} 1 \\ 1 \\ 1 \end{pmatrix} = \begin{pmatrix} 3 \\ 3 \\ 3 \end{pmatrix} = 3 \begin{pmatrix} 1 \\ 1 \\ 1 \end{pmatrix} = \lambda_1 \underline{p}_1.$$

This indicates that the trial eigenvector $p^T = (1,1,1)$ happened to correspond to the eigenvector $p_1^T = (1,1,1)$ belonging to the eigenvalue $\lambda_1 = 3$. The power method then proceeds by subtracting the outer product matrix $p_1 p_1^T$ from the matrix product $AA^T$ to form a residual matrix $R_1$:

$$R_1 = \begin{pmatrix} 2 & 1 & 0 \\ 1 & 1 & 1 \\ 0 & 1 & 2 \end{pmatrix} - \begin{pmatrix} 1 \\ 1 \\ 1 \end{pmatrix}(1\ 1\ 1) = \begin{pmatrix} 2 & 1 & 0 \\ 1 & 1 & 1 \\ 0 & 1 & 2 \end{pmatrix} - \begin{pmatrix} 1 & 1 & 1 \\ 1 & 1 & 1 \\ 1 & 1 & 1 \end{pmatrix} = \begin{pmatrix} 1 & 0 & -1 \\ 0 & 0 & 0 \\ -1 & 0 & 1 \end{pmatrix}.$$

Another trial eigenvector $p^T = (1,0,-1)$ may be used:

$$(AA^T - \underline{p}_1 \underline{p}_1^T)\underline{p} = R_1 \underline{p} = \begin{pmatrix} 1 & 0 & -1 \\ 0 & 0 & 0 \\ -1 & 0 & 1 \end{pmatrix} \begin{pmatrix} 1 \\ 0 \\ -1 \end{pmatrix} = \begin{pmatrix} 2 \\ 0 \\ -2 \end{pmatrix} = 2 \begin{pmatrix} 1 \\ 0 \\ -1 \end{pmatrix} = \lambda_2 \underline{p}_2.$$

This indicates that the trial eigenvector $p^T = (1,0,-1)$ happened to correspond to the eigenvector $p_2^T = (1,0,-1)$ belonging to the eigenvalue $\lambda_2 = 2$. The power method then proceeds by subtracting the outer product matrix $p_2 p_2^T$ from the residual matrix $R_1$ to form a second residual matrix $R_2$:

$$R_2 = \begin{pmatrix} 1 & 0 & -1 \\ 0 & 0 & 0 \\ -1 & 0 & 1 \end{pmatrix} - \begin{pmatrix} 1 \\ 0 \\ -1 \end{pmatrix}(1\ 0\ -1) =$$

$$\begin{pmatrix} 1 & 0 & -1 \\ 0 & 0 & 0 \\ -1 & 0 & 1 \end{pmatrix} - \begin{pmatrix} 1 & 0 & -1 \\ 0 & 0 & 0 \\ -1 & 0 & 1 \end{pmatrix} = \begin{pmatrix} 0 & 0 & 0 \\ 0 & 0 & 0 \\ 0 & 0 & 0 \end{pmatrix}.$$

The fact that the second residual matrix $R_2$ vanishes indicates that the eigenvalue $\lambda_3 = 0$ and that the eigenvector $p_3$ is completely arbitrary. The eigenvector $p_3$ may be conveniently chosen to be orthogonal to the eigenvectors $p_1^T = (1,1,1)$ and $\lambda_2^T = (1,0,1)$, so that the eigenvector $p_3^T = (1,-2,1)$. Indeed, one may readily verify that:

$$(AA^T)\underline{p}_3 = \begin{pmatrix} 2 & 1 & 0 \\ 1 & 1 & 1 \\ 0 & 1 & 2 \end{pmatrix} \begin{pmatrix} 1 \\ -2 \\ 1 \end{pmatrix} = \begin{pmatrix} 0 \\ 0 \\ 0 \end{pmatrix} = 0 \begin{pmatrix} 1 \\ -2 \\ 1 \end{pmatrix} = \lambda_3 \underline{p}_3.$$

Similarly, SVD of A shows that $A = PT^T$, where P is the Principal Component matrix and T is the Scores matrix:

$$A = \begin{pmatrix} \frac{1}{\sqrt{3}} & \frac{1}{\sqrt{2}} & \frac{1}{\sqrt{6}} \\ \frac{1}{\sqrt{3}} & 0 & \frac{-2}{\sqrt{6}} \\ \frac{1}{\sqrt{3}} & \frac{-1}{\sqrt{2}} & \frac{1}{\sqrt{6}} \end{pmatrix} \begin{pmatrix} \sqrt{3} & 0 \\ 0 & \sqrt{2} \\ 0 & 0 \end{pmatrix} \begin{pmatrix} 1 & 0 \\ 0 & 1 \end{pmatrix} =$$

$$\begin{pmatrix} \frac{1}{\sqrt{3}} & \frac{1}{\sqrt{2}} & \frac{1}{\sqrt{6}} \\ \frac{1}{\sqrt{3}} & 0 & \frac{-2}{\sqrt{6}} \\ \frac{1}{\sqrt{3}} & \frac{-1}{\sqrt{2}} & \frac{1}{\sqrt{6}} \end{pmatrix} \begin{pmatrix} \sqrt{3} & 0 \\ 0 & \sqrt{2} \\ 0 & 0 \end{pmatrix}.$$

SVD confirms that the singular values of A are $\sqrt{3}$ and $\sqrt{2}$, the positive square roots of the eigenvalues $\lambda_1 = 3$ and $\lambda_2 = 2$ of the matrix product $A^T A$. Note that the columns of the Principal Component matrix P are the orthonormalized eigenvectors of the matrix product $AA^T$.

Likewise, SVD of $A^T$ shows that $A^T = TP^T$:

$$A^T = \begin{pmatrix} 1 & 0 \\ 0 & 1 \end{pmatrix} \begin{pmatrix} \sqrt{3} & 0 & 0 \\ 0 & \sqrt{2} & 0 \end{pmatrix} \begin{pmatrix} \frac{1}{\sqrt{3}} & \frac{1}{\sqrt{3}} & \frac{1}{\sqrt{3}} \\ \frac{1}{\sqrt{2}} & 0 & \frac{-1}{\sqrt{2}} \\ \frac{1}{\sqrt{6}} & \frac{-2}{\sqrt{6}} & \frac{1}{\sqrt{6}} \end{pmatrix} =$$

$$A^T = \begin{pmatrix} \sqrt{3} & 0 & 0 \\ 0 & \sqrt{2} & 0 \end{pmatrix} \begin{pmatrix} \frac{1}{\sqrt{3}} & \frac{1}{\sqrt{3}} & \frac{1}{\sqrt{3}} \\ \frac{1}{\sqrt{2}} & 0 & \frac{-1}{\sqrt{2}} \\ \frac{1}{\sqrt{6}} & \frac{-2}{\sqrt{6}} & \frac{1}{\sqrt{6}} \end{pmatrix} = TP^T.$$

SVD confirms that the (non-zero) singular values of $A^T$ are $\sqrt{3}$ and $\sqrt{2}$, the positive square roots of the eigenvalues $\lambda_1 = 3$ and $\lambda_2 = 2$ of the matrix product $AA^T$. Note that the columns of the Principal Component matrix P (the rows of the Principal Component matrix $P^T$) are the orthonormalized eigenvectors of the matrix product $AA^T$. Also note that the non-zero elements of the Scores matrix T are the positive square roots $\sqrt{3}$ and $\sqrt{2}$ of the (non-zero) eigenvalues $\lambda_1 = 3$ and $\lambda_2 = 2$ of both of the matrix products $A^T A$ and $AA^T$.

Taking another example, consider the 4×3 matrix B, its transpose, the 3×4 matrix $B^T$ their 3×3 matrix product $B^TB$, and their 4×4 matrix product $BB^T$:

$$B = \begin{pmatrix} 1 & 1 & 0 \\ 1 & 0 & 1 \\ 1 & 0 & -1 \\ 1 & -1 & 0 \end{pmatrix}$$

$$B^T = \begin{pmatrix} 1 & 1 & 1 & 1 \\ 1 & 0 & 0 & -1 \\ 0 & 1 & -1 & 0 \end{pmatrix}$$

$$B^TB = \begin{pmatrix} 1 & 1 & 1 & 1 \\ 1 & 0 & 0 & -1 \\ 0 & 1 & -1 & 0 \end{pmatrix} \begin{pmatrix} 1 & 1 & 0 \\ 1 & 0 & 1 \\ 1 & 0 & -1 \\ 1 & -1 & 0 \end{pmatrix} = \begin{pmatrix} 4 & 0 & 0 \\ 0 & 2 & 0 \\ 0 & 0 & 2 \end{pmatrix}$$

$$BB^T = \begin{pmatrix} 1 & 1 & 0 \\ 1 & 0 & 1 \\ 1 & 0 & -1 \\ 1 & -1 & 0 \end{pmatrix} \begin{pmatrix} 1 & 1 & 1 & 1 \\ 1 & 0 & 0 & -1 \\ 0 & 1 & -1 & 0 \end{pmatrix} = \begin{pmatrix} 2 & 1 & 1 & 0 \\ 1 & 2 & 0 & 1 \\ 1 & 0 & 2 & 1 \\ 0 & 1 & 1 & 2 \end{pmatrix}.$$

EIG reveals that the eigenvalues of the matrix product $B^TB$ are 4, 2 and 2. The eigenvectors of the matrix product $B^TB$ are solutions t of the equation $(B^TB)t=\lambda t$, and may be seen by inspection to be $t_1^T=(1,0,0)$, $t_2^T=(0,1,0)$, and $t_3^T=(0,0,1)$, belonging to the eigenvalues $\lambda_1=4$, $\lambda_2=2$, and $\lambda_3=2$, respectively.

The power method, for example, may be used to determine the eigenvalues $\lambda$ and eigenvectors p of the matrix product $BB^T$, where the eigenvalues $\lambda$ and the eigenvectors p are solutions p of the equation $(BB^T)p=\lambda p$. A trial eigenvector $p^T=(1,1,1,1)$ may be used:

$$(BB^T)\underline{p} = \begin{pmatrix} 2 & 1 & 1 & 0 \\ 1 & 2 & 0 & 1 \\ 1 & 0 & 2 & 1 \\ 0 & 1 & 1 & 2 \end{pmatrix} \begin{pmatrix} 1 \\ 1 \\ 1 \\ 1 \end{pmatrix} = \begin{pmatrix} 4 \\ 4 \\ 4 \\ 4 \end{pmatrix} = 4 \begin{pmatrix} 1 \\ 1 \\ 1 \\ 1 \end{pmatrix} = \lambda_1 \underline{p}_1.$$

This indicates that the trial eigenvector $p^T=(1,1,1,1)$ happened to correspond to the eigenvector $p_1^T=(1,1,1,1)$ belonging to the eigenvalue $\lambda_1=4$. The power method then proceeds by subtracting the outer product matrix $p_1p_1^T$ from the matrix product $BB^T$ to form a residual matrix $R_1$:

$$R_1 = \begin{pmatrix} 2 & 1 & 1 & 0 \\ 1 & 2 & 0 & 1 \\ 1 & 0 & 2 & 1 \\ 0 & 1 & 1 & 2 \end{pmatrix} - \begin{pmatrix} 1 & 1 & 1 & 1 \\ 1 & 1 & 1 & 1 \\ 1 & 1 & 1 & 1 \\ 1 & 1 & 1 & 1 \end{pmatrix} = \begin{pmatrix} 1 & 0 & 0 & -1 \\ 0 & 1 & -1 & 0 \\ 0 & -1 & 1 & 0 \\ -1 & 0 & 0 & 1 \end{pmatrix}.$$

Another trial eigenvector $p^T=(1,0,0,-1)$ may be used:

$$(BB^T - \underline{p}_1\underline{p}_1^T)\underline{p} = R_1\underline{p} = \begin{pmatrix} 1 & 0 & 0 & -1 \\ 0 & 1 & -1 & 0 \\ 0 & -1 & 1 & 0 \\ -1 & 0 & 0 & 1 \end{pmatrix} \begin{pmatrix} 1 \\ 0 \\ 0 \\ -1 \end{pmatrix}$$

$$= \begin{pmatrix} 2 \\ 0 \\ 0 \\ -2 \end{pmatrix} = 2 \begin{pmatrix} 1 \\ 0 \\ 0 \\ -1 \end{pmatrix} = \lambda_2 \underline{p}_2.$$

This indicates that the trial eigenvector $p^T=(1,0,0,-1)$ happened to correspond to the eigenvector $p_2^T=(1,0,0,-1)$ belonging to the eigenvalue $\lambda_2=2$. The power method then proceeds by subtracting the outer product matrix $p_2p_2^T$ from the residual matrix $R_1$ to form a second residual matrix $R_2$:

$$R_2 = \begin{pmatrix} 1 & 0 & 0 & -1 \\ 0 & 1 & -1 & 0 \\ 0 & -1 & 1 & 0 \\ -1 & 0 & 0 & 1 \end{pmatrix} - \begin{pmatrix} 1 & 0 & 0 & -1 \\ 0 & 0 & 0 & 0 \\ 0 & 0 & 0 & 0 \\ -1 & 0 & 0 & 1 \end{pmatrix} = \begin{pmatrix} 0 & 0 & 0 & 0 \\ 0 & 1 & -1 & 0 \\ 0 & -1 & 1 & 0 \\ 0 & 0 & 0 & 0 \end{pmatrix}.$$

Another trial eigenvector $p^T=(0,1,-1,0)$ may be used:

$$(BB^T - \underline{p}_2\underline{p}_2^T)\underline{p} = R_2\underline{p} = \begin{pmatrix} 0 & 0 & 0 & 0 \\ 0 & 1 & -1 & 0 \\ 0 & -1 & 1 & 0 \\ 0 & 0 & 0 & 0 \end{pmatrix} \begin{pmatrix} 0 \\ 1 \\ -1 \\ 0 \end{pmatrix}$$

$$= \begin{pmatrix} 0 \\ 2 \\ -2 \\ 0 \end{pmatrix} = 2 \begin{pmatrix} 0 \\ 1 \\ -1 \\ 0 \end{pmatrix} = \lambda_3 \underline{p}_3.$$

This indicates that the trial eigenvector $p^T=(0,1,-1,0)$ happened to correspond to the eigenvector $p_3^T=(0,1,-1,0)$ belonging to the eigenvalue $\lambda_3=2$. The power method then proceeds by subtracting the outer product matrix $p_3p_3^T$ from the second residual matrix $R_2$ to form a third residual matrix $R_3$:

$$R_3 = \begin{pmatrix} 0 & 0 & 0 & 0 \\ 0 & 1 & -1 & 0 \\ 0 & -1 & 1 & 0 \\ 0 & 0 & 0 & 0 \end{pmatrix} - \begin{pmatrix} 0 & 0 & 0 & 0 \\ 0 & 1 & -1 & 0 \\ 0 & -1 & 1 & 0 \\ 0 & 0 & 0 & 0 \end{pmatrix} = \begin{pmatrix} 0 & 0 & 0 & 0 \\ 0 & 0 & 0 & 0 \\ 0 & 0 & 0 & 0 \\ 0 & 0 & 0 & 0 \end{pmatrix}.$$

The fact that the third residual matrix $R_3$ vanishes indicates that the eigenvalue $\lambda_4=0$ and that the eigenvector $p_4$ is completely arbitrary. The eigenvector $p_4$ may be conveniently chosen to be orthogonal to the eigenvectors $p_1^T=(1,1,1,1)$, $p_2^T=(1,0,0,-1)$, and $p_3^T=(0,1,-1,0)$, so that the eigenvector $p_4^T=(1,-1,-1,1)$. Indeed, one may readily verify that:

$$(BB^T)\underline{p}_4 = \begin{pmatrix} 2 & 1 & 1 & 0 \\ 1 & 2 & 0 & 1 \\ 1 & 0 & 2 & 1 \\ 0 & 1 & 1 & 2 \end{pmatrix} \begin{pmatrix} 1 \\ -1 \\ -1 \\ 1 \end{pmatrix} = \begin{pmatrix} 0 \\ 0 \\ 0 \\ 0 \end{pmatrix} = 0 \begin{pmatrix} 1 \\ -1 \\ -1 \\ 1 \end{pmatrix} = \lambda_4 \underline{p}_4.$$

In this case, since the eigenvalues $\lambda_2=2$ and $\lambda_3=2$ are equal, and, hence, degenerate, the eigenvectors $p_2^T=(1,0,0,-1)$ and $P_3^T=(0,1,-1,0)$ belonging to the degenerate eigenvalues $\lambda_2=2=\lambda_3$ may be conveniently chosen to be orthonormal. A Gram-Schmidt orthonormalization procedure may be used, for example.

Similarly, SVD of B shows that $B=PT^T$, where P is the Principal Component matrix and T is the Scores matrix:

$$B = \begin{pmatrix} \frac{1}{2} & \frac{1}{\sqrt{2}} & 0 & \frac{1}{2} \\ \frac{1}{2} & 0 & \frac{1}{\sqrt{2}} & \frac{-1}{2} \\ \frac{1}{2} & 0 & \frac{-1}{\sqrt{2}} & \frac{-1}{2} \\ \frac{1}{2} & \frac{-1}{\sqrt{2}} & 0 & \frac{1}{2} \end{pmatrix} \begin{pmatrix} 2 & 0 & 0 \\ 0 & \sqrt{2} & 0 \\ 0 & 0 & \sqrt{2} \\ 0 & 0 & 0 \end{pmatrix} \begin{pmatrix} 1 & 0 & 0 \\ 0 & 1 & 0 \\ 0 & 0 & 1 \end{pmatrix} =$$

$$B = \begin{pmatrix} \frac{1}{2} & \frac{1}{\sqrt{2}} & 0 & \frac{1}{2} \\ \frac{1}{2} & 0 & \frac{1}{\sqrt{2}} & \frac{-1}{2} \\ \frac{1}{2} & 0 & \frac{-1}{\sqrt{2}} & \frac{-1}{2} \\ \frac{1}{2} & \frac{-1}{\sqrt{2}} & 0 & \frac{1}{2} \end{pmatrix} \begin{pmatrix} 2 & 0 & 0 \\ 0 & \sqrt{2} & 0 \\ 0 & 0 & \sqrt{2} \\ 0 & 0 & 0 \end{pmatrix} = PT^T.$$

SVD confirms that the singular values of B are 2, $\sqrt{2}$ and $\sqrt{2}$, the positive square roots of the eigenvalues $\lambda_1=4$, $\lambda_2=2$ and $\lambda_3=2$ of the matrix product $B^TB$.

Likewise, SVD of $B^T$ shows that:

$$B^T = \begin{pmatrix} 1 & 0 & 0 \\ 0 & 1 & 0 \\ 0 & 0 & 1 \end{pmatrix} \begin{pmatrix} 2 & 0 & 0 & 0 \\ 0 & \sqrt{2} & 0 & 0 \\ 0 & 0 & \sqrt{2} & 0 \end{pmatrix} \begin{pmatrix} \frac{1}{2} & \frac{1}{2} & \frac{1}{2} & \frac{1}{2} \\ \frac{1}{\sqrt{2}} & 0 & 0 & \frac{-1}{\sqrt{2}} \\ 0 & \frac{1}{\sqrt{2}} & \frac{-1}{\sqrt{2}} & 0 \\ \frac{1}{2} & \frac{-1}{2} & \frac{-1}{2} & \frac{1}{2} \end{pmatrix} =$$

$$B^T = \begin{pmatrix} 2 & 0 & 0 & 0 \\ 0 & \sqrt{2} & 0 & 0 \\ 0 & 0 & \sqrt{2} & 0 \end{pmatrix} \begin{pmatrix} \frac{1}{2} & \frac{1}{2} & \frac{1}{2} & \frac{1}{2} \\ \frac{1}{\sqrt{2}} & 0 & 0 & \frac{-1}{\sqrt{2}} \\ 0 & \frac{1}{\sqrt{2}} & \frac{-1}{\sqrt{2}} & 0 \\ \frac{1}{2} & \frac{-1}{2} & \frac{-1}{2} & \frac{1}{2} \end{pmatrix} = TP^T.$$

SVD confirms that the (non-zero) singular values of $B^T$ are 2, $\sqrt{2}$, and $\sqrt{2}$, the positive square roots of the eigenvalues $\lambda_1=4$, $\lambda_2=2$ and $\lambda_3=2$ of the matrix product $AA^T$. Note that the columns of the Principal Component matrix P (the rows of the Principal Component matrix $P^T$) are the orthonormalized eigenvectors of the matrix product $BB^T$. Also note that the non-zero elements of the Scores matrix T are the positive square roots 2, $\sqrt{2}$, and $\sqrt{2}$ of the (non-zero) eigenvalues $\lambda_1=4$, $\lambda_2=2$ and $\lambda_3=2$ of both of the matrix products $B^TB$ and $BB^T$.

The matrices A and B discussed above have been used for the sake of simplifying the presentation of PCA and the power method, and are much smaller than the data matrices encountered in illustrative embodiments of the present invention. For example, in various illustrative embodiments, about m=100–600 processing runs may be measured and/or monitored over n=10–60 processing tool variables and/or processing parameters. Brute force modeling, regressing all m=100–600 runs over n=10–60 variables, may constitute an ill-conditioned regression problem. Techniques such as PCA and/or partial least squares (PLS, also known as projection to latent structures) reduce the complexity in such cases by revealing the hierarchical ordering of the data based on levels of decreasing variability. In PCA, this involves finding successive Principal Components. In PLS techniques such as NIPALS, this involves finding successive latent vectors.

Figure 16:
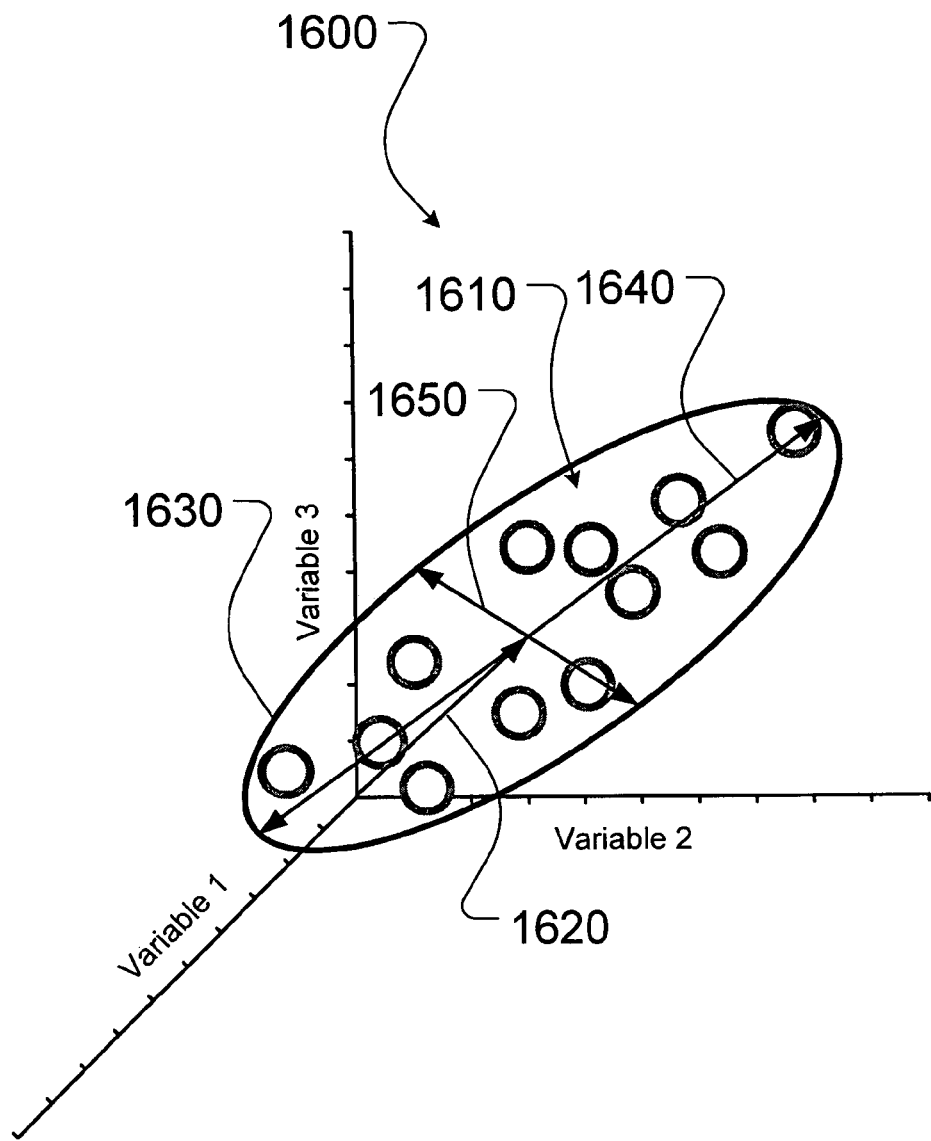

As shown in FIG. 16, a scatterplot 1600 of data points 1610 may be plotted in an n-dimensional variable space (n=3 in FIG. 16). The mean vector 1620 may lie at the center of a p-dimensional Principal Component ellipsoid 1630 (p=2 in FIG. 16). The mean vector 1620 may be determined by taking the average of the columns of the overall data matrix X. The Principal Component ellipsoid 1630 may have a first Principal Component 1640 (major axis in FIG. 16), with a length equal to the largest eigenvalue of the mean-scaled data matrix X–M, and a second Principal Component 1650 (minor axis in FIG. 16), with a length equal to the next largest eigenvalue of the mean-scaled data matrix X–M.

Figure 17:
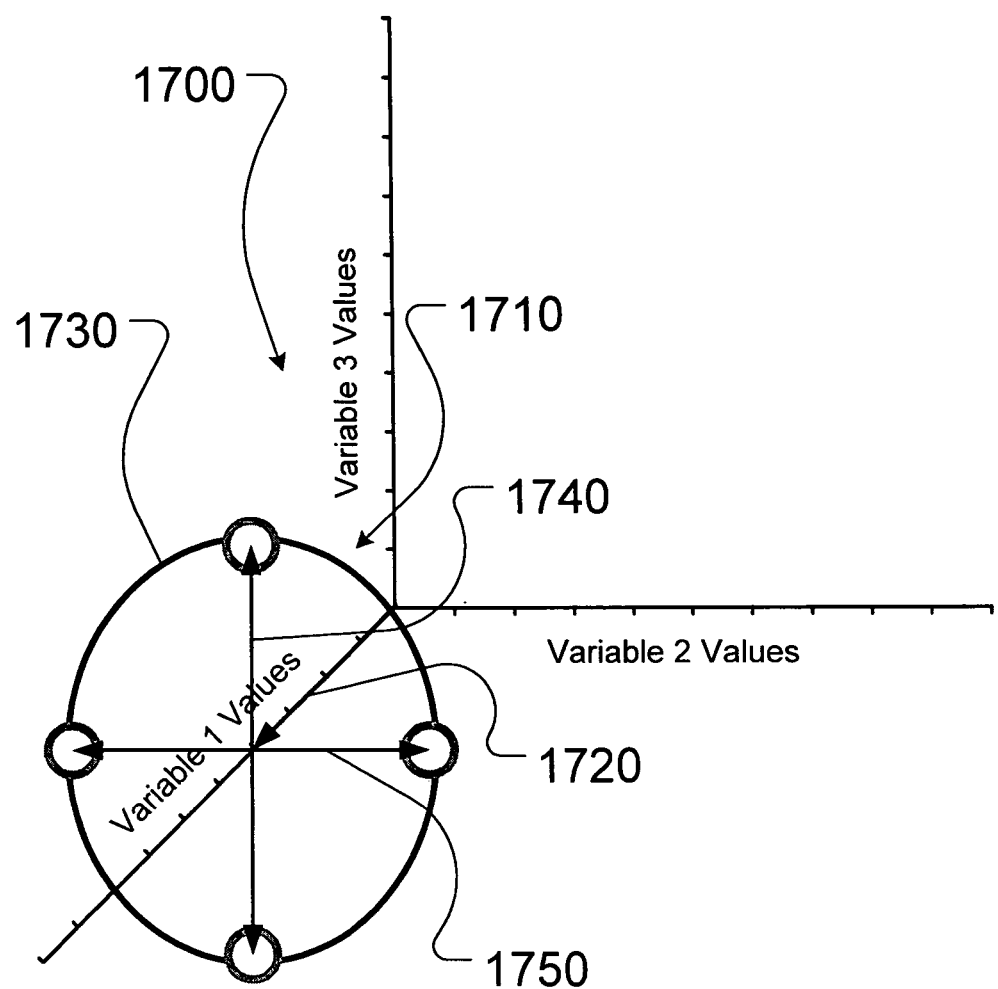

For example, the 3×4 matrix $B^T$ given above may be taken as the overall data matrix X (again for the sake of simplicity), corresponding to 4 runs over 3 variables. As shown in FIG. 17, a scatterplot 1700 of data points 1710 may be plotted in a 3-dimensional variable space. The mean vector 1720 $\mu$ may lie at the center of a 2-dimensional Principal Component ellipsoid 1730 (really a circle, a degenerate ellipsoid). The mean vector 1720 $\mu$ may be determined by taking the average of the columns of the overall 3×4 data matrix $B^T$. The Principal Component ellipsoid 1730 may have a first Principal Component 1740 ("major" axis in FIG. 17) and a second Principal Component 1750 ("minor" axis in FIG. 17). Here, the eigenvalues of the mean-scaled data matrix $B^T$-M are equal and degenerate, so the lengths of the "major" and "minor" axes in FIG. 17 are equal. As shown in FIG. 17, the mean vector 1720 $\mu$ is given by:

$$\underline{\mu} = \frac{1}{4}\left[\begin{pmatrix} 1 \\ 1 \\ 0 \end{pmatrix} + \begin{pmatrix} 1 \\ 0 \\ 1 \end{pmatrix} + \begin{pmatrix} 1 \\ 0 \\ -1 \end{pmatrix} + \begin{pmatrix} 1 \\ -1 \\ 0 \end{pmatrix}\right] = \begin{pmatrix} 1 \\ 0 \\ 0 \end{pmatrix},$$

and the matrix M has the mean vector 1720 $\mu$ for all 4 columns.

Figure 18:
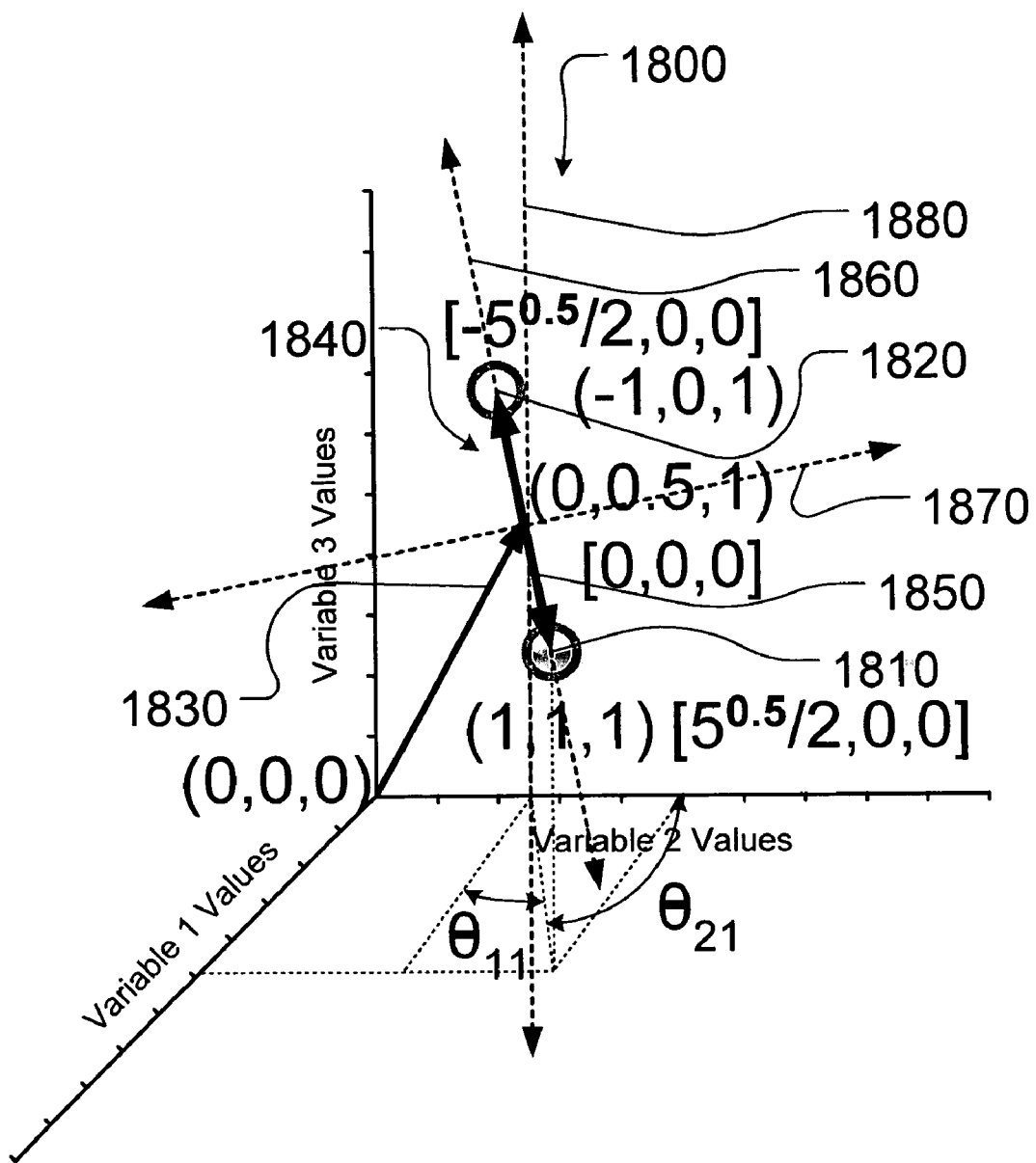

Principal Components Analysis (PCA) may be illustrated geometrically. For example, the 3×2 matrix C (similar to the 3×2 matrix A given above):

$$C = \begin{pmatrix} 1 & -1 \\ 1 & 0 \\ 1 & 1 \end{pmatrix}$$

may be taken as the overall data matrix X (again for the sake of simplicity), corresponding to 2 runs over 3 variables. As shown in FIG. 18, a scatterplot 1800 of data points 1810 and 1820, with coordinates (1,1,1) and (−1,0,1), respectively, may be plotted in a 3-dimensional variable space where the variables are respective rapid thermal processing tool and/or parameter values for each of the 3 variables. The mean vector 1830 $\mu$ may lie at the center of a 1-dimensional Principal Component ellipsoid 1840 (really a line, a very degenerate ellipsoid). The mean vector 1830 $\mu$ may be determined by taking the average of the columns of the overall 3×2 data matrix C. The Principal Component ellipsoid 1840 may have a first Principal Component 1850 (the "major" axis in FIG. 18, with length $\sqrt{5}$, lying along a first Principal Component axis 1860) and no second or third Principal Component lying along second or third Principal Component axes 1870 and 1880, respectively. Here, two of the eigenvalues of the mean-scaled data matrix C−M are equal to zero, so the lengths of the "minor" axes in FIG. 18 are both equal to zero. As shown in FIG. 18, the mean vector 1830 $\mu$ is given by:

$$\mu = \frac{1}{2}\left[\begin{pmatrix}1\\1\\1\end{pmatrix}+\begin{pmatrix}-1\\0\\1\end{pmatrix}\right] = \begin{pmatrix}0\\1/2\\1\end{pmatrix},$$

and the matrix M has the mean vector 1830 $\mu$ for both columns. As shown in FIG. 18, PCA is nothing more than a principal axis rotation of the original variable axes (here, the respective rapid thermal processing tool and/or parameter values for each of the 3 variables) about the endpoint of the mean vector 1830 $\mu$, with coordinates (0,1/2,1) with respect to the original coordinate axes and coordinates [0,0,0] with respect to the new Principal Component axes 1860, 1870 and 1880. The Loadings are merely the direction cosines of the new Principal Component axes 1860, 1870 and 1880 with respect to the original variable axes. The Scores are simply the coordinates of the data points 1810 and 1820, $[5^{0.5}/2,0,0]$ and $[-5^{0.5}/2,0,0]$, respectively, referred to the new Principal Component axes 1860, 1870 and 1880.

The mean-scaled 3×2 data matrix C−M, its transpose, the 2×3 matrix $(C-M)^T$, their 2×2 matrix product $(C-M)^T(C-M)$, and their 3×3 matrix product $(C-M)(C-M)^T$ are given by:

$$C - M = \begin{pmatrix}1 & -1\\1 & 0\\1 & 1\end{pmatrix} - \begin{pmatrix}0 & 0\\1/2 & 1/2\\1 & 1\end{pmatrix} = \begin{pmatrix}1 & -1\\1/2 & -1/2\\0 & 0\end{pmatrix}$$

$$(C-M)^T = \begin{pmatrix}1 & 1/2 & 0\\-1 & -1/2 & 0\end{pmatrix}$$

$$(C-M)^T(C-M) = \begin{pmatrix}1 & 1/2 & 0\\-1 & -1/2 & 0\end{pmatrix}\begin{pmatrix}1 & -1\\1/2 & -1/2\\0 & 0\end{pmatrix} = \begin{pmatrix}5/4 & -5/4\\-5/4 & 5/4\end{pmatrix}$$

$$(C-M)(C-M)^T = \begin{pmatrix}1 & -1\\1/2 & -1/2\\0 & 0\end{pmatrix}\begin{pmatrix}1 & 1/2 & 0\\-1 & -1/2 & 0\end{pmatrix} = \begin{pmatrix}2 & 1 & 0\\1 & 1/2 & 0\\0 & 0 & 0\end{pmatrix}$$

The 3×3 matrix $(C-M)(C-M)^T$ is the covariance matrix $S_{3\times3}$, having elements $s_{ij}$, where i=1,2,3, and j=1,2,3, defined so that:

$$s_{ij} = \frac{2\sum_{k=1}^{2}c_{ik}c_{jk} - \sum_{k=1}^{2}c_{ik}\sum_{k=1}^{2}c_{jk}}{2(2-1)},$$

corresponding to the rectangular 3×2 matrix $C_{3\times2}$.

EIG reveals that the eigenvalues $\lambda$ of the matrix product $(C-M)^T(C-M)$ are 5/2 and 0, for example, by finding solutions to the secular equation:

$$\begin{vmatrix}5/4-\lambda & -5/4\\-5/4 & 5/4-\lambda\end{vmatrix} = 0.$$

The eigenvectors of the matrix product $(C-M)^T(C-M)$ are solutions t of the equation $(C-M)^T(C-M)t=\lambda t$, which may be rewritten as $((C-M)^T(C-M)-\lambda))t=0$. For the eigenvalue $\lambda_1=5/2$, the eigenvector $t_1$ may be $$\begin{pmatrix}5/4-\lambda & -5/4\\-5/4 & 5/4-\lambda\end{pmatrix}t = \begin{pmatrix}-5/4 & -5/4\\-5/4 & -5/4\end{pmatrix}t = 0$$

to be $t_1^T=(1,-1)$. For the eigenvalue $\lambda_1=0$, the eigenvector $t_2$ may be seen by $$\begin{pmatrix}5/4-\lambda & -5/4\\-5/4 & 5/4-\lambda\end{pmatrix}t = \begin{pmatrix}5/4 & -5/4\\-5/4 & 5/4\end{pmatrix}t = 0$$

to be $t_2^T=(1,1)$.

The power method, for example, may be used to determine the eigenvalues $\lambda$ and eigenvectors p of the matrix product $(C-M)(C-M)^T$, where the eigenvalues $\lambda$ and the eigenvectors p are solutions p of the equation $((C-M)(C-M)^T)p=\lambda p$. A trial eigenvector $p^T=(1,1,1)$ may be used:

$$((C-M)(C-M)^T)p = \begin{pmatrix}2 & 1 & 0\\1 & 1/2 & 0\\0 & 0 & 0\end{pmatrix}\begin{pmatrix}1\\1\\1\end{pmatrix} = \begin{pmatrix}3\\3/2\\0\end{pmatrix} = 3\begin{pmatrix}1\\1/2\\0\end{pmatrix} = 3q$$

$$((C-M)(C-M)^T)\underline{q} =$$

$$\begin{pmatrix} 2 & 1 & 0 \\ 1 & 1/2 & 0 \\ 0 & 0 & 0 \end{pmatrix} \begin{pmatrix} 1 \\ 1/2 \\ 0 \end{pmatrix} = \begin{pmatrix} 5/2 \\ 5/4 \\ 0 \end{pmatrix} = 5/2 \begin{pmatrix} 1 \\ 1/2 \\ 0 \end{pmatrix} = \lambda_1 \underline{p}_1.$$

This illustrates that the trial eigenvector $p^T=(1,1,1)$ gets replaced by the improved trial eigenvector $q^T=(1,1/2,0)$ that happened to correspond to the eigenvector $p_1^T=(1,1/2,0)$ belonging to the eigenvalue $\lambda_1=5/2$. The power method then proceeds by subtracting the outer product matrix $p_1 p_1^T$ from the matrix product $(C-M)(C-M)^T$ to form a residual matrix $R_1$:

$$R_1 =$$

$$\begin{pmatrix} 2 & 1 & 0 \\ 1 & 1/2 & 0 \\ 0 & 0 & 0 \end{pmatrix} - \begin{pmatrix} 1 \\ 1/2 \\ 0 \end{pmatrix} (1 \; 1/2 \; 0) = \begin{pmatrix} 2 & 1 & 0 \\ 1 & 1/2 & 0 \\ 0 & 0 & 0 \end{pmatrix} - \begin{pmatrix} 1 & 1/2 & 0 \\ 1/2 & 1/4 & 0 \\ 0 & 0 & 0 \end{pmatrix}$$

$$R_1 = \begin{pmatrix} 1 & 1/2 & 0 \\ 1/2 & 1/4 & 0 \\ 0 & 0 & 0 \end{pmatrix}.$$

Another trial eigenvector $p^T=(-1,2,0)$, orthogonal to the eigenvector $p_1^T=(1,1/2,0)$ may be used:

$$((C-M)(C-M)^T - \underline{p}_1\underline{p}_1^T)\underline{p} =$$

$$R_1\underline{p} = \begin{pmatrix} 1 & 1/2 & 0 \\ 1/2 & 1/4 & 0 \\ 0 & 0 & 0 \end{pmatrix} \begin{pmatrix} -1 \\ 2 \\ 0 \end{pmatrix} = \begin{pmatrix} 0 \\ 0 \\ 0 \end{pmatrix} = 0 \begin{pmatrix} -1 \\ 2 \\ 0 \end{pmatrix} = \lambda_2 \underline{p}_2.$$

This indicates that the trial eigenvector $p^T=(-1,2,0)$ happened to correspond to the eigenvector $p_2^T=(-1,2,0)$ belonging to the eigenvalue $\lambda_2=0$. The power method then proceeds by subtracting the outer product matrix $p_2 p_2^T$ from the residual matrix $R_1$ to form a second residual matrix $R_2$:

$$R_2 =$$

$$\begin{pmatrix} 1 & 1/2 & 0 \\ 1/2 & 1/4 & 0 \\ 0 & 0 & 0 \end{pmatrix} - \begin{pmatrix} -1 \\ 2 \\ 0 \end{pmatrix}(-1 \; 2 \; 0) = \begin{pmatrix} 1 & 1/2 & 0 \\ 1/2 & 1/4 & 0 \\ 0 & 0 & 0 \end{pmatrix} - \begin{pmatrix} 1 & -2 & 0 \\ -2 & 4 & 0 \\ 0 & 0 & 0 \end{pmatrix}$$

$$R_2 = \begin{pmatrix} 0 & 5/2 & 0 \\ 5/2 & -15/4 & 0 \\ 0 & 0 & 0 \end{pmatrix}.$$

Another trial eigenvector $p^T=(0,0,1)$, orthogonal to the eigenvectors $p_1^T=(1,1/2,0)$ and $p_2^T=(-1,2,0)$ may be used:

$$((C-M)(C-M)^T - \underline{p}_1\underline{p}_1^T - \underline{p}_2\underline{p}_2^T)\underline{p} =$$

$$R_2\underline{p} = \begin{pmatrix} 1 & 5/2 & 0 \\ 5/2 & -15/4 & 0 \\ 0 & 0 & 0 \end{pmatrix} \begin{pmatrix} 0 \\ 0 \\ 1 \end{pmatrix} = \begin{pmatrix} 0 \\ 0 \\ 0 \end{pmatrix}$$

$$((C-M)(C-M)^T - \underline{p}_1\underline{p}_1^T - \underline{p}_2\underline{p}_2^T)\underline{p} = R_2\underline{p} = 0\begin{pmatrix} 0 \\ 0 \\ 1 \end{pmatrix} = \lambda_3 \underline{p}_3.$$

This indicates that the trial eigenvector $p^T=(0,0,1)$ happened to correspond to the eigenvector $p_3^T=(0,0,1)$ belonging to the eigenvalue $\lambda_3=0$. Indeed, one may readily verify that:

$$((C-M)(C-M)^T)\underline{p}_3 = \begin{pmatrix} 2 & 1 & 0 \\ 1 & 1/2 & 0 \\ 0 & 0 & 0 \end{pmatrix} \begin{pmatrix} 0 \\ 0 \\ 1 \end{pmatrix} = \begin{pmatrix} 0 \\ 0 \\ 0 \end{pmatrix} = 0\begin{pmatrix} 0 \\ 0 \\ 1 \end{pmatrix} = \lambda_3 \underline{p}_3.$$

Similarly, SVD of C-M shows that $C-M=PT^T$, where P is the Principal Component matrix (whose columns are orthonormalized eigenvectors proportional to $p_1$, $p_2$ and $p_3$, and whose elements are the Loadings, the direction cosines of the new Principal Component axes 1860, 1870 and 1880 related to the original variable axes) and T is the Scores matrix (whose rows are the coordinates of the data points 1810 and 1820, referred to the new Principal Component axes 1860, 1870 and 1880):

$$C-M = \begin{pmatrix} \frac{2}{\sqrt{5}} & \frac{-1}{\sqrt{5}} & 0 \\ \frac{1}{\sqrt{5}} & \frac{2}{\sqrt{5}} & 0 \\ 0 & 0 & 1 \end{pmatrix} \begin{pmatrix} \sqrt{5} & 0 & 0 \\ 0 & 0 & 0 \\ 0 & 0 & 0 \end{pmatrix} \begin{pmatrix} \frac{1}{\sqrt{2}} & \frac{-1}{\sqrt{2}} \\ \frac{1}{\sqrt{2}} & \frac{1}{\sqrt{2}} \end{pmatrix}$$

$$C-M = \begin{pmatrix} \frac{2}{\sqrt{5}} & \frac{-1}{\sqrt{5}} & 0 \\ \frac{1}{\sqrt{5}} & \frac{2}{\sqrt{5}} & 0 \\ 0 & 0 & 1 \end{pmatrix} \begin{pmatrix} \sqrt{5} & -\sqrt{5} \\ \sqrt{2} & \sqrt{2} \\ 0 & 0 \\ 0 & 0 \end{pmatrix} = PT^T.$$

The transpose of the Scores matrix ($T^T$) is given by the product of the matrix of eigenvalues of C-M with a matrix whose rows are orthonormalized eigenvectors proportional to $t_1$, and $t_2$. As shown in FIG. 18, the direction cosine (Loading) of the first Principal Component axis 1860 with respect to the variable 1 values axis is given by $$\cos\Theta_{11} = \frac{2}{\sqrt{5}},$$

and the direction cosine (Loading) of the first Principal Component axis 1860 with respect to the variable 2 values axis is given by $$\cos\Theta_{21} = \frac{1}{\sqrt{5}}.$$

Similarly, the direction cosine (Loading) of the first Principal Component axis 1860 with respect to the variable 3 values axis is given by $$\cos\Theta_{31} = \cos\left(\frac{\pi}{2}\right) = 0.$$

Similarly, the direction cosine (Loading) of the second Principal Component axis 1870 with respect to the variable 1 values axis is given by $$\cos\Theta_{12} = \frac{-1}{\sqrt{5}},$$

the direction cosine (Loading) of the second Principal Component axis 1870 with respect to the variable 2 values axis is given by $$\cos\Theta_{22} = \frac{2}{\sqrt{5}},$$

and the direction cosine (Loading) of the second Principal Component axis 1870 with respect to the variable 3 values axis is given by $$\cos\Theta_{32} = \cos\left(\frac{\pi}{2}\right) = 0.$$

Lastly, the direction cosine (Loading) of the third Principal Component axis 1880 with respect to the variable 1 values axis is given by $$\cos\Theta_{13} = \cos\left(\frac{\pi}{2}\right) = 0,$$

the direction cosine (Loading) of the third Principal Component axis 1880 with respect to the variable 2 values axis is given by $$\cos\Theta_{23} = \cos\left(\frac{\pi}{2}\right) = 0,$$

and the direction cosine (Loading) of the third Principal Component axis 1880 with respect to the variable 3 values axis is given by $\cos\Theta_{33} = \cos(0) = 1$.

SVD confirms that the singular values of C-M are $\sqrt{5}/\sqrt{2}$ and 0, the non-negative square roots of the eigenvalues $\lambda_1 = 5/2$ and $\lambda_2 = 0$ of the matrix product $(C-M)^T(C-M)$. Note that the columns of the Principal Component matrix P are the orthonormalized eigenvectors of the matrix product $(C-M)(C-M)^T$.

Figure 19:
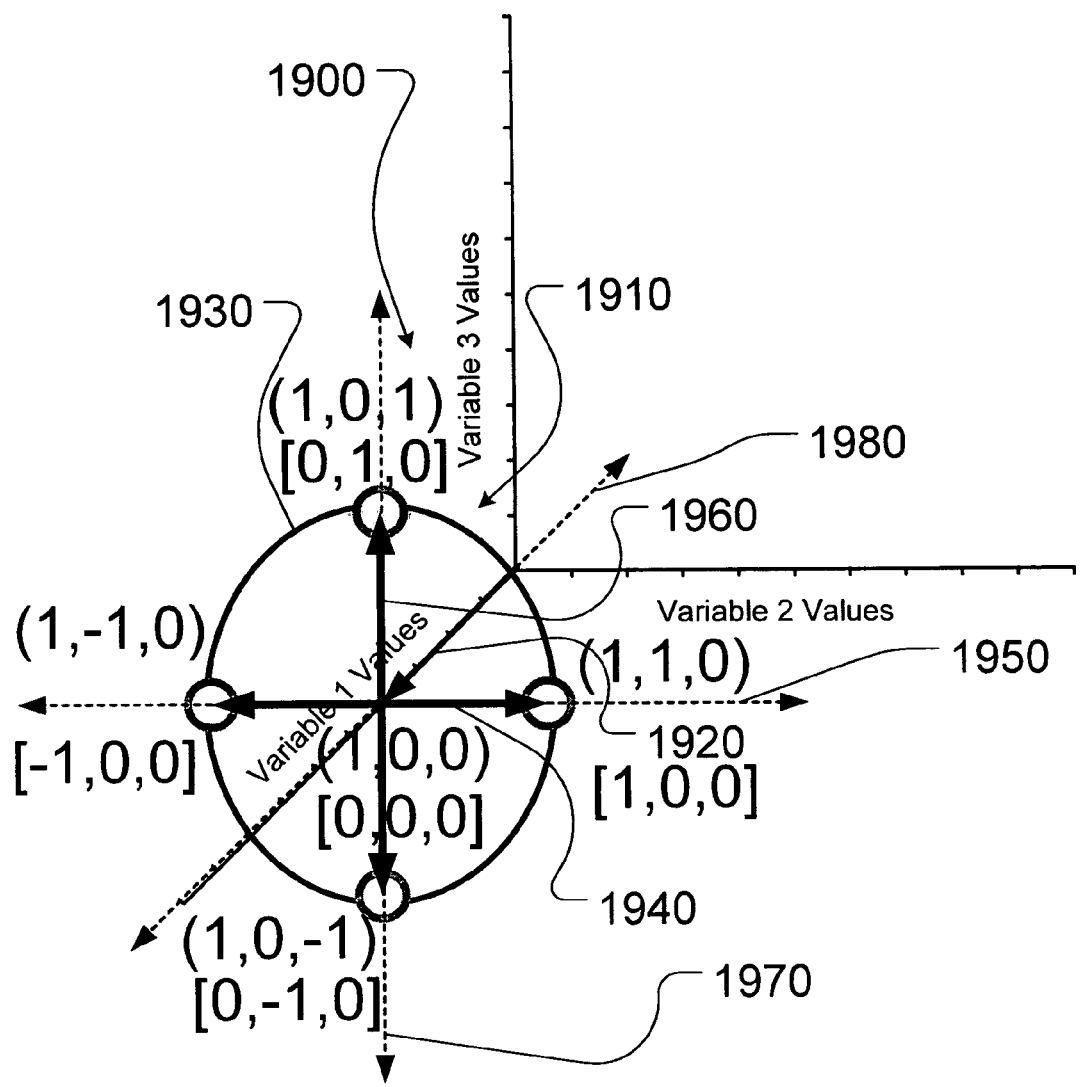

Taking another example, a 3×4 matrix D (identical to the 3×4 matrix $B^T$ given above):

$$D = \begin{pmatrix} 1 & 1 & 1 & 1 \\ 1 & 0 & 0 & -1 \\ 0 & 1 & -1 & 0 \end{pmatrix}$$

may be taken as the overall data matrix X (again for the sake of simplicity), corresponding to 4 runs over 3 variables. As shown in FIG. 19, a scatterplot 1900 of data points with coordinates (1,1,0), (1,0,1), (1,0,−1) and (1,−1,0), respectively, may be plotted in a 3-dimensional variable space where the variables are respective rapid thermal processing tool and/or parameter values for each of the 3 variables. The mean vector 1920 $\mu$ may lie at the center of a 2-dimensional Principal Component ellipsoid 1930 (really a circle, a somewhat degenerate ellipsoid). The mean vector 1920 $\mu$ may be determined by taking the average of the columns of the overall 3×4 data matrix D. The Principal Component ellipsoid 1930 may have a first Principal Component 1940 (the "major" axis in FIG. 19, with length 2, lying along a first Principal Component axis 1950), a second Principal Component 1960 (the "minor" axis in FIG. 19, also with length 2, lying along a second Principal Component axis 1970), and no third Principal Component lying along a third Principal Component axis 1980. Here, two of the eigenvalues of the mean-scaled data matrix D-M are equal, so the lengths of the "major" and "minor" axes of the Principal Component ellipsoid 1930 in FIG. 19 are both equal, and the remaining eigenvalue is equal to zero, so the length of the other "minor" axis of the Principal Component ellipsoid 1930 in FIG. 19 is equal to zero. As shown in FIG. 19, the mean vector 1920 $\mu$ is given by:

$$\mu = \frac{1}{4}\left[\begin{pmatrix}1\\1\\0\end{pmatrix} + \begin{pmatrix}1\\0\\1\end{pmatrix} + \begin{pmatrix}1\\0\\-1\end{pmatrix} + \begin{pmatrix}1\\-1\\0\end{pmatrix}\right] = \begin{pmatrix}1\\0\\0\end{pmatrix}$$

and the matrix M has the mean vector 1920 $\mu$ for all 4 columns. As shown in FIG. 19, PCA is nothing more than a principal axis rotation of the original variable axes (here, the respective rapid thermal processing tool and/or parameter values for each of the 3 variables) about the endpoint of the mean vector 1920 $\mu$, with coordinates (1,0,0) with respect to the original coordinate axes and coordinates [0,0,0] with respect to the new Principal Component axes 1950, 1970 and 1980. The Loadings are merely the direction cosines of the new Principal Component axes 1950, 1970 and 1980 with respect to the original variable axes. The Scores are simply the coordinates of the data points, [1,0,0], [0,1,0], [0,−1,0] and [−1,0,0], respectively, referred to the new Principal Component axes 1950, 1970 and 1980.

The 3×3 matrix product $(D-M)(D-M)^T\mu$ is given by:

$$(D-M)(D-M)^T = \begin{pmatrix} 0 & 0 & 0 & 0 \\ 1 & 0 & 0 & -1 \\ 0 & 1 & -1 & 0 \end{pmatrix} \begin{pmatrix} 0 & 1 & 0 \\ 0 & 0 & 1 \\ 0 & 0 & -1 \\ 0 & -1 & 0 \end{pmatrix} = \begin{pmatrix} 0 & 0 & 0 \\ 0 & 2 & 0 \\ 0 & 0 & 2 \end{pmatrix}.$$

The 3×3 matrix $(D-M)(D-M)^T$ is 3 times the covariance matrix $S_{3\times 3}$, having elements $s_{ij}$, where i=1,2,3, and j=1,2,3, defined so that:

$$S_{ij} = \frac{4\sum_{k=1}^{4} d_{ik} d_{jk} - \sum_{k=1}^{4} d_{ik} \sum_{k=1}^{4} d_{jk}}{4(4-1)},$$

corresponding to the rectangular 3×4 matrix $D_{3 \times 4}$.

EIG reveals that the eigenvalues of the matrix product $(D-M)(D-M)^T$ are 0, 2 and 2. The eigenvectors of the matrix product $(D-M)(D-M)^T$ are solutions p of the equation $((D-M)(D-M)^T)p=\lambda p$, and may be seen by inspection to be $p_1^T=(0,1,0)$, $p_2^T=(0,0,1)$, and $p_3^T=(1,0,0)$, belonging to the eigenvalues $\lambda_1=2$, $\lambda_2=2$, and $\lambda_3=0$, respectively (following the convention of placing the largest eigenvalue first).

As may be seen in FIG. 19, the direction cosine (Loading) of the first Principal Component axis 1950 with respect to the variable 1 values axis is given by $$\cos\Theta_{11} = \cos\left(\frac{\pi}{2}\right) = 0,$$

the direction cosine (Loading) of the first Principal Component axis 1970 with respect to the variable 2 values axis is given by $\cos \Theta_{21}=\cos (0)=1$, and the direction cosine (Loading) of the first Principal Component axis 1060 with respect to the variable 3 values axis is given by $$\cos\Theta_{31} = \cos\left(\frac{\pi}{2}\right) = 0.$$

Similarly, the direction cosine (Loading) of the second Principal Component axis 1970 with respect to the variable 1 values axis is given by $$\cos\Theta_{12} = \cos\left(\frac{\pi}{2}\right) = 0,$$

the direction cosine (Loading) of the second Principal Component axis 1970 with respect to the variable 2 values axis is given by $$\cos\Theta_{22} = \cos\left(\frac{\pi}{2}\right) = 0,$$

and the direction cosine (Loading) of the second Principal Component axis 1970 with respect to the variable 3 values axis is given by Cos $\Theta_{32}=\cos (0)=1$. Lastly, the direction cosine (Loading) of the third Principal Component axis 1980 with respect to the variable 1 values axis is given by cos $\Theta_{13}=\cos (0)=1$, the direction cosine (Loading) of the third Principal Component axis 1980 with respect to the variable 2 values axis is given by $$\cos\Theta_{23} = \cos\left(\frac{\pi}{2}\right) = 0,$$

and the direction cosine (Loading) of the third Principal Component axis 1980 with respect to the variable 3 values axis is given by $$\cos\Theta_{33} = \cos\left(\frac{\pi}{2}\right) = 0.$$

The transpose of the Scores matrix $T^T$ may be obtained simply by multiplying the mean-scaled data matrix D−M on the left by the transpose of the Principal Component matrix P, whose columns are $p_1$, $p_2$, $p_3$, the orthonormalized eigenvectors of the matrix product $(D-M)(D-M)^T$:

$$T^T = P^T(D - M) = \begin{pmatrix} 0 & 1 & 0 \\ 0 & 0 & 1 \\ 1 & 0 & 0 \end{pmatrix} \begin{pmatrix} 0 & 0 & 0 & 0 \\ 1 & 0 & 0 & -1 \\ 0 & 1 & -1 & 0 \end{pmatrix} = \begin{pmatrix} 1 & 0 & 0 & -1 \\ 0 & 1 & -1 & 0 \\ 0 & 0 & 0 & 0 \end{pmatrix}.$$

The columns of the transpose of the Scores matrix $T^T$ (or, equivalently, the rows of the Scores matrix T) are, indeed, the coordinates of the data points, [1,0,0], [0,1,0], [0,−1,0] and [−1,0,0], respectively, referred to the new Principal Component axes 1950, 1970 and 1980.

The matrices C and D discussed above have been used for the sake of simplifying the presentation of PCA and the power method, and are much smaller than the data matrices encountered in illustrative embodiments of the present invention. For example, in various illustrative embodiments, about m=100–600 processing runs may be measured and/or monitored over n=10–60 processing tool variables and/or processing parameters. Brute force modeling, regressing all m=100–600 runs over n=10–60 variables, may constitute an ill-conditioned regression problem. Techniques such as PCA and/or partial least squares (PLS, also known as projection to latent structures) reduce the complexity in such cases by revealing the hierarchical ordering of the data based on levels of decreasing variability. In PCA, this involves finding successive Principal Components. In PLS techniques such as NIPALS, this involves finding successive latent vectors. In various illustrative embodiments, the tool and/or sensor drift during about m=100–600 processing runs measured and/or monitored over n=10–60 processing tool variables and/or processing parameters may be mapped to an equivalent problem of the dynamic flow of about m=100–600 points (representing the m=100–600 processing runs) through an n-dimensional space (representing the n=10–60 variables). PCA may be used, for example, to correct the rapid thermal processing by indicating an appropriate multi-dimensional "rotation" to be made on the processing tool variables and/or processing parameters to compensate for the tool and/or sensor drift from the respective setpoint values.

In various alternative illustrative embodiments, adaptive sampling processing models may be build in alternative ways. Such adaptive sampling processing models may also be formed by monitoring one or more tool variables and/or one or more processing parameters during one or more processing runs. Examples of such tool variables and/or processing parameters may comprise one or more pyrometer trace readings, one or more lamp power trace readings, one or more tube temperature trace readings, one or more current readings, one or more infrared (IR) signal readings, one or more optical emission spectrum readings, one or more process gas temperature readings, one or more process gas pressure readings, one or more process gas flow rate readings, one or more etch depths, one or more process layer thicknesses, one or more resistivity readings, and the like. In these various alternative illustrative embodiments, building the adaptive sampling processing models may comprise fitting the collected processing data using at least one of polynomial curve fitting, least-squares fitting, polynomial least-squares fitting, non-polynomial least-squares fitting, weighted least-squares fitting, weighted polynomial least-squares fitting, and weighted non-polynomial least-squares fitting, either in addition to, or as an alternative to, using Partial Least Squares (PLS) and/or Principal Components Analysis (PCA), as described above.

In various illustrative embodiments, samples may be collected for N+1 data points $(x_i, y_i)$, where i=1, 2, ..., N, N+1, and a polynomial of degree N, $$P_N(x) = a_0 + a_1 x + a_2 x^2 + \cdots + a_k x^k + \cdots + a_N x^N = \sum_{k=0}^{N} a_k x^k,$$

may be fit to the N+1 data points $(x_i, y_i)$. For example, 100 time data points (N=99) may be taken relating the pyrometer trace reading p, the lamp power trace reading f and/or the tube temperature trace reading T, during a processing step, to the effective yield t of workpieces emerging from the processing step, resulting in respective sets of N+1 data points $(p_i, t_i)$, $(f_i, t_i)$, and/or $(T_i, t_i)$. The values may be the actually measured values of the processing tool variables and/or processing parameters, or ratios of actually measured values (normalized to respective reference setpoints), or logarithms of such ratios, for example. Polynomial interpolation is described, for example, in *Numerical Methods for Scientists and Engineers*, by R. W. Hamming, Dover Publications, New York, 1986, at pages 230–235. The requirement that the polynomial $P_N(x)$ pass through the N+1 data points $(x_i, y_i)$ is $$y_i = P_N(x_i) = \sum_{k=0}^{N} a_k x_i^k,$$

for i=1, 2, ..., N, N+1, a set of N+1 conditions. These N+1 bconditions then completely determine the N+1 coefficients $a_k$, for k=0, 1, ..., N.

The determinant of the coefficients of the unknown coefficients $a_k$ is the Vandermonde determinant:

$$V_{N+1} = \begin{vmatrix} 1 & x_1 & x_1^2 & \cdots & x_1^N \\ 1 & x_2 & x_2^2 & \cdots & x_2^N \\ \vdots & \vdots & \vdots & \ddots & \vdots \\ 1 & x_N & x_N^2 & \cdots & x_N^N \\ 1 & x_{N+1} & x_{N+1}^2 & \cdots & x_{N+1}^N \end{vmatrix} = |x_i^k|,$$

where i=1, 2, ..., N+1, and k=0, 1, ..., N. The Vandermonde determinant $V_{N+1}$, considered as a function of the variables $x_i$, $V_{N+1}=V_{N+1}(x_1, x_2, \ldots, x_N, x_{N+1})$, is clearly a polynomial in the variables $x_i$, as may be seen by expanding out the determinant, and a count of the exponents shows that the degree of the polynomial is $$0 + 1 + 2 + 3 + \cdots + k + \cdots + N = \sum_{k=0}^{N} k = \frac{N(N+1)}{2}$$

(for example, the diagonal term of the Vandermonde determinant $V_{N+1}$ is $1 \cdot x_2 \cdot x_3^2 \cdots x_N^{N-1} \cdot x_{N+1}^N$).

Now, if $x_{N+1}=x_j$, for j=1, 2, ..., N, then the Vandermonde determinant $V_{N+1}=0$, since any determinant with two identical rows vanishes, so the Vandermonde determinant $V_{N+1}$ must have the factors $(x_{N+1}-x_j)$, for j=1, 2, ..., N, corresponding to the N factors $$\prod_{j=1}^{N-1} (x_{N+1} - x_j).$$

Similarly, if $x_N=x_j$, for j=1, 2, ..., N-1, then the Vandermonde determinant $V_{N+1}=0$, so the Vandermonde determinant $V_{N+1}$ must also have the factors $(x_N-x_j)$, for j=1, 2, ... N-1, corresponding to the N-1 factors $$\prod_{j=1}^{N-1} (x_N - x_j).$$

Generally, if $x^m = x_j$, for $j \leq m$, where m=2, ..., N, N+1, then the Vandermonde determinant $V_{N+1}=0$, so the Vandermonde determinant $V_{N+1}$ must have all the factors $(x_m - x_j)$, for j<m, where m=2, ..., N, N+1, corresponding to the factors $$\prod_{n' > j=1}^{N+1} (x_m - x_j).$$

Altogether, this represents a polynomial of degree $$N + (N-1) + \ldots + k + \ldots + 2 + 1 = \sum_{k=1}^{N} k = \frac{N(N+1)}{2},$$

since, when m=N+1, for example, j may take on any of N values, j=1, 2, ..., N, and when m=N, j may take on any of N-1 values, j=1, 2, ..., N-1, and so forth (for example, when m=3, j may take only two values, j=1, 2, and when m=2, j may take only one value, j=1), which means that all the factors have been accounted for and all that remains is to find any multiplicative constant by which these two representations for the Vandermonde determinant $V_{N+1}$ might differ. As noted above, the diagonal term of the Vandermonde determinant $V_{N+1}$ is $1 \cdot x_2 \cdot x_3^2 \cdots x_N^{N-1} \cdot x_{N+1}^N$, and this may be compared to the term from the left-hand sides of the product of factors $$\prod_{m>j=1}^{N+1}(x_m - x_j) =$$

$$\prod_{j=1}^{N}(x_{N+1} - x_j)\prod_{j=1}^{N-1}(x_N - x_j)\ldots\prod_{j=1}^{2}(x_3 - x_j)\prod_{j=1}^{1}(x_2 - x_j),$$

$x_{N+1}{}^N \cdot x_N{}^{N-1} \ldots x_3{}^2 \cdot x_2$, which is identical, so the multiplicative constant is unity and the Vandermonde determinant $$V_{N+1} \text{ is } V_{N+1}(x_1, x_2, \ldots x_{N+1}) = |x_i^k| = \prod_{m>j=1}^{N+1}(x_m - x_j).$$

This factorization of the Vandermonde determinant $V_{N+1}$ shows that if $x_i \neq x_j$, for $i \neq j$, then the Vandermonde determinant $V_{N+1}$ cannot be zero, which means that it is always possible to solve for the unknown coefficients $a_k$, since the Vandermonde determinant $V_{N+1}$ is the determinant of the coefficients of the unknown coefficients $a_k$. Solving for the unknown coefficients $a_k$, using determinants, for example, substituting the results into the polynomial of degree N, $$P_N(x) = \sum_{k=0}^{N} a_k x^k,$$

and rearranging suitably gives the determinant equation $$\begin{vmatrix} y & 1 & x & x^2 & \ldots & x^N \\ y_1 & 1 & x_1 & x_1^2 & \ldots & x_1^N \\ y_2 & 1 & x_2 & x_2^2 & \ldots & x_2^N \\ \vdots & \vdots & \vdots & \vdots & \ddots & \vdots \\ y_N & 1 & x_N & x_N^2 & \ldots & x_N^N \\ y_{N+1} & 1 & x_{N+1} & x_{N+1}^2 & \ldots & x_{N+1}^N \end{vmatrix} = 0,$$

which is the solution to the polynomial fit. This may be seen directly as follows. Expanding this determinant by the elements of the top row, this is clearly a polynomial of degree N. The coefficient of the element y in the first row in the expansion of this determinant by the elements of the top row is none other than the Vandermonde determinant $V_{N+1}$. In other words, the cofactor of the element y in the first row is, in fact, the Vandermonde determinant $V_{N+1}$. Indeed, the cofactor of the nth element in the first row, where $n=2,\ldots,N+2$, is the product of the coefficient $a_{n-2}$ in the polynomial expansion $$y = P_N(x) = \sum_{k=0}^{N} a_k x^k$$

with the Vandermonde determinant $V_{N+1}$. Furthermore, if x and y take on any of the sample values $x_i$ and $y_i$, for $i=1, 2, \ldots, N, N+1$, then two rows of the determinant would be the same and the determinant must then vanish. Thus, the requirement that the polynomial $y=P_N(x)$ pass through the N+1 data points $(x_i, y_i)$, $$y_i = P_N(x_i) = \sum_{k=0}^{N} a_k x_i^k,$$

for $i=1, 2, \ldots, N, N-1$, is satisfied.

For example, a quadratic curve may be found that goes through the sample data set $(-1,a)$, $(0,b)$, and $(1,c)$. The three equations are $P_2(-1)=a=a_0-a_1+a_2$, $P_2(0)=b=a_0$, and $P_2(1)=c=a_0+a_1+a_2$, which imply that $b=a_0$, $c-a=2^a{}_1$, and $c+a-2b=2a_2$, so that $$y(x) = P_2(x) = b + \frac{c-a}{2}x + \frac{c+a-2b}{2}x^2,$$

which is also the result of expanding $$\begin{vmatrix} y & 1 & x & x^2 \\ a & 1 & -1 & 1 \\ b & 1 & 0 & 0 \\ c & 1 & 1 & 1 \end{vmatrix} =$$

$$0 = y\begin{vmatrix} 1 & -1 & 1 \\ 1 & 0 & 0 \\ 1 & 1 & 1 \end{vmatrix} - 1\begin{vmatrix} a & -1 & 1 \\ b & 0 & 0 \\ c & 1 & 1 \end{vmatrix} + x\begin{vmatrix} a & 1 & 1 \\ b & 1 & 0 \\ c & 1 & 1 \end{vmatrix} - x^2\begin{vmatrix} a & 1 & -1 \\ b & 1 & 0 \\ c & 1 & 1 \end{vmatrix},$$

the coefficient of y being the respective Vandermonde determinant $V_3=2$.

Similarly, a quartic curve may be found that goes through the sample data set $(-2,a)$, $(-1,b)$, $(0,c)$, $(1,b)$, and $(2,a)$. The five equations are $P_4(-2)=a=a_0-2a_1+4a_2-8a_3+16a_4$, $P_4(-1)=b=a_0-a_1+a_2-a_3+a_4$, $P_4(0)=c=a_0$, $P_4(1)=b=a_0+a_1+a_2+a_3+a_4$, and $P_4(2)=a=a_0+2a_1+4a_2+8a_3+16a_4$, which imply that $c=a_0$, $0=a_1=a_3$ (which also follows from the symmetry of the data set), $(a-c)-16(b-c)=-12a_2$, and $(a-c)-4(b-c)=12a_4$, so that $$y(x) = P_4(x) = c - \frac{a-16b+15c}{12}x^2 + \frac{a-4b+3c}{12}x^4.$$

In various alternative illustrative embodiments, samples may be collected for M data points $(x_i, y_i)$, where $i=1, 2, \ldots, M$, and a first degree polynomial (a straight line), $$P_1(x) = a_0 + a_1 x \sum_{k=0}^{1} a_k x^k,$$

may be fit (in a least-squares sense) to the M data points $(x_i, y_i)$. For example, 100 time data points (M=100) may be taken relating the pyrometer trace reading p, the lamp power trace reading f, and/or the tube temperature trace reading T, during a processing step, to the effective yield t of workpieces emerging from the processing step, resulting in the M data points $(p_i, t_i)$, $(f_i, t_i)$, and/or $(T_i, t_i)$. The values may be the actually measured values of the processing tool variables and/or processing parameters, or ratios of actually measured values (normalized to respective reference setpoints), or logarithms of such ratios, for example. Least-squares fitting is described, for example, in *Numerical Methods for Scientists and Engineers*, by R. W. Hamming, Dover Publications, New York, 1986, at pages 427–443.

The least-squares criterion may be used in situations where there is much more data available than parameters so that exact matching (to within round-off) is out of the question. Polynomials are most commonly used in least-squares matching, although any linear family of suitable functions may work as well. Suppose some quantity x is being measured by making M measurements $x_i$, for i=1, 2, ..., M, and suppose that the measurements $x_i$, are related to the "true" quantity x by the relation $x_i = x + \epsilon_i$, for i=1, 2, ..., M, where the residuals $\epsilon_i$ are regarded as noise. The principle of least-squares states that the best estimate $\xi$ of the true value x is the number that minimizes the sum of the squares of the deviations of the data from their estimate $$f(\xi) = \sum_{i=1}^{M} \epsilon_i^2 = \sum_{i=1}^{M} (x_i - \xi)^2,$$

which is equivalent to the assumption that the average $x_a$, where $$x_a = \frac{1}{M} \sum_{i=1}^{M} x_i,$$

is the best estimate $\xi$ of the true value x. This equivalence may be shown as follows. First, the principle of least-squares leads to the average $x_a$. Regarding $$f(\xi) = \sum_{i=1}^{M} \epsilon_i^2 = \sum_{i=1}^{M} (x_i - \xi)^2$$

as a function of the best estimate $\xi$, minimization with respect to the best estimate $\xi$ may proceed by differentiation:

$$\frac{df(\xi)}{d\xi} = -2 \sum_{i=1}^{M} (x_i - \xi) = 0,$$

which implies that $$\sum_{i=1}^{M} x_i - \sum_{i=1}^{M} \xi = 0 = \sum_{i=1}^{M} x_i - M\xi,$$

so that $$\xi = \frac{1}{M} \sum_{i=1}^{M} x_i = x_a,$$

or, in other words that the choice $x_a = \xi$ minimizes the sum of the squares of the residuals $\epsilon_i$. Noting also that $$\frac{d^2 f(\xi)}{d\xi^2} = 2 \sum_{i=1}^{M} 1 = 2M > 0,$$

the criterion for a minimum is established.

Conversely, if the average $x_a$ is picked as the best choice $x_a = \xi$, it can be shown that this choice, indeed, minimizes the sum of the squares of the residuals $\epsilon_i$. Set $$f(x_a) = \sum_{i=1}^{M} (x_i - x_a)^2 =$$

$$\sum_{i=1}^{M} x_i^2 - 2x_a \sum_{i=1}^{M} x_i + \sum_{i=1}^{M} x_a^2 = \sum_{i=1}^{M} x_i^2 - 2x_a M x_a + M x_a^2 = \sum_{i=1}^{M} x_i^2 - M x_a^2.$$

If any other value $x_b$ is picked, then, plugging that other value $x_b$ into f(x) gives $$f(x_b) =$$

$$\sum_{i=1}^{M} (x_i - x_b)^2 = \sum_{i=1}^{M} x_i^2 - 2x_b \sum_{i=1}^{M} x_i + \sum_{i=1}^{M} x_b^2 = \sum_{i=1}^{M} x_i^2 - 2x_b M x_a + M x_b^2.$$

Subtracting $f(x_a)$ from $f(x_b)$ gives $f(x_b) - f(x_a) = M[x_a^2 - 2x_a x_b + x_b^2] = M(x_a - x_b)^2 \geq 0$, so that $f(x_b) \geq f(x_a)$, with equality if, and only if, $x_b = x_a$. In other words, the average $x_a$, indeed, minimizes the sum of the squares of the residuals $\epsilon_i$. Thus, it has been shown that the principle of least-squares and the choice of the average as the best estimate are equivalent.

There may be other choices besides the least-squares choice. Again, suppose some quantity x is being measured by making M measurements $x_i$, for i=1, 2, ..., M, and suppose- that the measurements $x_i$, are related to the "true" quantity x by the relation $x_i = x + \epsilon_i$, for i=1, 2, ..., M, where the residuals $\epsilon_i$ are regarded as noise. An alternative to the least-squares choice may be that another estimate $\chi$ of the true value x is the number that minimizes the sum of the absolute values of the deviations of the data from their estimate $$f(\chi) = \sum_{i=1}^{M} |\epsilon_i| = \sum_{i=1}^{M} |x_i - \chi|,$$

which is equivalent to the assumption that the median or middle value $x_m$ of the M measurements $x_i$, for i=1, 2, ..., M (if M is even, then average the two middle values), is the other estimate $\chi$ of the true value x. Suppose that there are an odd number M=2k+1 of measurements $x_i$, for i=1, 2, ..., M, and choose the median or middle value $x_m$ as the estimate $\chi$ of the true value x that minimizes the sum of the absolute values of the residuals $\epsilon_i$. Any upward shift in this value $x_m$, would increase the k terms $|x_i - x|$ that have $x_i$ below $x_m$, and would decrease the k terms $|x_i - x|$ that have $x_i$ above $x_m$, each by the same amount. However, the upward shift in this value $x_m$ would also increase the term $|x_m - x|$ and, thus, increase the sum of the absolute values of all the residuals $\epsilon_i$. Yet another choice, instead of minimizing the sum of the squares of the residuals $\epsilon_i$, would be to choose to minimize the maximum deviation, which leads to $$\frac{x_{\min} + x_{\max}}{2} = x_{midrange},$$

the midrange estimate of the best value.

Returning to the various alternative illustrative embodiments in which samples may be collected for M data points $(x_i, y_i)$, where $i=1, 2, \ldots, M$, and a first degree polynomial (a straight line), $$P_1(x) = a_0 + a_1 x = \sum_{k=0}^{1} a_k x^k,$$

may be fit (in a least-squares sense) to the M data points $(x_i, y_i)$, there are two parameters, $a_0$ and $a_1$, and a function $F(a_0, a_1)$ that needs to be minimized as follows. The function $F(a_0, a_1)$ is given by $$F(a_0, a_1) = \sum_{i=1}^{M} \epsilon_i^2 = \sum_{i=1}^{M} [P_1(x_i) - y_i]^2 = \sum_{i=1}^{M} [a_0 + a_1 x_i - y_i]^2$$

and setting the partial derivatives of $F(a_0, a_1)$ with respect to $a_0$ and $a_1$, equal to zero gives $$\frac{\partial F(a_0, a_1)}{\partial a_0} = 2 \sum_{i=1}^{M} [a_0 + a_1 x_i - y_i] = 0$$

and $$\frac{\partial F(a_0, a_1)}{\partial a_1} = 2 \sum_{i=1}^{M} [a_0 + a_1 x_i - y_i] x_i = 0,$$

respectively. Simplifying and rearranging gives $$a_0 M + a_1 \sum_{i=1}^{M} x_i = \sum_{i=1}^{M} y_i$$

and $$a_0 \sum_{i=1}^{M} x_i + a_1 \sum_{i=1}^{M} x_i^2 = \sum_{i=1}^{M} x_i y_i,$$

respectively, where there are two equations for the two unknown parameters $a_0$ and $a_1$, readily yielding a solution.

Figure 20:
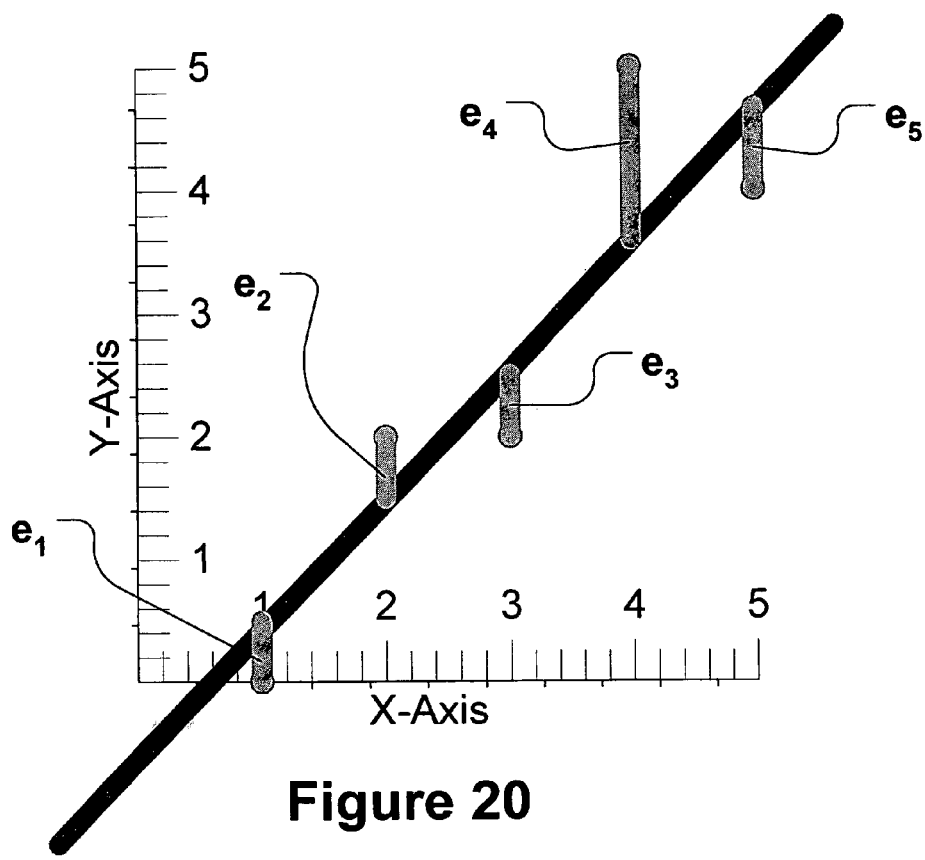

As shown in FIG. 20, for example, a first degree polynomial (a straight line), $$P_1(x) = a_0 + a_1 x = \sum_{k=0}^{1} a_k x^k,$$

may be fit (in a least-squares sense) to the M=5 data points (1,0), (2,2), (3,2), (4,5), and (5,4). The residuals $\epsilon_i$, for $i=1, 2, \ldots, 5$, are schematically illustrated in FIG. 20. The equations for the two parameters $a_0$ and $a_1$ are $5a_0 + 15a_1 = 13$ and $15a_0 + 55a_1 = 50$, respectively, so that, upon multiplying the first equation by 3 and then subtracting that from the second equation, thereby eliminating $a_0$, the solution for the parameter $a_1$ becomes $a_1 = 11/10$, and this implies that the solution for the parameter $a_0$ becomes $a_0 = -7/10$. The first degree polynomial (the straight line) that provides the best fit, in the least-squares sense, is $$P_1(x) = -\frac{7}{10} + \frac{11}{10}x = \frac{1}{10}(-7 + 11x),$$

as shown in FIG. 20.

Figure 21:
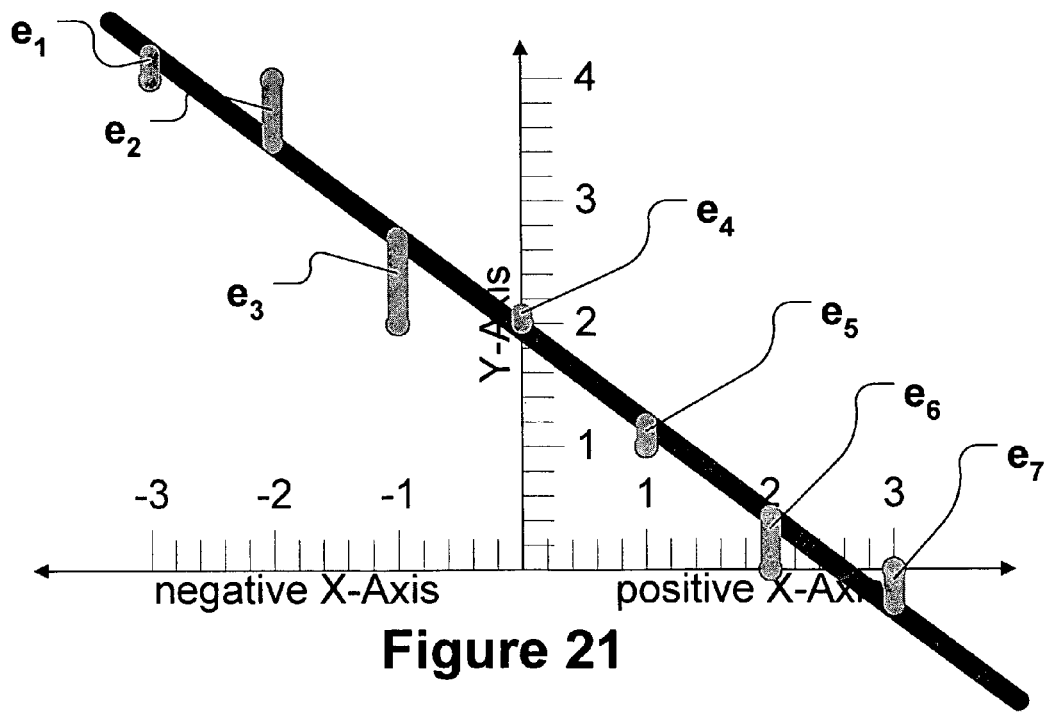

As shown in FIG. 21, for example, a first degree polynomial (a straight line), $$P_1(x) = a_0 + a_1 x = \sum_{k=0}^{1} a_k x^k,$$

may be fit (in a least-squares sense) to the M=7 data points (−3,4), (−2,4), (−1,2), (0,2), (1,1), (2,0), and (3,0). The residuals $\epsilon_i$, for $i=1, 2, \ldots, 7$, are schematically illustrated in FIG. 21. The equations for the two parameters $a_0$ and $a_1$ are $$a_0 M + a_1 \sum_{i=1}^{M} x_i =$$

$$\sum_{i=1}^{M} y_i = 7a_0 + a_1(-3 - 2 - 1 + 0 + 1 + 2 + 3) = (4 + 4 + 2 + 2 + 1 + 0 + 0)$$

and $$a_0 \sum_{i=1}^{M} x_i + a_1 \sum_{i=1}^{M} x_i^2 =$$

$$\sum_{i=1}^{M} x_i y_i = a_1(9 + 4 + 1 + 0 + 1 + 4 + 9) = (-12 - 8 - 2 + 0 + 1 + 0 + 0),$$

respectively, which give $7a_0 = 13$ and $28a_1 = -21$, respectively. In other words, $a_0 = 13/7$ and $a_1 = -3/4$, so that, the first degree polynomial (the straight line) that provides the best fit, in the least-squares sense, is $$P_1(x) = \frac{13}{7} - \frac{3}{4}x,$$

as shown in FIG. 21.

In various other alternative illustrative embodiments, samples may be collected for M data points $(x_i, y_i)$, where $i=1, 2, \ldots, M$, and a polynomial of degree N, $$P_N(x) = a_0 + a_1 x + a_2 x^2 + \ldots + a_k x^k + \ldots + a_N x^N = \sum_{k=0}^{N} a_k x^k,$$

may be fit (in a least-squares sense) to the M data points $(x_i, y_i)$. For example, 100 time data points (M=100) may be taken relating the pyrometer trace reading p, the lamp power trace reading f, and/or the tube temperature trace reading T, during a processing step, to the effective yield t of workpieces emerging from the processing step, resulting in the M data points $(p_i, t_i)$, $(f_i, t_i)$, and/or $(T_i, t_i)$. The values may be the actually measured values of the processing tool variables and/or processing parameters, or ratios of actually measured values (normalized to respective reference setpoints), or logarithms of such ratios, for example. In one illustrative embodiment, the degree N of the polynomial is at least 10 times smaller than M.

The function $F(a_0, a_1, \ldots, a_N)$ may be minimized as follows. The function $F(a_0, a_1, \ldots, a_N)$ is given by $$F(a_0, a_1, \ldots, a_N) = \sum_{i=1}^{M} \varepsilon_i^2 = \sum_{i=1}^{M} [P_N(x_i) - y_i]^2$$

and setting the partial derivatives of $F(a_0, a_1, \ldots, a_N)$ with respect to $a_j$, for $j=0, 1, \ldots, N$, equal to zero gives $$\frac{\partial F(a_0, a_1, \ldots, a_N)}{\partial a_j} = 2\sum_{i=1}^{M}[P_N(x_i) - y_i]x_i^j = 2\sum_{i=1}^{M}\left[\sum_{k=0}^{N} a_k x_i^k - y_i\right]x_i^j = 0,$$

for $j=0, 1, \ldots, N$, since $(x_i)^j$ is the coefficient of $a_j$ in the polynomial $$P_N(x_i) = \sum_{k=0}^{N} a_k x_i^k.$$

Simplifying and rearranging gives $$\sum_{i=1}^{M}\left[\sum_{k=0}^{N} a_k x_i^k\right]x_i^j = \sum_{k=0}^{N} a_k \left[\sum_{i=1}^{M} x_i^{k+j}\right] \equiv \sum_{k=0}^{N} a_k S_{k+j} = \sum_{i=1}^{M} x_i^j y_i \equiv T_j,$$

gives for $j=0, 1, \ldots, N$, where $$\sum_{i=1}^{M} x_i^{k+j} \equiv S_{k+j}$$

and $$\sum_{i=1}^{M} x_i^j y_i \equiv T_j,$$

respectively. There are N+1 equations $$\sum_{k=0}^{N} a_k S_{k+j} = 0$$

for $j=0, 1, \ldots, N$, also known as the normal equations, for the N+1 unknown parameters $a_k$, for $k=0, 1, \ldots, N$, readily yielding a solution, provided that the determinant of the normal equations is not zero. This may be demonstrated by showing that the homogeneous equations $$\sum_{j=0}^{N} a_j \sum_{k=0}^{N} a_k S_{k+j} =$$

$$\sum_{j=0}^{N} a_j \sum_{k=0}^{N} a_k \sum_{i=1}^{M} x_i^k x_i^j = \sum_{i=1}^{M}\left(\sum_{k=0}^{N} a_k x_i^k\right)\left(\sum_{j=0}^{N} a_j x_i^j\right) = \sum_{i=1}^{M}(P_N(x_i))^2 = 0,$$

only have the trivial solution $a_k=0$, for $k=0, 1, \ldots, N$, which may be shown as follows. Multiply the jth homogeneous equation by $a_j$ and sum over all j, from j=0 bto j=N, $$\sum_{j=0}^{N} a_j \sum_{k=0}^{N} a_k S_{k+j} =$$

$$\sum_{j=0}^{N} a_j \sum_{k=0}^{N} a_k \sum_{i=1}^{M} x_i^k x_i^j = \sum_{i=1}^{M}\left(\sum_{k=0}^{N} a_k x_i^k\right)\left(\sum_{j=0}^{N} a_j x_i^j\right) = \sum_{i=1}^{M}(P_N(x_i))^2 = 0,$$

which would imply that $P_N(x_i)=0$ and, hence, that $a_k=0$, for $k=0, 1, \ldots, N$, the trivial solution. Therefore, the determinant of the normal equations is not zero, and the normal equations may be solved for the N+1 parameters $a_k$, for $k=0, 1, \ldots, N$, the coefficients of the least-squares polynomial of degree N, $$P_N(x) = \sum_{k=0}^{N} a_k x^k,$$

that may be fit to the M data points $(x_i, y_i)$.

Finding the least-squares polynomial of degree N, $$P_N(x) = \sum_{k=0}^{N} a_k x^k,$$

that may be fit to the M data points $(x_i, y_i)$ may not be easy when the degree N of the least-squares polynomial is very large. The N+1 normal equations $$\sum_{k=0}^{N} a_k S_{k+j} = T_j,$$

for j=0, 1, . . . , N, for the N+1 unknown parameters $a_k$, for k=0, 1, . . . , N, may not be easy to solve, for example, when the degree N of the least-squares polynomial is much greater than about 10. This may be demonstrated as follows. Suppose that the M data points $(x_i, y_i)$ are more or less uniformly distributed in the interval $0 \leq x \leq 1$, so that $$S_{k+j} = \sum_{i=0}^{M} x_i^{k+j} \approx M \int_0^1 x^{k+j} dx = \frac{M}{k+j+1}.$$

The resulting determinant for the normal equations is then approximately given by $$|S_{k+j}| \approx \left| \frac{M}{k+j+1} \right| \approx M^{N+1} \left| \frac{1}{k+j+1} \right| = M^{N+1} H_{N+1},$$

for j,k=0, 1, . . . N, where $H_N$, for j,k=0, 1, . . . , N−1, is the Hilbert determinant of order N, which has the value $$H_N = \frac{[0!1!2!3! \ldots (N-1)!]^3}{N!(N+1)!(N+2)! \ldots (2N-1)!}$$

that approaches zero very rapidly. For example, $$H_1 = \frac{[0!]^3}{1!} = |1| = 1,$$

$$H_2 = \frac{[0!1!]^3}{2!3!} = \begin{vmatrix} 1 & \frac{1}{2} \\ \frac{1}{2} & \frac{1}{3} \end{vmatrix} = \frac{1}{3} - \frac{1}{4} = \frac{1}{12},$$

and $$H_3 = \frac{[0!1!2!]^3}{3!4!5!} = \begin{vmatrix} 1 & \frac{1}{2} & \frac{1}{3} \\ \frac{1}{2} & \frac{1}{3} & \frac{1}{4} \\ \frac{1}{3} & \frac{1}{4} & \frac{1}{5} \end{vmatrix},$$

where $$\begin{vmatrix} 1 & \frac{1}{2} & \frac{1}{3} \\ \frac{1}{2} & \frac{1}{3} & \frac{1}{4} \\ \frac{1}{3} & \frac{1}{4} & \frac{1}{5} \end{vmatrix} = \frac{1}{3} \begin{vmatrix} \frac{1}{2} & \frac{1}{3} \\ \frac{1}{3} & \frac{1}{4} \end{vmatrix} - \frac{1}{4} \begin{vmatrix} 1 & \frac{1}{2} \\ \frac{1}{3} & \frac{1}{4} \end{vmatrix} + \frac{1}{5} \begin{vmatrix} 1 & \frac{1}{2} \\ \frac{1}{2} & \frac{1}{3} \end{vmatrix} =$$

$$\frac{1}{3} \frac{1}{72} - \frac{1}{4} \frac{1}{12} + \frac{1}{5} \frac{1}{12} = \frac{1}{216} - \frac{1}{240} = \frac{1}{2160}.$$

This suggests that the system of normal equations is ill-conditioned and, hence, difficult to solve when the degree N of the least-squares polynomial is very large. Sets of orthogonal polynomials tend to be better behaved.

Figure 22:
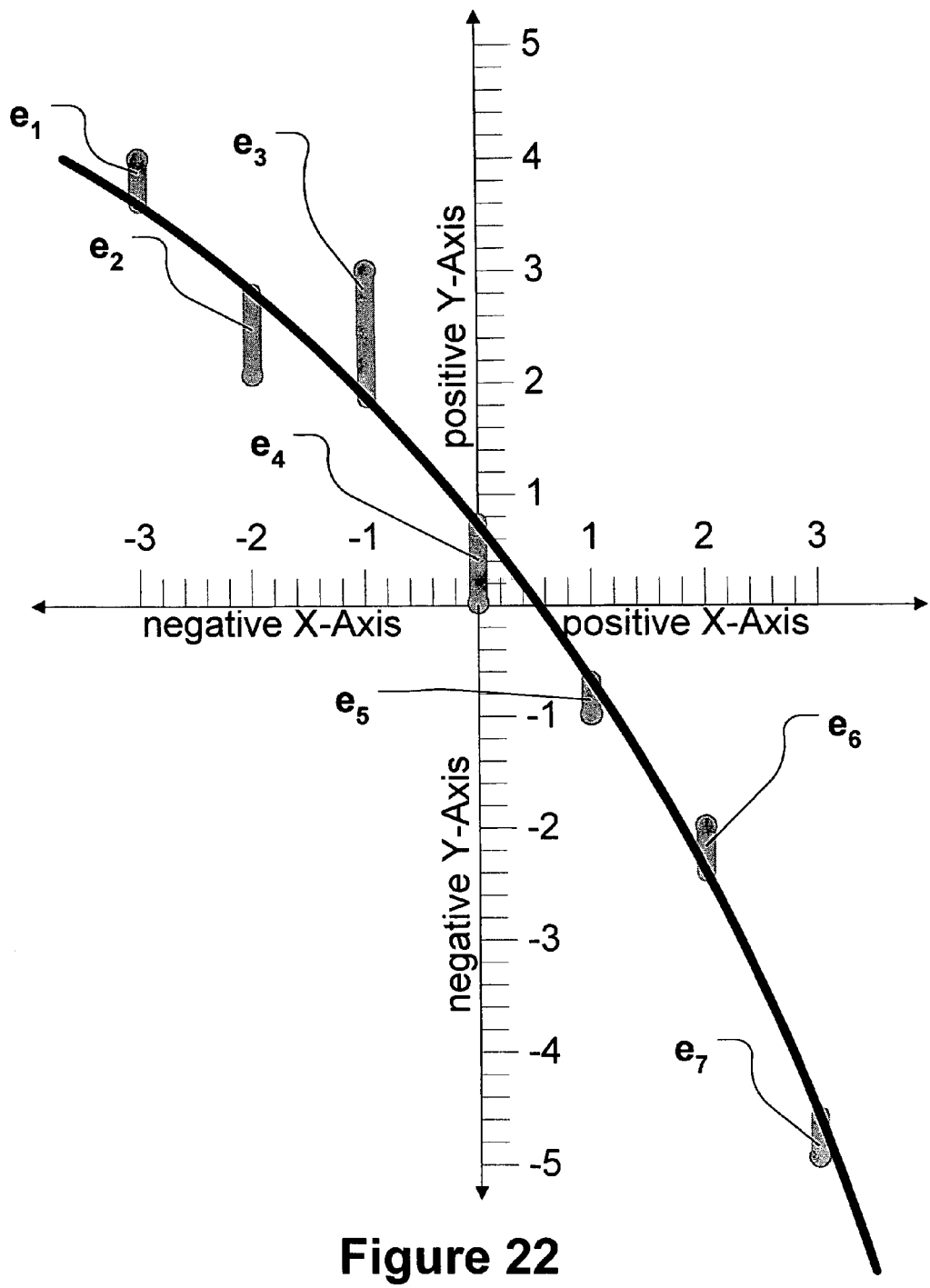

As shown in FIG. 22, for example, a second degree polynomial (a quadratic), $$P_2(x) = a_0 + a_1 x + a_2 x^2 = \sum_{k=0}^{2} a_k x^k,$$

may be fit (in a least-squares sense) to the M=7 data points (−3,4), (−2,2), (−1,3), (0,0), (1,−1), (2,−2), and (3,−5). The residuals $\epsilon_i$, for i=1, 2, . . . , 7, are schematically illustrated in FIG. 22. The three normal equations are $$\sum_{k=0}^{2} a_k S_{k+j} = T_j,$$

for j=0, 1, 2, where $$\sum_{i=1}^{7} x_i^{k+j} \equiv S_{k+j}$$

and $$\sum_{i=1}^{7} x_i^j y_i \equiv T_j,$$

respectively, for the three parameters $a_0$, and $a_1$, and $a_2$. This gives $$\sum_{k=0}^{2} a_k S_k = T_0, \sum_{k=0}^{2} a_k S_{k+1} = T_1, \text{ and } \sum_{k=0}^{2} a_k S_{k+2} = T_2,$$

where $$\text{and } T_2 = \sum_{i=1}^{7} x_i^2 y_i = (36 + 8 + 3 + 0 - 1 - 8 - 45) = -7,$$

so that the normal equations become $$\sum_{k=0}^{2} a_k S_k = T_0 = 1 = 7a_0 + 0a_1 + 28a_2 = 7a_0 + 28a_2,$$

$$\sum_{k=0}^{2} a_k S_{k+1} = T_1 = -39 = 0a_0 + 28a_1 + 0a_2,$$

and $\sum_{k=0}^{2} a_k S_{k+2} = T_2 = -7 = 28a_0 + 0a_1 + 196a_2 = 28a_0 + 196a_2,$ respectively, which imply (upon multiplying the first normal equation by 7 and then subtracting that from the third normal equation) that $-14=-21a_0$, that $28a_1=-39$ (from the second normal equation), and (upon multiplying the first normal equation by 4 and then subtracting that from the third normal equation) that $-11=84a_2$, giving $3a_0=2$, $28a_1=-39$, and $84a_2=-11$, respectively. In other words, $a_0=2/3$, $a_1=-39/28$, and $a_2=-11/84$, so that, the second degree polynomial (the quadratic) that provides the best fit, in the least-squares sense, is $$P_2(x) = \frac{2}{3} - \frac{39}{28}x - \frac{11}{84}x^2 = \frac{1}{84}(56 - 117x - 11x^2),$$

as shown in FIG. 22.

Figure 23:
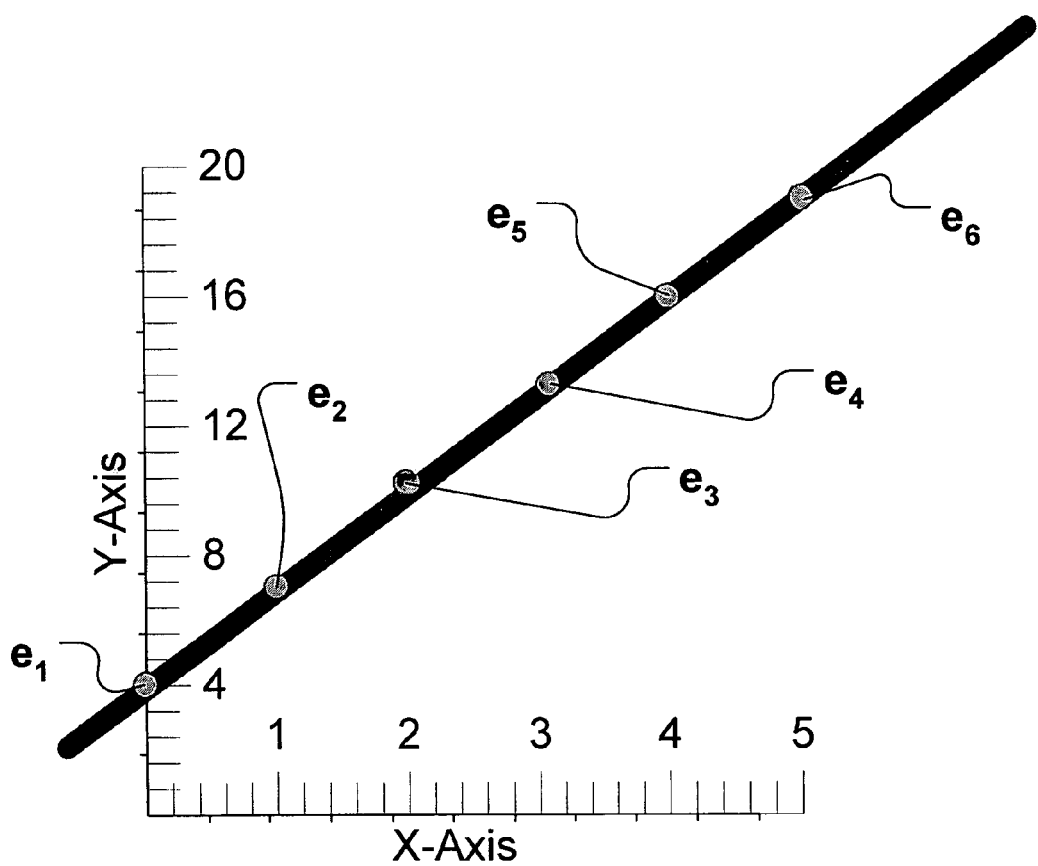

As shown in FIG. 23, for example, a second degree polynomial (a quadratic), $$P_2(x) = a_0 + a_1 x + a_2 x^2 = \sum_{k=0}^{2} a_k x^k,$$

may be fit (in a least-squares sense) to the M=6 data points (0,4), (1,7), (2,10), (3,13), (4,16), and (5,19). The residuals $\epsilon_i$, for i=1, 2, . . . , 6, are schematically illustrated in FIG. 23. The three normal equations are $$\sum_{k=0}^{2} a_k S_{k+j} = T_j,$$

for j=0, 1, 2, where $$\sum_{i=1}^{6} x_i^{k+j} \equiv S_{k+j}$$

and $$\sum_{i=1}^{6} x_i^j y_i \equiv T_j,$$

respectively, or the three parameters $a_0$, and $a_1$ and $a_2$. This gives $$\sum_{k=0}^{2} a_k S_k = T_0, \quad \sum_{k=0}^{2} a_k S_{k+1} = T_1, \text{ and } \sum_{k=0}^{2} a_k S_{k+2} = T_2, \text{ where}$$

$$S_0 = \sum_{i=1}^{6} x_i^0 = 6;$$

$$S_1 = \sum_{i=1}^{6} x_i = (0 + 1 + 2 + 3 + 4 + 5) = 15;$$

$$S_2 = \sum_{i=1}^{6} x_i^2 = (1 + 4 + 9 + 16 + 25) = 55;$$

$$S_3 = \sum_{i=1}^{6} x_i^3 = (0 + 1 + 8 + 27 + 64 + 125) = 225;$$

$$S_4 = \sum_{i=1}^{6} x_i^4 = (0 + 1 + 16 + 81 + 256 + 625) = 979;$$

$$T_0 = \sum_{i=1}^{6} y_i = (4 + 7 + 10 + 13 + 16 + 19) = 69;$$

$$T_1 = \sum_{i=1}^{6} x_i y_i = (0 + 7 + 20 + 39 + 64 + 95) = 225;$$

and $T_2 = \sum_{i=1}^{6} x_i^2 y_i = (0 + 7 + 40 + 117 + 256 + 475) = 895,$ and so that the normal equations become $$\sum_{k=0}^{2} a_k S_k = T_0 = 69 = 6a_0 + 15a_1 + 55a_2,$$

and $$\sum_{k=0}^{2} \alpha_k S_{k+2} = T_2 = 895 = 55\alpha_0 + 225\alpha_1 + 979\alpha_2,$$

respectively, which imply (upon multiplying the second normal equation by 4 and then subtracting that from the first normal equation multiplied by 10) that $-210=-70a_1-350a_2$, and (upon multiplying the second normal equation by 11 and then subtracting that from the third normal equation multiplied by 3) that $210 =70a_1+66a_2$. However, adding these last two results together shows that $0=a_2$. Furthermore, $3=a_1$. Therefore, using the fact that $3=a_1$, and $0=a_2$, the normal equations become $$\sum_{k=0}^{2} \alpha_k S_k = T_0 = 69 = 6\alpha_0 + 45, \sum_{k=0}^{2} \alpha_k S_{k+1} = T_1 = 225 = 15\alpha_0 + 165,$$

and $$\sum_{k=0}^{2} \alpha_k S_{k+2} = T_2 = 895 = 55\alpha_0 + 675,$$

respectively, which all imply that $4=a_0$. In other words, $a_0=4$, $a_1=3$, and $a_2=0$, so that, the second degree polynomial (the quadratic) that provides the best fit, in the least-squares sense, is $P_2(x)=4+3x+0x^2=4+3x$, which is really just a straight line, as shown in FIG. 23. The residuals $\epsilon_i$, for $i=1, 2, \ldots, 6$, all vanish identically in this case, as schematically illustrated in FIG. 23.

In various other alternative illustrative embodiments, samples may be collected for M data points $(x_i, y_i)$, where $i=1, 2, \ldots, M$, and a linearly independent set of N+1 functions $f_j(x)$, for $j=0, 1, 2, \ldots, N$, $$y(x) = \alpha_0 f_0(x) + \alpha_1 f_1(x) + \ldots + \alpha_j f_j(x) + \ldots + \alpha_N f_N(x) = \sum_{j=0}^{N} \alpha_j f_j(x),$$

may be fit (in a non-polynomial least-squares sense) to the M data points $(x_i, y_i)$. For example, 100 time data points (M=100) may be taken relating the pyrometer trace reading p, the lamp power trace reading f and/or the tube temperature trace reading T, during a processing step, to the effective yield t of workpieces emerging from the processing step, resulting in the M data points $(p^i, t_i)$, $(f_i, t_i)$, and/or $(T_i, t_i)$. The values ma) be the actually measured values of the processing tool variables and/or processing parameters, or ratios of actually measured values (normalized to respective reference setpoints), or logarithms of such ratios, for example. In one illustrative embodiment, the number N+1 of the linearly independent set of basis functions $f_j(x)$ is at least 10 times smaller than M.

The function $F(a_0, a_1, \ldots, a_N)$ may be minimized as follows. The function $F(a_0, a_1, \ldots, a_N)$ is given by $$F(\alpha_0, \alpha_1, \ldots, \alpha_N) = \sum_{i=1}^{M} \varepsilon_i^2 = \sum_{i=1}^{M} [y(x_i) - y_i]^2$$

and setting the partial derivatives of $F(a_0, a_1, \ldots, a_N)$ with respect to $a_j$, for $j=0, 1, \ldots, N$, equal to zero gives $$\frac{\partial F(\alpha_0, \alpha_1, \ldots, \alpha_N)}{\partial \alpha_j} =$$

$$2\sum_{i=1}^{M} [y(x_i) - y_i] x_i^j = 2\sum_{i=1}^{M} \left[\sum_{k=0}^{N} \alpha_k f_k(x_i) - y_i\right] f_j(x_i) = 0,$$

for $j=0, 1, \ldots, N$, since $f_j(x_i)$ is the coefficient of $a_j$ in the representation $$y(x_i) = \sum_{k=0}^{N} \alpha_k f_k(x_i).$$

Simplifying gives $$\sum_{i=1}^{M} \left[\sum_{k=0}^{N} \alpha_k f_k(x_i)\right] f_j(x_i) =$$

$$\sum_{k=0}^{N} \alpha_k \left[\sum_{i=1}^{M} f_k(x_i) f_j(x_i)\right] \equiv \sum_{k=0}^{N} \alpha_k S_{k,j} = \sum_{i=1}^{M} f_j(x_i) y_i \equiv T_j,$$

for $j=0, 1, \ldots, N$, where $$\sum_{i=1}^{M} f_k(x_i) f_j(x_i) \equiv S_{k,j}$$

and $$\sum_{i=1}^{M} f_j(x_i) y_i \equiv T_j,$$

respectively. There are N+1 equations $$\sum_{k=0}^{N} \alpha_k S_{k,j} = T_j,$$

for $j=0, 1, \ldots N$ also known as the normal equations, for the N+1 unknown parameters $a_k$, for $k=0, 1, \ldots, N$, readily yielding a solution, provided that the determinant of the normal equations is not zero. This may be demonstrated by showing that the homogeneous equations $$\sum_{k=0}^{N} \alpha_k S_{k,j} = 0$$

only have the trivial solution $a_k=0$, for $k=0, 1, \ldots, N$, which may be shown as follows. Multiply the jth homogeneous equation by $a_j$ and sum over all j $$\sum_{j=0}^{N} \alpha_j \sum_{k=0}^{N} \alpha_k S_{k,j} =$$

$$\sum_{j=0}^{N} \alpha_j \sum_{k=0}^{N} \alpha_k \sum_{i=1}^{M} f_k(x_i) f_j(x_i) = \sum_{i=1}^{M} \left(\sum_{k=0}^{N} \alpha_k f_k(x_i)\right) \left(\sum_{j=0}^{N} \alpha_j f_j(x_i)\right),$$

but $$\sum_{i=1}^{M}\left(\sum_{k=0}^{N}a_k f_k(x_i)\right)\left(\sum_{j=0}^{N}a_j f_j(x_i)\right) = \sum_{i=1}^{M}(y(x_i))^2 = 0,$$

which would imply that $y(x_i)\equiv 0$, and, hence, that $a_k=0$, for $k=0, 1, \ldots, N$, the trivial solution. Therefore, the determinant of the normal equations is not zero, and the normal equations may be solved for the N+1 parameters $a_k$, for $k=0, 1, \ldots, N$, the coefficients of the non-polynomial least-squares representation $$y(x) = \sum_{j=0}^{N} a_j f_j(x)$$

that may be fit to the M data points $(x_i,y_i)$, using the linearly independent set of N+1 functions $f_j(x)$ as the basis for the non-polynomial least-squares representation $$y(x) = \sum_{j=0}^{N} a_j f_j(x).$$

If the data points $(x_i,y_i)$ are not equally reliable for all M, it may be desirable to weight the data by using non-negative weighting factors $w_i$. The function $F(a_0,a_1,\ldots,a_N)$ may be minimized as follows. The function $F(a_0,a_1,\ldots,a_N)$ is given by $$F(a_0, a_1, \ldots, a_N) = \sum_{i=1}^{M} w_i \varepsilon_i^2 = \sum_{i=1}^{M} w_i [y(x_i) - y_i]^2$$

and setting the partial derivatives of $F(a_0,a_1,\ldots,a_N)$ with respect to $a_j$, for $j=0, 1, \ldots, N$, equal to zero gives $$\frac{\partial F(a_0, a_1, \ldots, a_N)}{\partial a_j} =$$

$$2\sum_{i=1}^{M} w_i [y(x_i) - y_i] x_i^j = 2\sum_{i=1}^{M} w_i \left[\sum_{k=0}^{N} a_k f_k(x_i) - y_i\right] f_j(x_i) = 0,$$

for $j=0, 1, \ldots, N$, since $f_j(x_i)$ is the coefficient of $a_j$ in the representation $$y(x) = \sum_{k=0}^{N} a_k f_k(x_i).$$

Simplifying gives $$\sum_{i=1}^{M} w_i \left[\sum_{k=0}^{N} a_k f_k(x_i)\right] f_j(x_i) = \sum_{k=0}^{N} a_k \left[\sum_{i=1}^{M} w_i f_k(x_i) f_j(x_i)\right] = \sum_{i=1}^{M} w_i f_j(x_i) y_i,$$

or $$\sum_{k=0}^{N} a_k \left[\sum_{i=1}^{M} w_i f_k(x_i) f_j(x_i)\right] \equiv \sum_{k=0}^{N} a_k S_{k,j} = \sum_{i=1}^{M} w_i f_j(x_i) y_i \equiv T_j$$

for $j=0, 1, \ldots, N$, where $$\sum_{i=1}^{M} w_i f_k(x_i) f_j(x_i) \equiv S_{k,j}$$

and $$\sum_{i=1}^{M} w_i f_j(x_i) y_i \equiv T_j,$$

respectively. There are N+1 equations $$\sum_{k=0}^{N} a_k S_{k,j} = T_j, \quad \text{for } j = 0,$$

$1, \ldots, N$, also known as the normal equations, including the non-negative weighting factors $w_i$, for the N+1 unknown parameters $a_k$, for $k=0, 1, \ldots, N$, readily yielding a solution, provided that the determinant of the normal equations is not zero. This may be demonstrated by showing that the homogeneous equations $$\sum_{k=0}^{N} a_k S_{k,j} = 0$$

only have the trivial solution $a_k=0$, for $k=0, 1, \ldots, N$, which may be shown as follows. Multiply the jth homogeneous equation by $a_j$ and sum over all j, $$\sum_{j=0}^{N} a_j \sum_{k=0}^{N} a_k S_{k,j} =$$

$$\sum_{j=0}^{N} a_j \sum_{k=0}^{N} a_k \sum_{i=1}^{M} w_i f_k(x_i) f_j(x_i) = \sum_{i=1}^{M} w_i \left(\sum_{k=0}^{N} a_k f_k(x_i)\right)\left(\sum_{j=0}^{N} a_j f_j(x_i)\right),$$

but $$\sum_{i=1}^{M} w_i \left( \sum_{k=0}^{N} a_k f_k(x_i) \right) \left( \sum_{j=0}^{N} a_j f_j(x_i) \right) = \sum_{i=1}^{M} w_i (y(x_i))^2 = 0,$$

which would imply that $y(x_i)=0$, and, hence, that $a_k=0$, for $k=0, 1, \ldots, N$, the trivial solution. Therefore, the determinant of the normal equations is not zero, and the normal equations, including the non-negative weighting factors $w_i$, may be solved for the N+1 parameters $a_k$, for $k=0, 1, \ldots, N$, the coefficients of the non-polynomial least-squares representation $$y(x) = \sum_{j=0}^{N} a_j f_j(x)$$

that may be fit to the M data points $(x_i, y_i)$, using the linearly independent set of N-1 functions $f_j(x)$ as the basis for the non-polynomial least-squares representation $$y(x) = \sum_{j=0}^{N} a_j f_j(x),$$

and including the non-negative weighting factors $W_i$.

In an adaptive control strategy, according to various illustrative embodiments of the present invention, an online system identification scheme runs along with the controller and constantly adjusts the model so that the model mimics the true behavior of the system. One difficult task in this situation is determining whether observed errors in the output are due to errors in accounting for tool differences or for product differences. The following discussion will outline a scheme for deciding which model parameters are in error and performing the correct model updates.

We begin with a simple run-to-run controller for a single process and expand to the case of multiple products and tools. Standard observability tests on linear process models will be used for the purposes of illustration.

As an example, consider a simple etch or polish process where the objective is to reach a desired removal on each run. A simplified model for this process is $\bar{x}=\bar{r}*\bar{t}$, where $\bar{x}$ represents a thickness removal, $\bar{r}$ is a time-averaged rate, and $\bar{t}$ is the time of processing.

In the adaptive control formulation, the estimate of the rate is adjusted from run to run using online system identification. For simplicity and ease of analysis, the model will be linearized here and converted to a state space representation. If the model is linearized about a nominal rate $r_0$ and time $t_0$, then the equation for the deviation y from the nominal removal $y_0$ is $$y = r_0 \cdot t + r \cdot t_0, \quad (1)$$

where t and r represent deviations from the nominal time and rate, respectively. Then, the model is converted to state space representation, $$x_{k+1} = A x_k + B u_k \quad (2a)$$

$$y_k = C x_k, \quad (2b)$$

where x is a vector of states, y is a vector of measured outputs, and u is the vector of inputs. The A and B matrices convey how the states and inputs affect future values of the states. The C matrix maps the current values of the states into the outputs that are actually measured. In the current example, $$\begin{bmatrix} x_{adj} \\ r \end{bmatrix}_{k+1} = \begin{bmatrix} 0 & 0 \\ 0 & 1 \end{bmatrix} \begin{bmatrix} x_{adj} \\ r \end{bmatrix}_k + \begin{bmatrix} r_0 \\ 0 \end{bmatrix} [t] \quad (3a)$$

$$[y] = \begin{bmatrix} 1 & t_0 \end{bmatrix} \begin{bmatrix} x_{adj} \\ r \end{bmatrix}, \quad (3b)$$

the state vector x contains $x_{adj}$, the change in removal caused by the time adjustment and r, the deviation from the nominal rate $r_0$. The measurement vector y contains only y, the deviation from the nominal removal, and the input vector u contains only t, the deviation from the nominal time $t_0$.

Figure 24:
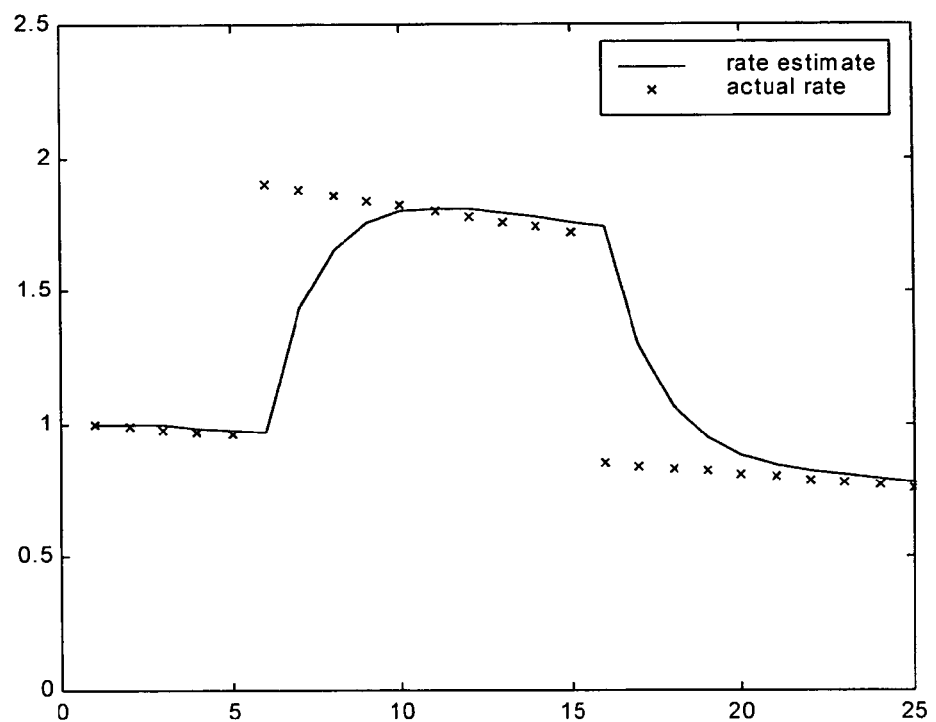

This model is adequate for control of a single process. The single rate estimate is assumed to apply for every run, and it is adjusted after each measurement. In a high-volume manufacturing environment, however, additional complexity is added because there are multiple tools and products. In this work, each product and tool combination is called the context. The control objective is to have each run at the target, regardless of which product and tool combination is running. A simple approach is to assume that the one set of states applies to all processing contexts. The drawback of this method in an environment with several contexts is that the rates associated with each process can be drastically different from each other. When this happens, each switch to a new context appears as a step disturbance to the controller, as shown in FIG. 24, as the controller has no understanding of why the rate would be changing too much.

For example, in many applications, it is quickly observed that different products will have very different apparent reaction rates. However, the rate can drift from batch to batch, even if only one product is being made. This can be caused by reactor fouling, degradation of consumable materials, process leaks, and the like. Simply tracking an estimate for r from run to run is not acceptable because each switch to a different product appears as a step change, as shown below. As shown in FIG. 24, a second product was run from batches 6 through 15, and reactor fouling caused the rate to continually decay over the course of the simulation.

Another illustrative method that is easy to implement is to group runs with similar contexts together so that they share parameter estimates. In such a method, there is no need to identify product and tool biases separately from each other. Each combination simply has its own rate estimate and updates this estimate based only on measurements from runs under that context. This method has the drawback, however, that a disturbance to one tool, for instance, has to be recognized by every context where that tool is used. This can be disadvantageous in a large system because of the large number of runs that would miss their targets while the different contexts were updating their parameter estimates. That information should be immediately or rapidly shared between all contexts that the disturbance affects.

There are cases where biases can be determined to be caused by different parts of the processing context. One example is that too-to-tool variation is repeatable regardless of the products being run, and product-to-product variation is consistent even when run on different tools. To take advantage of this observation, extra terms may be added to the model. For a CMP process, it makes sense to scale the rate for different products. This is largely because the removal rate is dependent on the features of the surface in contact, and different products will have different pattern densities. So, the equation used here for the removal is $\bar{x}=\bar{r}\cdot\bar{f}\cdot\bar{t}$, where X represents a removal, $\bar{r}$ is a time-averaged rate constant for the tool, $\bar{f}$ is a product-specific rate scaling factor, and $\bar{t}$ is the time of processing. This relation is similar to Preston's equation describing a polishing process, $$\frac{\Delta x}{\Delta t} = \frac{K_p F v}{A} \quad (4)$$

where $\Delta x$ is the removal, $\Delta t$ is the time of processing, $K_p$ is a rate constant, v is the surface velocity, F is the force applied, and A is the surface area of in contact.

When linearized about a nominal $r_0$, $f_0$, and $t_0$, the equation for the deviation y from the nominal removal becomes $$y = r_0 \cdot f_0 \cdot t + r \cdot f_0 \cdot t_0 + r_0 \cdot f \cdot t_0, \quad (5)$$

where t, r, and f represent deviations from the nominal time, tool rate constant, and product scaling factor, respectively. The following state space representation includes the estimates for the two model parameters as states.

$$\begin{bmatrix} x_{adj} \\ r \\ f \end{bmatrix}_{k+1} = \begin{bmatrix} 0 & 0 & 0 \\ 0 & 1 & 0 \\ 0 & 0 & 1 \end{bmatrix} \begin{bmatrix} x_{adj} \\ r \\ f \end{bmatrix}_k + \begin{bmatrix} r_0 \cdot f_0 \\ 0 \\ 0 \end{bmatrix} [t] \quad (6a)$$

$$[y] = \begin{bmatrix} 1 & f_0 \cdot t_0 & r_0 \cdot t_0 \end{bmatrix} \begin{bmatrix} x_{adj} \\ r \\ f \end{bmatrix}. \quad (6b)$$

So, the question that arises is whether or not the two model parameters r and f can be 10 uniquely identified. For a time-invariant linear system like the one here, the test for nonsingularity of the observability Gramian can be performed by computing the rank of $$O = [C^T \; A^T C^T \; (A^T)^2 C^T \ldots] \quad (7),$$

where as many terms in the matrix are included as needed to try to achieve full rank, if possible. For the system above, $$O = \begin{bmatrix} 1 & 0 & 0 \\ f_0 \cdot t_0 & f_0 \cdot t_0 & f_0 \cdot t_0 \\ r_0 \cdot t_0 & r_0 \cdot t_0 & r_0 \cdot t_0 \end{bmatrix}. \quad (8)$$

This matrix is not full rank, so the system as it is currently defined is not observable. Thus it is not possible to uniquely identify the model parameters using only run data from a single context.

This result is intuitive, for in order to be able to identify the product-to-product and tool-to-tool dependencies, it is useful to have a model that includes all the different processing contexts. Information about different products should be shared between tools, and vice versa. This may entail looking at the entire collection of processes as a whole, rather than concentrating on individual contexts one at a time.

Consider a hypothetical process where there are two tools (1 and 2) and three products (A, B, and C). They can be run in any product/tool combination. Using the linearized form above and assuming that there is a single "nominal" point for all combinations, the deviations from nominal removal for each context can be described by these equations.

$$y_{1A} = r_0 \cdot f_0 \cdot t + r_1 \cdot f_0 \cdot t_0 + r_0 \cdot f_A \cdot t_0 \quad (9a)$$

$$y_{1B} = r_0 \cdot f_0 \cdot t + r_1 \cdot f_0 \cdot t_0 + r_0 \cdot f_B \cdot t_0 \quad (9b)$$

$$y_{1C} = r_0 \cdot f_0 \cdot t + r_1 \cdot f_0 \cdot t_0 + r_0 \cdot f_C \cdot t_0 \quad (9c)$$

$$y_{2A} = r_0 \cdot f_0 \cdot t + r_2 \cdot f_0 \cdot t_0 + r_0 \cdot f_A \cdot t_0 \quad (9d)$$

$$y_{2B} = r_0 \cdot f_0 \cdot t + r_2 \cdot f_0 \cdot t_0 + r_0 \cdot f_B \cdot t_0 \quad (9e)$$

$$y_{2C} = r_0 \cdot f_0 \cdot t + r_2 \cdot f_0 \cdot t_0 + r_0 \cdot f_C \cdot t_0 \quad (9f)$$

This entire system can be combined into a single state space model, $$\begin{bmatrix} x_{adj} \\ r_1 \\ r_2 \\ f_A \\ f_B \\ f_C \end{bmatrix}_{k+1} = \begin{bmatrix} 0 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{bmatrix} \begin{bmatrix} x_{adj} \\ r_1 \\ r_2 \\ f_A \\ f_B \\ f_C \end{bmatrix}_k + \begin{bmatrix} r_0 \cdot f_0 \\ 0 \\ 0 \\ 0 \\ 0 \\ 0 \end{bmatrix} [t] \quad (10a)$$

$$\begin{bmatrix} y_{1A} \\ y_{1B} \\ y_{1C} \\ y_{2A} \\ y_{2B} \\ y_{2C} \end{bmatrix} = \begin{bmatrix} 1 & f_0 \cdot t_0 & 0 & r_0 \cdot t_0 & 0 & 0 \\ 1 & f_0 \cdot t_0 & 0 & 0 & r_0 \cdot t_0 & 0 \\ 1 & f_0 \cdot t_0 & 0 & 0 & 0 & r_0 \cdot t_0 \\ 1 & 0 & f_0 \cdot t_0 & r_0 \cdot t_0 & 0 & 0 \\ 1 & 0 & f_0 \cdot t_0 & 0 & r_0 \cdot t_0 & 0 \\ 1 & 0 & f_0 \cdot t_0 & 0 & 0 & r_0 \cdot t_0 \end{bmatrix} \begin{bmatrix} x_{adj} \\ r_1 \\ r_2 \\ f_A \\ f_B \\ f_C \end{bmatrix}, \quad (10b)$$

where the states consist of the adjustment ($x_{adj}$), tool biases ($r_1$ and $r_2$), and product biases ($f_A$, $f_B$, and $f_C$). This model is of a hypothetical situation where all product/tool combinations run simultaneously with the same input settings. Although this situation would almost never arise in practice, it is useful from the standpoint of understanding the interactions between the different processing contexts. It is clear, for instance, that the single $f_A$ product factor is used for all runs of product A, regardless of processing tool.

The observability test as calculated here, $$O = \begin{bmatrix} 1 & 1 & 1 & 1 & 1 & 1 & 0 & 0 & 0 & 0 & 0 & 0 \\ f_0 \cdot t_0 & f_0 \cdot t_0 & f_0 \cdot t_0 & 0 & 0 & 0 & f_0 \cdot t_0 & f_0 \cdot t_0 & f_0 \cdot t_0 & 0 & 0 & 0 \\ 0 & 0 & 0 & f_0 \cdot t_0 & f_0 \cdot t_0 & f_0 \cdot t_0 & 0 & 0 & 0 & f_0 \cdot t_0 & f_0 \cdot t_0 & f_0 \cdot t_0 \\ r_0 \cdot t_0 & 0 & 0 & r_0 \cdot t_0 & 0 & 0 & r_0 \cdot t_0 & 0 & 0 & r_0 \cdot t_0 & 0 & 0 \\ 0 & r_0 \cdot t_0 & 0 & 0 & r_0 \cdot t_0 & 0 & 0 & r_0 \cdot t_0 & 0 & 0 & r_0 \cdot t_0 & 0 \\ 0 & 0 & r_0 \cdot t_0 & 0 & 0 & r_0 \cdot t_0 & 0 & 0 & r_0 \cdot t_0 & 0 & 0 & r_0 \cdot t_0 \end{bmatrix}, \quad (11)$$

is rank deficient by one, so the system is not observable in its current form. Here, only the first two terms in the matrix in Equation (7) suffice. The reason for this is that all runs are convoluted by both a product bias and a tool bias. An additional constraint is needed to fix one variable or the other. As an example, it may be possible to experimentally measure the tool parameters by qualifying the tools. This would add extra system outputs $y_1 = r_1$ and $y_2 = r_2$.

When such experiments are not an option, it is also possible to simply select a reference tool or product that has the nominal bias. One disadvantage of this method is that it may be difficult to identify a reference tool or product in a manufacturing environment that is constantly changing.

If the qualification experiments are added to the example system above, the new output equation for the combined system is $$\begin{bmatrix} y_{1A} \\ y_{1B} \\ y_{1C} \\ y_{2A} \\ y_{2B} \\ y_{2C} \\ y_1 \\ y_2 \end{bmatrix} = \begin{bmatrix} 1 & f_0 \cdot t_0 & 0 & r_0 \cdot t_0 & 0 & 0 \\ 1 & f_0 \cdot t_0 & 0 & 0 & r_0 \cdot t_0 & 0 \\ 1 & f_0 \cdot t_0 & 0 & 0 & 0 & r_0 \cdot t_0 \\ 1 & 0 & f_0 \cdot t_0 & r_0 \cdot t_0 & 0 & 0 \\ 1 & 0 & f_0 \cdot t_0 & 0 & r_0 \cdot t_0 & 0 \\ 1 & 0 & f_0 \cdot t_0 & 0 & 0 & r_0 \cdot t_0 \\ 0 & 1 & 0 & 0 & 0 & 0 \\ 0 & 0 & 1 & 0 & 0 & 0 \end{bmatrix} \begin{bmatrix} x_{adj} \\ r_1 \\ r_2 \\ f_A \\ f_B \\ f_C \end{bmatrix}. \quad (12)$$

The observability matrix for this new system, $$O = \begin{bmatrix} 1 & 1 & 1 & 1 & 1 & 1 & 0 & 0 & 0 & 0 & 0 & 0 & 0 & 0 & 0 & 0 \\ f_0 \cdot t_0 & f_0 \cdot t_0 & f_0 \cdot t_0 & 0 & 0 & 0 & 1 & 0 & f_0 \cdot t_0 & f_0 \cdot t_0 & f_0 \cdot t_0 & 0 & 0 & 0 & 1 & 0 \\ 0 & 0 & 0 & f_0 \cdot t_0 & f_0 \cdot t_0 & f_0 \cdot t_0 & 0 & 1 & 0 & 0 & 0 & f_0 \cdot t_0 & f_0 \cdot t_0 & f_0 \cdot t_0 & 0 & 1 \\ r_0 \cdot t_0 & 0 & 0 & r_0 \cdot t_0 & 0 & 0 & 0 & 0 & r_0 \cdot t_0 & 0 & 0 & r_0 \cdot t_0 & 0 & 0 & 0 & 0 \\ 0 & r_0 \cdot t_0 & 0 & 0 & r_0 \cdot t_0 & 0 & 0 & 0 & 0 & r_0 \cdot t_0 & 0 & 0 & r_0 \cdot t_0 & 0 & 0 & 0 \\ 0 & 0 & r_0 \cdot t_0 & 0 & 0 & r_0 \cdot t_0 & 0 & 0 & 0 & 0 & r_0 \cdot t_0 & 0 & 0 & r_0 \cdot t_0 & 0 & 0 \end{bmatrix}, \quad (13)$$

is full rank, so this system is observable. Here again, only the first two terms in the matrix in Equation (7) suffice. However, the system here is still the rare case where all possible runs can happen simultaneously. In practice, one run happens at a time. It is possible to determine the appropriate way to update the model states after each run.

Structurally, this system resembles a real system where the different measurements are sampled at different frequencies. This multirate sampling problem has been given treatment in the recent literature. With such a system, the observability changes over time as different combinations of measurements are available. The underlying implicit requirement, though, is that the system be observable in the limiting case where all possible measurements are made at every time step.

At this point, a model for a hypothetical system with similar dynamics to the real system is available. The next step is to define a control law and an observer that can map the real process into the model space.

The control objective is to drive each run to target, regardless of processing context. This is accomplished here by using a dead-beat control law using the current best guesses of the model states. A particular processing context is represented by a single row in the output matrix C. For example, the deviation from nominal removal for product B running on tool 2 is given by equation (9e), which corresponds to the 5$^{th}$ row of the output matrix. For ease of notation, the row of the output matrix corresponding to the current context will be denoted $C_{con}$. Then, the desired input $U_{des}$ satisfies $$y_{con,des} = C_{con}(Ax + Bu_{des}), \quad (14)$$

where $y_{con,des}$ is the desired deviation from nominal removal for this processing context. Solving for the input $u_{des}$ yields $$u = (C_{con}B)^{-1}(y_{con,des} - C_{con}Ax). \quad (15)$$

This equation gives the input for any processing context, given the current estimates of the model parameters.

The observer must map measurements of the real process into the model so that state updates can occur. The design of the observer is not as simple as the control law. The reason is that in general, a single measurement from a process run is convoluted by both the tool bias and the product bias. The prediction error should be distributed between the parameter updates. The new information from each measurement must be merged in to the existing information.

One simple way to accomplish this is to imagine the different elements of the output vector y as individual sensors which remain fixed at their last values until a new measurement changes them. The benefit of this approach is that a conventional state observer may be designed by taking the entire system into account. An observer gain matrix L can be chosen such that $$\hat{x}_{k+1} = A\hat{x}_k + Bu_k + L(y_k - C\hat{y}_k). \quad (16)$$

The observer matrix maps the differences between the measured and predicted outputs into changes to the state estimates. However, there is a major drawback with leaving past outputs fixed at their last values. When the input changes, those outputs are not really valid anymore, since they are no longer representative the current state of the process. If the measurements were current, they would change in response to the new input.

At the opposite end of the spectrum from leaving the inactive outputs constant, all outputs that are not measured at a time step could be set to the values that would be predicted from the current state estimates. This method results in all old measurements being ignored when the state update is performed.

A series of Matlab™ simulations were run in order to illustrate the concepts of the plant-wide model. The first series of simulations were all run under the conditions specified in the example above. In this example, there were two processing tools and three products. Tool qualification events were available to directly measure the tool-specific model parameters. The starting point for the state estimators was that all tools and products were assumed to be matched at the nominal values. The control objective was to keep all the different tool and product combinations running at the nominal removal $y_0$.

One important thing to note about these tests is that they begin from a starting point where the controller knows nothing about the system and has to identify all products and tools at once. While it is an important for the controller to be able to do this, in normal steady-state operation the tool and product biases will be known fairly accurately, and disturbances will affect only a subset of the process. For this reason, most of these tests inject a disturbance into the system after the controller has stabilized the process in order to see how the controller reacts to an isolated disturbance.

Figure 25:
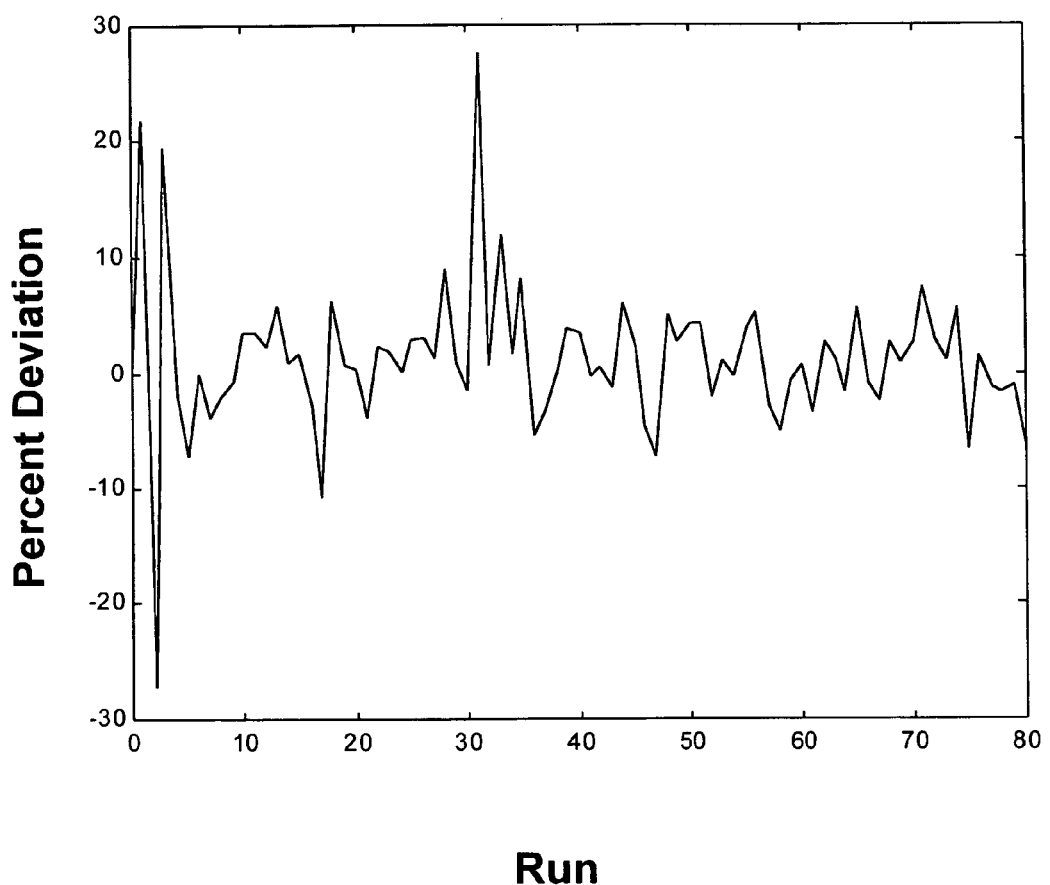

The first simulation establishes a baseline by illustrating the best possible scenario. This is the hypothetical case mentioned previously where all possible runs happen simultaneously at each time step so that all of the measurements can be used to update the state estimates. White noise was added to the process output during the simulation, and a step disturbance was added to tool 2 at run 30 (also known as time step 30). FIG. 25 contains the results of the test. FIG. 25 schematically illustrates percent deviation from target in this hypothetical best case scenario. In this hypothetical case, the controller is able to quickly reach the target and reject the disturbance.

The most important result from this test is that the system as a whole, in the case where the controller has the maximum amount of information available, performs well. All other tests will deal with more realistic situations where the controller only has a subset of that information. The subsequent runs will attempt to illustrate some of the factors that are important in determining if the controller can function with the reduced set of information.

Figure 26:
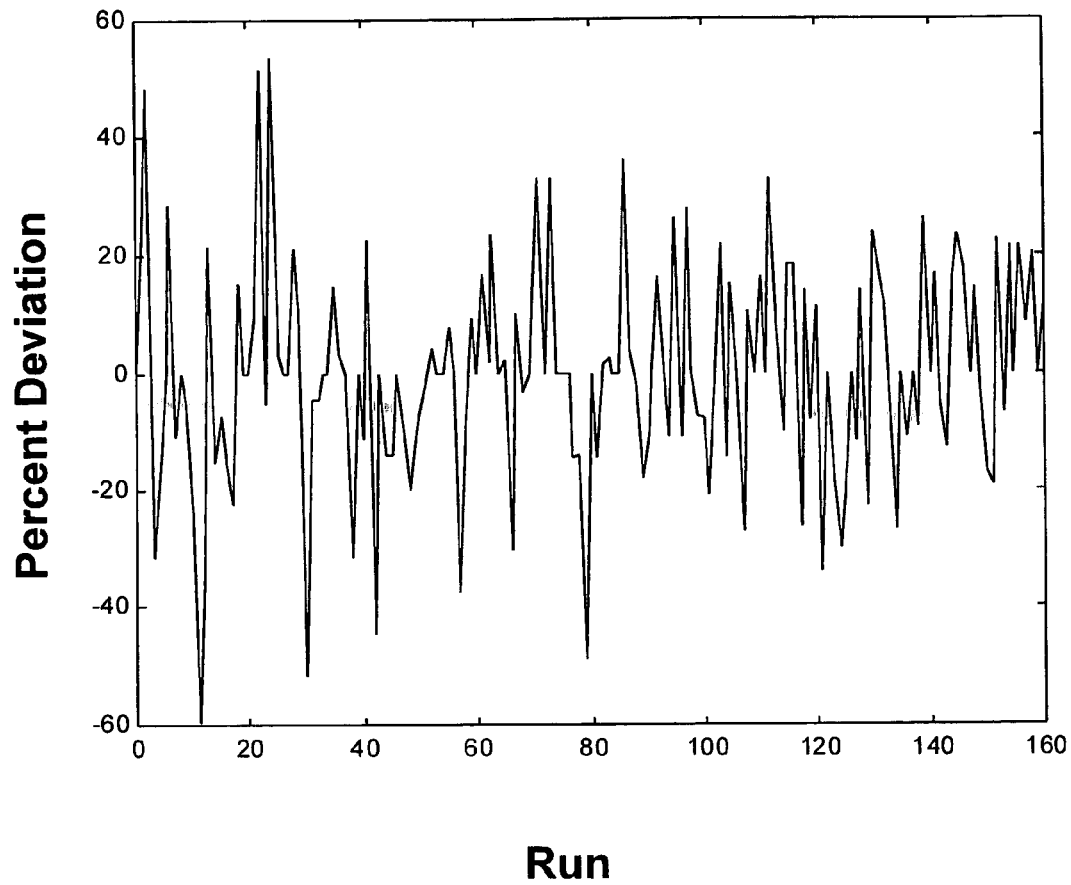

The next situation tested is where the runs occur only one at a time and the outputs are held at their last values until they are updated. For testing purposes, on each run, either a random product was run on a random tool, or a qualification event was logged. All eight possible scenarios (six production contexts and two qualification events) had equal probability of occurring at each run. As mentioned previously, this situation caused problems because the outputs must change when the input changes to provide useful information. In this test, the input is changing on every run, but only one output is being updated each time. Thus, the outputs used for feedback are not representative of the true state of the process. FIG. 26 shows the results of this experiment. FIG. 26 schematically illustrates percent deviation from target in this "fixed outputs" case.

This configuration was not able to control the process very well. The stale information contained in the output vector adversely affects the state observer because the measurements do not appear respond to changes in the inputs. This causes the controller to try to compensate for them repeatedly, leading to instability.

Figure 27:
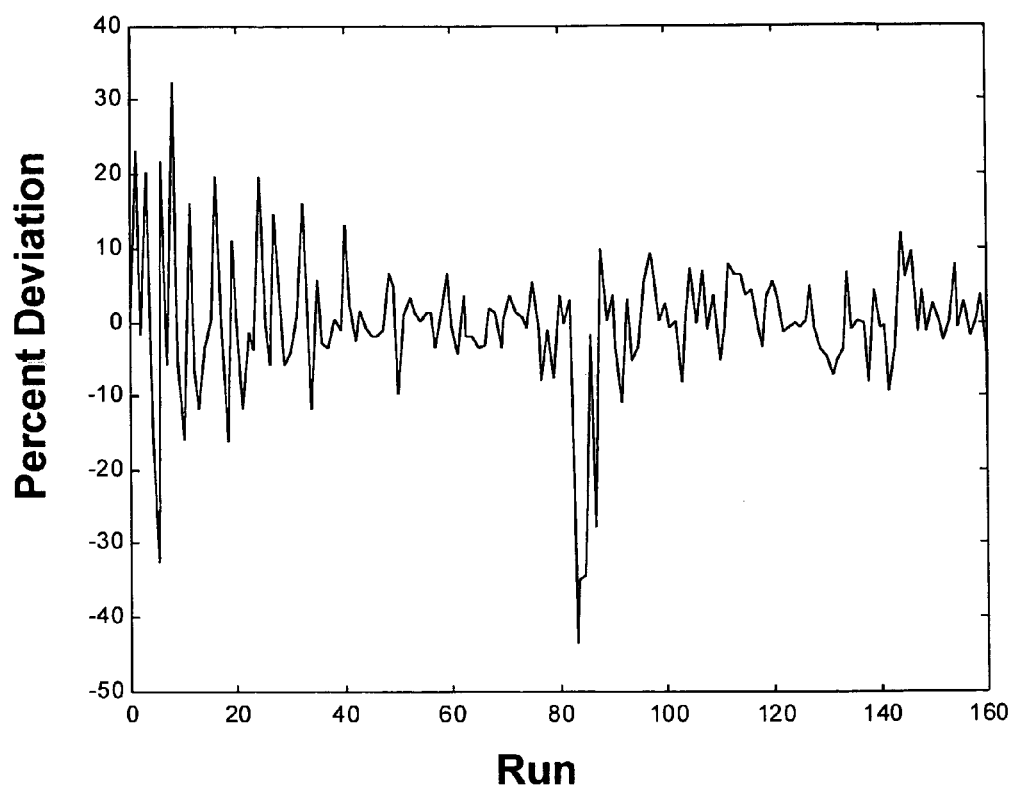

The next simulation case tested used the current model estimates of the states to estimate values for the measurements that were missing. As a result, each state update only contained information from the run that was being measured. The testing conditions were similar to the previous simulation, with the random selection of runs. However, a step disturbance to the rate on tool 2 was injected at run or time step 80. The results of the test can be seen in FIG. 27. FIG. 27 schematically illustrates percent deviation from target in this "predicted outputs" case. This scheme reaches the target and successfully rejects the disturbance. However, the response is very sluggish compared to the case where all the information about the process is measured.

Figure 28:
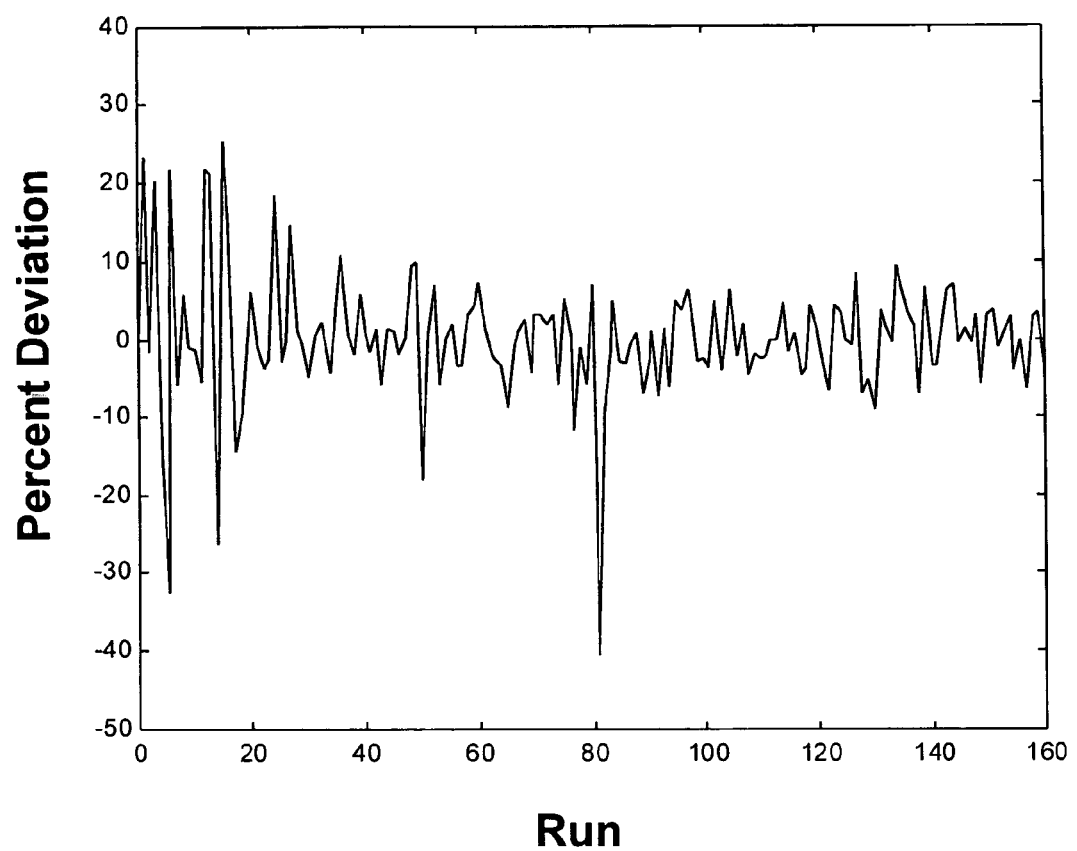

The test depicted in FIG. 28 is the same controller as the previous one, but a different set of rules were applied to generate the sequence of runs. FIG. 28 schematically illustrates percent deviation from target in this "predicted outputs" case with extra qualifications. The tools were qualified twice as often as in the previous case in order to determine the effect on the controller. In this test, the system equilibrated more quickly and rejected the disturbance more easily than in the prior case.

Figure 29:
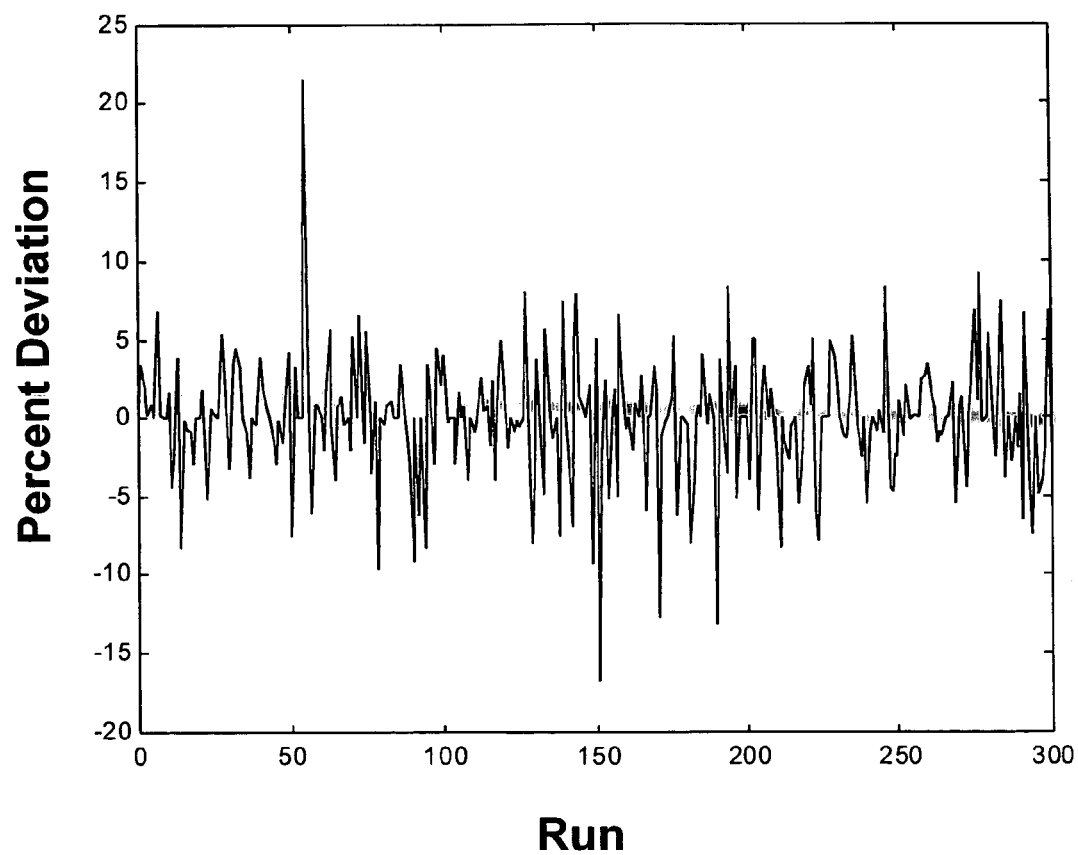

To test the scalability of the system, the last test used 6 tools and 7 products. FIG. 29 schematically illustrates percent deviation from target in this large-scale system case. The system began under control and had to deal with multiple disturbances. A step disturbance was added to tool 1 at run or time step 50, and product 6 had a step disturbance at run or time step 150. The results in FIG. 29 demonstrate that the controller successfully rejects the disturbances over a very short number of runs.

This is important because it demonstrates the power of a model that takes the entire system into account. For instance, the bias on tool 1 could be detected while product A was running on the tool. In that case, both the estimates for $r_1$ and $f_A$ would be adjusted slightly. The next run of any product on tool 1 would still exhibit the bias (although to a lesser extent), and the estimate for $r_1$ would be adjusted even closer to the new correct value. The next run of product A on any tool would move the estimate for $f_A$ back in the direction of the correct value.

In this configuration, each state estimate update is only using information from the measurements of the current run. Since all older information is being ignored, it is important for the observer to be fairly damped. A qualitative example is instructive. If a run of product A on tool 1 had a removal that was higher than predicted, then one or both of the estimates for $r_1$ and $f_A$ are too low. In order to correctly update the states, it is necessary to look at the results of other runs of product A on different tools or runs of other products on tool 1. However, the chosen update strategy only allows the update to be based on the results of the current run. By having the observer only make small changes from each run, the states will at least move in the correct directions, and all the runs together will move the state estimates to the correct values. Clearly, the ideal solution to this problem would attempt to combine as much information as possible from old measurements with the new values when doing the state estimate.

The multiple processing contexts commonly seen in large scale semiconductor manufacturing present an interesting control challenge. A control and estimation approach was developed to examine the entire processing environment that a controller sees as a whole instead of focusing only on individual contexts one at a time. Simulations run under these conditions show that the idea does have merit. Given enough information, a plant wide controller is able to handle the entire system composed of all the different processes.

Several factors influenced the performance of the controller. It relies on having the most information it can gain about the process. The decision about what to do on each run to the system outputs that are not measured has a drastic effect on the performance. Also, the control response is improved when data can be obtained from qualification events mixed in with the production runs. These provide direct measurements of important model parameters.

One interesting feature of this system is that the model must be rebuilt whenever tools or products are added or subtracted. This is because the model accounts for the entire system at once. Although this may appear to be a drawback, it actually provides insight into the process which is not intuitive. Since the observer must be rebuilt based on the entire system each time the system changes, the properties of the feedback are dependent on the tool and product distribution. This means that an error detested on one processing context should be treated differently depending on the other contexts in the entire system.

When the system is viewed as a whole, it is apparent that there is a great deal of information shared between different parts of the system. Since the performance of the controller is tied to the quality of the information it is able to extract, it would be beneficial to closely examine the effects of processing order and sampling plans. A sufficiently advanced controller would be able to prioritize certain runs and measurements on the basis of the information they would provide about the state of the system. Closely related to this is the concept of event-driven model-based control. Instead of viewing the process as a continuum, the states of the process, including the model parameter estimates, are affected by a series of discrete modeled events.

In various illustrative embodiments, a model may be developed for the tool state (x) which is independent of the product. This tool state is an intrinsic rate for the tool. A change in this rate affects all products that run on the tool.

$$x_{k+1}=A_k x_k + B_k u_k$$

The process state (x) is mapped to the product state (y) using the output equation:

$$y_k = C_k x_k + D_k.$$

Then, the estimator is used to track the tool state (x), rather than product state (y). Inspection of the Kalman optimal filtering equations indicates that optimal observer gain is a function of the output mapping (C).

$$P = A_k[P - PC_k^T(C_k P C_k^T + R)^{-1} C_k P]A_k^T + GQG^T$$

$$L = PC_k^T(C_k P C_k^T + R)^{-1}$$

So, by using offline analysis, the repeatable product dependence can be quantified to arrive at a new model for the rate r, where $r_0$ is the "intrinsic rate" of the processing tool, and $k_p$ is the product-specific correction factor.

$$r = r_0 \cdot k_p$$

The observer then estimates $r_0$ instead of r, by scaling the observed rate by each product-specific factor.

In a situation where the product specific factors are known exactly, the scheme described above works very well. Changes in the operation of the processing tool are observed regardless of which product is running. However, in a real manufacturing environment, several complications arise. For example, there can be several processing tools, new products appear, and experiments can be very expensive in terms of both raw materials and processing tool downtime. The impact here is that the product specific factors are not always known a priori.

The method above observes a single parameter ($r_0$), but it is necessary to find a way to quickly obtain estimates for new $k_p$. This can be done by observing the rate at each run, and updating the model parameters accordingly. The result of each run is a measurement of the apparent rate r. To estimate $r_0$ and $k_p$ from the data (r), the model equation is used.

$$r = r_0 \cdot k_p$$

Using a Taylor series approximation, $\Delta r = r_0 \cdot \Delta k_p + k_p \cdot \Delta r_0$.

What this means is that an apparent change in the value of r can be expressed as a change in the estimates of $r_0$ and $k_p$. So, it is necessary to classify the changes (using an analysis of variance technique) in order to determine how to distribute the error between the two parameters.

One method of using this estimator is to apply a linear filter to each parameter.

$$r_{0,new} = \left(\frac{r_{apparent}}{k_{p,last}} - r_{0,last}\right)\lambda_r + r_{0,last}$$

$$k_{p,new} = \left(\frac{r_{apparent}}{r_{0,last}} - k_{p,last}\right)\lambda_k + k_{p,last}$$

The lambda values are varied in order to reflect the confidence in the parameter estimates. In situations where $r_0$ is expected to be changing, $\lambda_r$ is high, and in situations where $k_p$ is thought to be in error, $\lambda_k$ is high.

As an example, for a well-established product, there is a high degree of confidence that $k_p$ is accurate. In addition, $r_0$ is known to drift over time. Thus, the relation $\lambda_r \gg \lambda_k$ is used. On the other hand, for a new product, there is little confidence in the value of $k_p$. It is expected that an inaccurate $k_p$ will affect the rate more than the noise or drift in $r_0$, so $\lambda_k \gg \lambda_r$ is set.

Matlab™ simulations show that this scheme tracks the process very well. The simulations were run in the following way. The number of processing tools (n), the number of products (m), and the number of runs (p) were chosen beforehand. Each product was given a unique "real" value for $k_p$, and each tool was given a unique value for $r_0$. For each run, a random tool and product were chosen. A measurement was calculated by multiplying the correct $r_0$ and $k_p$ together and adding random noise. Then, the $r_0$ for the chosen tool had an offset added to it, in order to simulate a drift over time. The parameter estimates were updated after each run as described above. In all cases, the estimates tracked to the real values of the parameters very quickly.

It is interesting to note that choosing the products and tools randomly made the convergence faster than using long strings of runs of given products on certain tools (tool dedication). When tools are dedicated it is difficult to assign the error in the rate estimate appropriately between the two parameters. This seems to be related to the persistent excitation requirement in system identification theory, but it is an interesting result because traditionally tool dedication is thought to make process control easier. The best controller for this process will be able to address the dual control problem of simultaneous identification and control. Making the process choices involves a tradeoff between tightly tracking the targets and helping to characterize the process because the two objectives conflict with each other.

Figure 30:
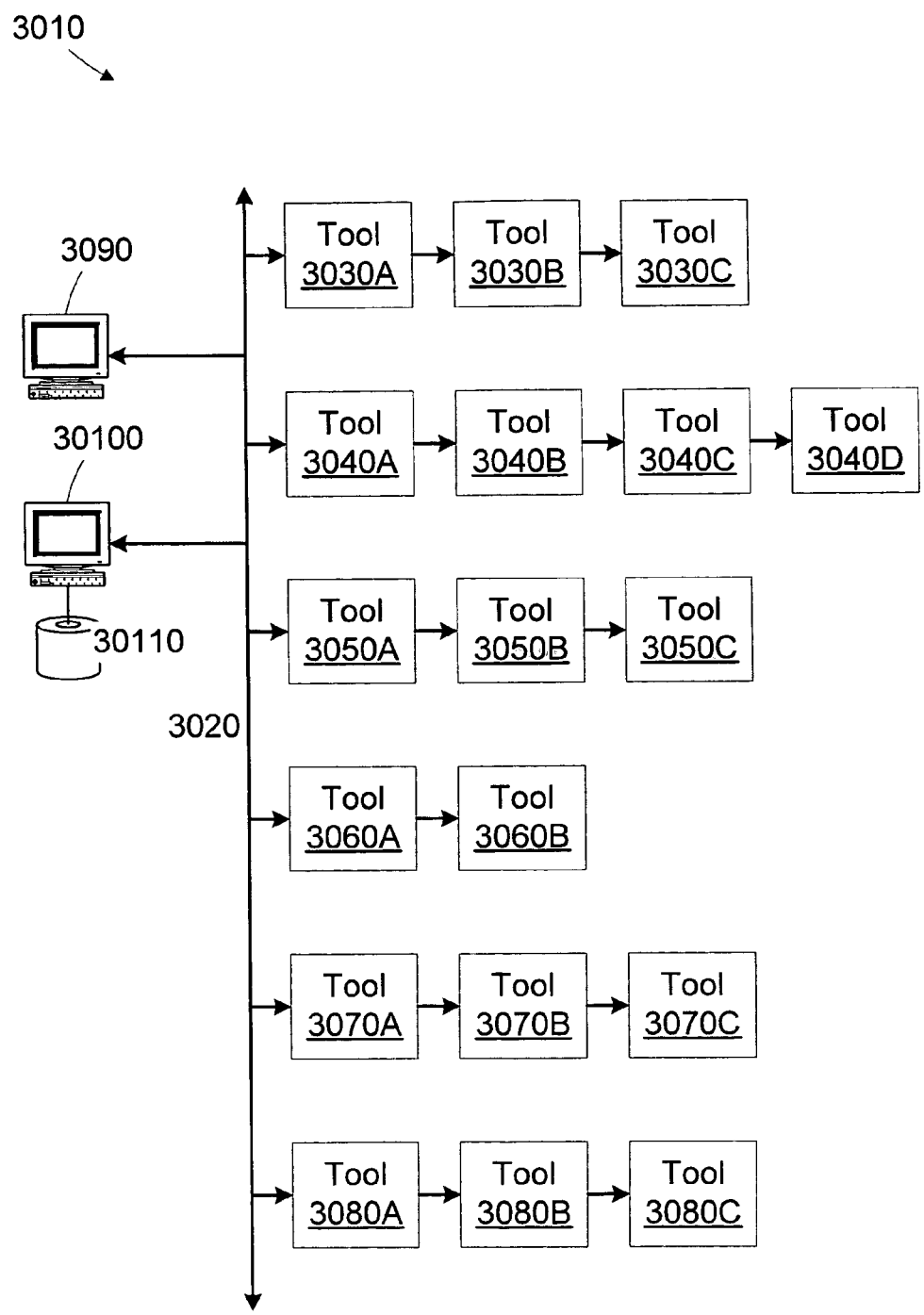

In various illustrative embodiments related to polishing and/or etching, for example, referring to FIG. 30, a simplified block diagram of an illustrative manufacturing system 3010 is provided. In the illustrated embodiment, the manufacturing system 3010 is adapted to fabricate semiconductor devices. Although the invention is described as it may be implemented in a semiconductor fabrication facility, the invention is not so limited and may be applied to other manufacturing environments. A network 3020 interconnects various components of the manufacturing system 3010, allowing them to exchange information. The illustrative manufacturing system 3010 includes a plurality of tools 3030–3080. Each of the tools 3030–3080 may be coupled to a computer (not shown) for interfacing with the network 3020.

A process control server 3090 directs the high level operation of the manufacturing system 3010 by directing the process flow. The process control server 3090 monitors the status of the various entities in the manufacturing system 3010, including the tools 3030–3080. A database server 30100 is provided for storing data related to the status of the various entities and articles of manufacture (e.g., wafers) in the process flow. The database server 30100 may store information in one or more data stores 30110. The data may include pre-process and post-process metrology data, tool states, process flow activities (e.g., scheduled maintenance events, processing routes for lots of wafers), and the like. The distribution of the processing and data storage functions amongst the different computers is generally conducted to provide independence and a central information store. Of course, more or fewer computers may be used.

An exemplary information exchange and process control framework suitable for use in the manufacturing system 3010 is an Advanced Process Control (APC) framework, such as may be implemented using the Catalyst system offered by KLA-Tencor, Inc. The Catalyst system uses Semiconductor Equipment and Materials International (SEMI) Computer Integrated Manufacturing (CIM) Framework compliant system technologies and is based the Advanced Process Control (APC) Framework. CIM (SEMI E81-0699—Provisional Specification for CIM Framework Domain Architecture) and APC (SEMI E93-0999—Provisional Specification for CIM Framework Advanced Process Control Component) specifications are publicly available from SEMI.

Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

The tools 3030–3080 are grouped into sets of like tools, as denoted by lettered suffixes. A particular wafer or lot of wafers progresses through the tools 3030–3080 as it is being manufactured, with each tool 3030–3080 performing a specific function in the process flow. Exemplary processing tools 3030–3080, include photolithography steppers, etch tools, deposition tools, polishing tools, rapid thermal processing tools, ion implantation tools, and the like. Some of the tools 3030–3080 may also be metrology tools adapted to measure characteristics (e.g., surface profiles) of the wafers being processed. In the illustrated embodiment, the set of tools 3030A–3030C represent etch tools, and the set of tools 3070A–3070C represent polishing tools. Typically, the path a particular wafer or lot passes through the process flow varies. The process control server 3090 routes the individual lots through the process flow depending on the steps that need to be performed and the availabilities of the tools 3030–3080. A particular lot of wafers may pass through the same tool 3030–3080 more than once in its production (e.g., a particular etch tool 3030 may be used for more than one etch operation).

The tools 3030–3080 are illustrated in a rank and file grouping for illustrative purposes only. In an actual implementation, the tools may be arranged in any order of grouping. Additionally, the connections between the tools in a particular group are meant to represent only connections to the network 3020, rather than interconnections between the tools.

The process control server 3090 controls the path of a particular lot of wafers through the tools 3030–3080. Based on process data, the process control server 3090 monitors the operating states of the tools 3030–3080. The process data may include pre-and post process measurements of wafers progressing through the tools 3030–3080. For example, if a particular polishing tool, e.g., 70A, is operating in a state that favors center-fast polishing, the process control server 3090 notes that tendency. The process control server 3090 may also monitor the operating states of other tools, such as the etch tools 3030 to determine if the current state of the etch tool favors center-fast or center-slow etching.

The process control server 3090 may initiate pre-processing and/or post-processing metrology events as necessary to determine the operating states of the tools 3030–3080. The data from the metrology events may be returned to the process control server 3090 (or some other computing resource on the network 3020) and analyzed. Alternatively, the process control server 3090 may access process data already collected and stored in the data store 30110. For example, pre-process and post-process metrology data may have been collected for various tools to generate statistical data for process control and/or fault detection.

The process control server 3090 evaluates the current operating states of the tools 3030–3080 as it determines the particular routing of a lot of wafers through the process flow of the manufacturing system 3010. For example, prior to performing a polishing procedure on a particular lot, the process controller 3090 first determines the surface profile (e.g., dished or domed) of the wafers in the lot. The process control server 3090 may initiate a metrology event to determine the surface profile or access the data store 30110 for the information. After determining the incoming surface profile, the process control server 3090 evaluates the current operating states of the polishing tools 3070A–3070C to determine which tool(s) have a tendency to polish in a manner complimentary to the incoming surface profile. If the incoming surface profile is dished, the process control server 3090 selects a polishing tool 3070A–3070C operating in a center-slow state. Similarly, if the incoming surface profile is domed, the process control server 3090 selects a polishing tool 3070A–3070C operating in a center-fast state.

A similar approach may be applied to an etch process. The process control server 3090 selects the particular etch tool 3030A–3030C having an operating state complimentary to the incoming surface profile. If the incoming surface profile is dished, the process control server 3090 selects an etch tool 3030A–3030C operating in a center-slow state. Similarly, if the incoming surface profile is domed, the process control server 3090 selects an etch tool 3030A–3030C operating in a center-fast state.

Any of the above-disclosed embodiments of a method according to the present invention enables the use of parametric measurements sent from measuring tools to make supervisory processing adjustments, either manually and/or automatically, to improve and/or better control the yield. Furthermore, many of the above-disclosed embodiments of a method of manufacturing according to the present invention provide a significant improvement in sampling methodology by treating sampling as an integrated part of the dynamic control environment of Advanced Process Control (APC) systems. Rather than applying a static "optimum" sampling rate, sampling is treated as a dynamic variable that is increased or decreased based upon (1) situational information, such as the amount and/or rate of change in the variation in recent data, (2) events, such as maintenance and/or changes in the process upstream of the operation, and/or (3) requirements of closed-loop run-to-run controllers in their schemes to identify control model parameters. Additionally, any of the above-disclosed embodiments of a method of manufacturing according to the present invention enables semiconductor device fabrication with increased device accuracy and precision, increased efficiency and increased device yield, enabling a streamlined and simplified process flow, thereby decreasing the complexity and lowering the costs of the manufacturing process and increasing throughput.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, in the sense of Georg Cantor. Accordingly, the protection sought herein is as set forth in the claims below.

What is claimed:

1. A method comprising:
   sampling at least one parameter characteristic of processing performed on a workpiece in at least one processing step in accordance with a sampling rate;
   modeling the at least one characteristic parameter sampled using an adaptive sampling processing model, treating sampling as an integrated part of a dynamic control environment, varying the sampling rate based upon at least one of situational information, upstream events and requirements of run-to-run controllers; and
   applying the adaptive sampling processing model to modify the processing performed in the at least one processing step.

2. The method of claim 1, wherein sampling the at least one parameter characteristic of the processing performed on the workpiece in the processing step comprises monitoring the at least one characteristic parameter using an advanced process control (APC) system.

3. The method of claim 2, wherein monitoring the at least one characteristic parameter using the advanced process control (APC) system comprises using the advanced process control (APC) system to monitor at least one tool variable of a processing tool during the processing step.

4. The method of claim 3, wherein modeling the at least one characteristic parameter sampled using the adaptive sampling processing model comprises using an adaptive sampling processing model incorporating at least one of a model predictive control (MPC) controller and a proportional-integral-derivative (PID) controller having at least one tuning parameter.

5. The method of claim 4, wherein applying the adaptive sampling processing model to modify the processing performed in the processing step comprises tuning the at least one tuning parameter to improve the processing performed in the processing step.

6. The method of claim 2, wherein modeling the at least one characteristic parameter sampled using the adaptive sampling processing model comprises using an adaptive sampling processing model incorporating at least one of a model predictive control (MPC) controller and a proportional-integral-derivative (PID) controller having at least one tuning parameter.

7. The method of claim 6, wherein applying the adaptive sampling processing model to modify the processing performed in the processing step comprises tuning the at least one tuning parameter to improve the processing performed in the processing step.

8. The method of claim 1, wherein modeling the at least one characteristic parameter sampled using the adaptive sampling processing model comprises using an adaptive sampling processing model incorporating at least one of a model predictive control (MPC) controller and a proportional-integral-derivative (PID) controller having at least one tuning parameter.

9. The method of claim 8, wherein using the adaptive sampling processing model incorporating the at least one of a model predictive control (MPC) controller and a proportional-integral-derivative (PID) controller having the at least one tuning parameter using the adaptive sampling processing model incorporating at least one of a closed-loop model predictive control (MPC) controller and a closed-loop proportional-integral-derivative (PID) controller having the at least one tuning parameter.

10. The method of claim 8, wherein applying the adaptive sampling processing model to modify the processing performed in the processing step comprises tuning the at least one tuning parameter to improve the processing performed in the processing step.

11. The method of claim 1, wherein varying the sampling rate comprises at least one of increasing and decreasing the sampling rate.

12. The device of claim 1, comprising means for at least one of increasing and decreasing the sampling rate.

13. A computer-readable, program storage device, encoded with instructions that, when executed by a computer, perform a method comprising:
sampling at least one parameter characteristic of processing performed on a workpiece in at least one processing step in accordance with a sampling rate;
modeling the at least one characteristic parameter sampled using an adaptive sampling processing model, treating sampling as an integrated part of a dynamic control environment, varying the sampling rate based upon at least one of situational information, upstream events and requirements of run-to-run controllers; and
applying the adaptive sampling processing model to modify the processing performed in the at least one processing step.

14. The device of claim 13, wherein sampling the at least one parameter characteristic of the processing performed on the workpiece in the processing step comprises monitoring the at least one characteristic parameter using an advanced process control (APC) system.

15. The device of claim 14, wherein monitoring the at least one characteristic parameter using the advanced process control (APC) system comprises using the advanced process control (APC) system to monitor at least one tool variable of a rapid thermal processing tool during the processing step.

16. The device of claim 15, wherein modeling the at least one characteristic parameter sampled using the adaptive sampling processing model comprises using an adaptive sampling processing model incorporating at least one of a model predictive control (MPC) controller and a proportional-integral-derivative (PID) controller having at least one tuning parameter.

17. The device of claim 16, wherein applying the adaptive sampling processing model to modify the processing performed in the processing step comprises tuning the at least one tuning parameter to improve the processing performed in the processing step.

18. The device of claim 14, wherein modeling the at least one characteristic parameter sampled using the adaptive sampling processing model comprises using an adaptive sampling processing model incorporating at least one of a model predictive control (MPC) controller and a proportional-integral-derivative (PID) controller having at least one tuning parameter.

19. The device of claim 18, wherein applying the adaptive sampling processing model to modify the processing performed in the processing step comprises tuning the at least one tuning parameter to improve the processing performed in the processing step.

20. The device of claim 13, wherein modeling the at least one characteristic parameter sampled using the adaptive sampling processing model comprises using an adaptive sampling processing model incorporating at least one of a model predictive control (MPC) controller and a proportional-integral-derivative (PID) controller having at least one tuning parameter.

21. The device of claim 20, wherein using the adaptive sampling processing model incorporating the at least one of a model predictive control (MPC) controller and a proportional-integral-derivative (PID) controller having the at least one tuning parameter comprises using the adaptive sampling processing model incorporating at least one of a closed-loop model predictive control (MPC) controller and a closed-loop proportional-integral-derivative (PID) controller having the at least one tuning parameter.

22. The device of claim 20, wherein applying the adaptive sampling processing model to modify the processing performed in the processing step comprises tuning the at least one tuning parameter to improve the processing performed in the processing step.

23. The computer-readable, program storage device of claim 13, encoded with instructions that, when executed by a computer, perform a method comprising at least one of increasing and decreasing the sampling rate.

24. A computer programmed to perform a method comprising:
sampling at least one parameter characteristic of processing performed on a workpiece in at least one processing step in accordance with a sampling rate;
modeling the at least one characteristic parameter sampled using an adaptive sampling processing model, treating sampling as an integrated part of a dynamic control environment, varying the sampling rate based upon at least one of situational information, upstream events and requirements of run-to-run controllers; and
applying the adaptive sampling processing model to modify the processing performed in the at least one processing step.

25. The computer of claim 24, wherein sampling the at least one parameter characteristic of the processing performed on the workpiece in the processing step comprises monitoring the at least one characteristic parameter using an advanced process control (APC) system.

26. The computer of claim 25, wherein monitoring the at least one characteristic parameter using the advanced process control (APC) system comprises using the advanced process control (APC) system to monitor at least one tool variable of a rapid thermal processing tool during the processing step.

27. The computer of claim 26, wherein modeling the at least one characteristic parameter sampled using the adaptive sampling processing model comprises using an adaptive sampling processing model incorporating at least one of a model predictive control (MPC) controller and a proportional-integral-derivative (PID) controller having at least one tuning parameter.

28. The computer of claim 27, wherein applying the adaptive sampling processing model to modify the processing performed in the processing step comprises tuning the at least one tuning parameter to improve the processing performed in the processing step.

29. The computer of claim 25, wherein modeling the at least one characteristic parameter sampled using the adaptive sampling processing model comprises using an adaptive sampling processing model incorporating at least one of a model predictive control (MPC) controller and a proportional-integral-derivative (PID) controller having at least one tuning parameter.

30. The computer of claim 29, wherein applying the adaptive sampling processing model to modify the processing performed in the processing step comprises tuning the at least one tuning parameter to improve the processing performed in the processing step.

31. The computer of claim 24, wherein modeling the at least one characteristic parameter sampled using the adaptive sampling processing model comprises using an adaptive sampling processing model incorporating at least one of a model predictive control (MPC) controller and a proportional-integral-derivative (PID) controller having at least one tuning parameter.

32. The computer of claim 31, wherein using the adaptive sampling processing model incorporating the at least one of a model predictive control (MPC) controller and a proportional-integral-derivative (PID) controller having the at least one tuning parameter comprises using the adaptive sampling processing model incorporating at least one of a closed-loop model predictive control (MPC) controller and a closed-loop proportional-integral-derivative (PID) controller having the at least one tuning parameter.

33. The computer of claim 31, wherein applying the adaptive sampling processing model to modify the processing performed in the processing step comprises tuning the at least one tuning parameter to improve the processing performed in the processing step.

34. The computer of claim 24, programmed to perform a method comprising at least one of increasing and decreasing the sampling rate.

35. A method comprising:
sampling at least one parameter characteristic of processing performed on a workpiece in at least one processing step in accordance with a sampling rate;
modeling the at least one characteristic parameter sampled using an adaptive sampling processing model, treating sampling as an integrated part of a dynamic control environment, varying the sampling rate based upon at least one of situational information comprising at least one of an amount of variation in recent data and a rate of change in the variation in the recent data, upstream events comprising at least one of maintenance in a process upstream and changes in the process upstream, and requirements of run-to-run controllers attempting to identify control model parameters; and
applying the adaptive sampling processing model to modify the processing performed in the at least one processing step.

36. The method of claim 35, wherein sampling the at least one parameter characteristic of the processing performed on the workpiece in the processing step comprises monitoring the at least one characteristic parameter using an advanced process control (APC) system.

37. The method of claim 26, wherein monitoring the at least one characteristic parameter using the advanced process control (APC) system comprises using the advanced process control (APC) system to monitor at least one tool variable of a rapid thermal processing tool during the processing step.

38. The method of claim 37, wherein modeling the at least one characteristic parameter sampled using the adaptive sampling processing model comprises using an adaptive sampling processing model incorporating at least one of a model predictive control (MPC) controller and a proportional-integral-derivative (PID) controller having at least one tuning parameter.

39. The method of claim 38, wherein applying the adaptive sampling processing model to modify the processing performed in the processing step comprises tuning the at least one tuning parameter to improve the processing performed in the processing step.

40. The method of claim 36, wherein modeling the at least one characteristic parameter sampled using the adaptive sampling processing model comprises using an adaptive sampling processing model incorporating at least one of a model predictive control (MPC) controller and a proportional-integral-derivative (PID) controller having at least one tuning parameter.

41. The method of claim 40, wherein applying the adaptive sampling processing model to modify the processing performed in the processing step comprises tuning the at least one tuning parameter to improve the processing performed in the processing step.

42. The method of claim 35, wherein modeling the at least one characteristic parameter sampled using the adaptive sampling processing model comprises using an adaptive sampling processing model incorporating at least one of a model predictive control (MPC) controller and a proportional-integral-derivative (PID) controller having at least one tuning parameter.

43. The method of claim 42, wherein using the adaptive sampling processing model incorporating the at least one of a model predictive control (MPC) controller and a proportional-integral-derivative (PID) controller having the at least one tuning parameter comprises using the adaptive sampling processing model incorporating at least one of a closed-loop model predictive control (MPC) controller and a closed-loop proportional-integral-derivative (PID) controller having the at least one tuning parameter.

44. The method of claim 42, wherein applying the adaptive sampling processing model to modify the processing performed in the processing step comprises tuning the at least one tuning parameter to improve the processing performed in the processing step.

45. The method of claim 35, wherein varying the sampling rate comprises at least one of increasing and decreasing the sampling rate.

46. A system comprising:
a tool for sampling at least one parameter characteristic of processing performed on a workpiece in at least one processing step in accordance with a sampling rate;
a computer for modeling the at least one characteristic parameter sampled using an adaptive sampling processing model, treating sampling as an integrated part of a dynamic control environment, varying the sampling rate based upon at least one of situational information, upstream events and requirements of run-to-run controllers; and
a controller for applying the adaptive sampling processing model to modify the processing performed in the at least one processing step.

47. The system of claim 46, wherein the tool for sampling the at least one parameter characteristic of the processing performed on the workpiece in the at least one processing step comprises a monitor for monitoring the at least one characteristic parameter using an advanced process control (APC) system.

48. The system of claim 47, wherein the advanced process control (APC) system monitors at least one tool variable of at least one processing tool during the at least one processing step.

49. The system of claim 48, wherein the computer modeling the at least one characteristic parameter measured uses an adaptive sampling processing model incorporating at least one of a model predictive control (MPC) controller and a proportional-integral-derivative (PID) controller having at least one tuning parameter.

50. The system of claim 49, wherein the controller applying the adaptive sampling processing model to modify the processing performed in the at least one processing step tunes the at least one tuning parameter to improve the processing performed in the at least one processing step.

51. The system of claim 47, wherein the computer modeling the at least one characteristic parameter sampled uses an adaptive sampling processing model incorporating at least one of a model predictive control (MPC) controller and a proportional-integral-derivative (PID) controller having at least one tuning parameter.

52. The system of claim 51, wherein the controller applying the adaptive sampling processing model to modify the processing performed in the at least one processing step tunes the at least one tuning parameter to improve the processing performed in the at least one processing step.

53. The system of claim 46, wherein the computer modeling the at least one characteristic parameter sampled uses an adaptive sampling processing model incorporating at least one of a model predictive control (MPC) controller and a proportional-integral-derivative (PID) controller having at least one tuning parameter.

54. The system of claim 53, wherein the computer uses the adaptive sampling processing model incorporating at least one of a closed-loop model predictive control (MPC) controller and a closed-loop proportional-integral-derivative (PID) controller having the at least one tuning parameter.

55. The system of claim 53, wherein the controller applying the adaptive sampling processing model to modify the processing performed in the at least one processing step tunes the at least one tuning parameter to improve the processing performed in the at least one processing step.

56. The system of claim 46, wherein the computer performs at least one of increasing and decreasing the sampling rate.

57. A device comprising:
means for sampling at least one parameter characteristic of processing performed on a workpiece in at least one processing step in accordance with a sampling rate;
means for modeling the at least one characteristic parameter sampled using an adaptive sampling processing model, treating sampling as an integrated part of a dynamic control environment, varying the sampling rate based upon at least one of situational information, upstream events and requirements of run-to-run controllers; and
means for applying the adaptive sampling processing model to modify the processing performed in the at least one processing step.

58. The device of claim 57, wherein the means for sampling the at least one parameter characteristic of the processing performed on the workpiece in the at least one processing step comprises means for monitoring the at least one characteristic parameter using an advanced process control (APC) system.

59. The device of claim 58, wherein the means for monitoring the at least one characteristic parameter using the advanced process control (APC) system comprises using the advanced process control (APC) system to monitor at least one tool variable of at least one processing tool during the at least one processing step.

60. The device of claim 59, wherein the means for modeling the at least one characteristic parameter sampled using the adaptive sampling processing model comprises means for using an adaptive sampling processing model incorporating at least one of a model predictive control (MPC) controller and a proportional-integral-derivative (PID) controller having at least one tuning parameter.

61. The device of claim 60, wherein the means for applying the adaptive sampling processing model to modify the processing performed in the at least one processing step comprises means for tuning the at least one tuning parameter to improve the processing performed in the at least one processing step.

62. The device of claim 58, wherein the means for modeling the at least one characteristic parameter sampled using the adaptive sampling processing model comprises means for using an adaptive sampling processing model incorporating at least one of a model predictive control (MPC) controller and a proportional-integral-derivative (PID) controller having at least one tuning parameter.

63. The device of claim 62, wherein the means for applying the adaptive sampling processing model to modify the processing performed in the at least one processing step comprises means for tuning the at least one tuning parameter to improve the processing performed in the at least one processing step.

64. The device of claim 57, wherein the means for modeling the at least one characteristic parameter sampled using the adaptive sampling processing model comprises means for using an adaptive sampling processing model incorporating at least one of a model predictive control (MPC) controller and a proportional-integral-derivative (PID) controller having at least one tuning parameter.

65. The device of claim 64, wherein the means for using the adaptive sampling processing model incorporating the at least one of a model predictive control (MPC) controller and a proportional-integral-derivative (PID) controller having the at least one tuning parameter comprises the means for using the adaptive sampling processing model incorporating at least one of a closed-loop model predictive control (MPC) controller and a closed-loop proportional-integral-derivative (PID) controller having the at least one tuning parameter.

66. The device of claim 64, wherein the means for applying the adaptive sampling processing model to modify the processing performed in the at least one processing step comprises means for tuning the at least one tuning parameter to improve the processing performed in the at least one processing step.

* * * * *